United States Patent
Walker

(10) Patent No.: US 9,604,428 B2
(45) Date of Patent: *Mar. 28, 2017

(54) VENTILATED STRUCTURAL PANELS AND METHOD OF CONSTRUCTION WITH VENTILATED STRUCTURAL PANELS

(71) Applicant: James Walker, Franconia, NH (US)

(72) Inventor: James Walker, Franconia, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,943

(22) Filed: May 14, 2015

(65) Prior Publication Data

US 2015/0239201 A1     Aug. 27, 2015

Related U.S. Application Data

(63) Continuation-in-part of application No. 13/782,406, filed on Mar. 1, 2013, now Pat. No. 9,050,766, and a
(Continued)

(51) Int. Cl.
    *B32B 3/18*           (2006.01)
    *E04F 17/04*        (2006.01)
    (Continued)

(52) U.S. Cl.
    CPC .............. *B32B 3/18* (2013.01); *B29D 24/002* (2013.01); *B29D 28/00* (2013.01); *B32B 3/20* (2013.01);
    (Continued)

(58) Field of Classification Search
    CPC ......... B32B 3/266; B32B 3/30; E04B 1/0023; E04B 1/7069; E04B 7/20; E04C 2/34;
    (Continued)

(56) References Cited

U.S. PATENT DOCUMENTS 1,086,031 A     2/1914     Davis
1,154,254 A     9/1915     Lachman
(Continued)

FOREIGN PATENT DOCUMENTS

FR            918 265        2/1947
JP            H01218819 A    9/1989
(Continued)

OTHER PUBLICATIONS

U.S. Appl. No. 61/623,269 retrieved from WIPO public search collection on Jan. 28, 2016 (25 pages).*
(Continued)

*Primary Examiner* — Rodney Mintz
(74) *Attorney, Agent, or Firm* — Davis & Bujold PLLC; Michael J. Bujold

(57) ABSTRACT

A multi-plenum structural panel comprising a top sheet, a middle sheet, and a bottom sheet, each sheet being parallel to the other two. A first plurality of spacing structural elements, fixedly attaching the top sheet to the middle sheet, and a second plurality of spacing structural elements fixedly attaching the middle sheet to the bottom sheet, such that a yield strength of an assembled multi-plenum structural panel is greater than a sum of individual sheet yield strengths. An upper plenum is defined by a first spacing between the top and middle sheets. A lower plenum is defined by a second spacing between the middle and bottom sheets. The first plurality of spacing structural elements is formed such that a first plurality of spaced apart unobstructed pathways are created in the upper plenum for air to move in a first direction from at least one edge of the multi-plenum structural panel to at least one of an opposite and an adjacent edge of the multi-plenum structural panel in each plenum. The second plurality of spacing structural elements is formed such that a second plurality of spaced apart unobstructed
(Continued)

pathways are created in the lower plenum for air to move in a second direction from at least one edge of the multi-plenum structural panel to at least one of an opposite and an adjacent edge of the multi-plenum structural panel in each plenum, where the first direction is orthogonal to the second direction.

20 Claims, 55 Drawing Sheets

Related U.S. Application Data continuation-in-part of application No. 14/099,100, filed on Dec. 6, 2013, now Pat. No. 9,091,049, which is a continuation-in-part of application No. 13/539,919, filed on Jul. 2, 2012, now Pat. No. 8,615,945, which is a continuation-in-part of application No. 13/016,320, filed on Jan. 28, 2011, now Pat. No. 8,534,018, which is a continuation-in-part of application No. 12/987,832, filed on Jan. 10, 2011, now Pat. No. 8,490,355.

(60) Provisional application No. 61/376,333, filed on Aug. 24, 2010.

(51) Int. Cl.
  *E04C 2/34* (2006.01)
  *B32B 3/26* (2006.01)
  *B32B 3/20* (2006.01)
  *B29D 24/00* (2006.01)
  *B29D 28/00* (2006.01)

(52) U.S. Cl.
  CPC .......... *B32B 3/266* (2013.01); *B32B 2419/00* (2013.01); *B32B 2607/00* (2013.01); *E04C 2/34* (2013.01); *E04C 2002/3472* (2013.01); *E04C 2002/3488* (2013.01); *Y10T 428/24331* (2015.01); *Y10T 428/24744* (2015.01); *Y10T 428/24802* (2015.01)

(58) Field of Classification Search
  CPC ..... E04C 2/38; E04C 3/16; E04C 3/28; E04C 3/291; E04D 12/00; E04D 13/17; F24F 7/02; F24F 7/08; F24F 2221/40
  USPC ........... 52/302.1, 302.3, 302.4, 220.1, 220.3, 52/220.4, 220.8, 220.2, 580, 741.4, 782.1, 52/783.1, 786.13, 789.1, 790.1, 793.11, 52/799.11, 799.12, 799.13; 428/105, 106, 428/110, 188, 138
  See application file for complete search history.

(56) References Cited

U.S. PATENT DOCUMENTS

| | | |
|---|---|---|
| 1,943,080 A | 4/1933 | Langston |
| 1,928,034 A | 9/1933 | Schulstadt |
| 2,206,119 A | 7/1940 | Persons |
| 2,220,606 A | 11/1940 | Malarkey et al. |
| 2,479,870 A * | 8/1949 | Rundquist ............ E06B 3/7015 428/98 |
| 2,706,164 A | 4/1955 | Hervey |
| 2,762,472 A | 9/1956 | Jackson |
| 2,960,146 A | 11/1960 | Williams |
| 3,024,879 A | 3/1962 | Kandra |
| 3,082,504 A | 3/1963 | Tatsch |
| 3,085,292 A | 4/1963 | Kindseth |
| 3,225,162 A | 12/1965 | Delafrange |
| 3,228,162 A | 1/1966 | Gregoire |
| 3,438,164 A | 4/1969 | Duepree |
| 3,441,638 A | 4/1969 | Patchell et al. |
| 3,496,052 A | 2/1970 | Oderthal |
| 3,516,347 A | 6/1970 | May |
| 3,537,378 A | 11/1970 | Daly |
| 3,538,668 A | 11/1970 | Anderson |
| 3,619,961 A | 11/1971 | Sterrett et al. |
| 3,623,936 A | 11/1971 | Hotz |
| 3,662,507 A | 5/1972 | Espeland |
| 3,797,180 A | 3/1974 | Grange |
| 3,807,116 A | 4/1974 | Flynn |
| 3,886,706 A | 6/1975 | Baker |
| 3,972,164 A | 8/1976 | Grange |
| 4,012,882 A | 3/1977 | Juriss et al. |
| 4,064,300 A | 12/1977 | Bhangu |
| 4,071,194 A | 1/1978 | Eckert et al. |
| 4,084,366 A | 4/1978 | Saylor et al. |
| 4,093,762 A | 6/1978 | Kiefer |
| 4,285,181 A | 8/1981 | Van Loghem et al. |
| 4,319,520 A | 3/1982 | Lanting et al. |
| 4,323,533 A | 4/1982 | Bramhall |
| 4,329,827 A | 5/1982 | Thorn |
| 4,344,266 A | 8/1982 | Gray |
| 4,348,442 A | 9/1982 | Figge |
| 4,573,304 A | 3/1986 | Mieyal |
| 4,635,419 A | 1/1987 | Forrest |
| 4,663,909 A | 5/1987 | Ogino et al. |
| 4,674,249 A | 6/1987 | Bennett, Jr. |
| 4,676,036 A | 6/1987 | Bessert |
| 4,707,393 A | 11/1987 | Vetter |
| 4,822,660 A | 4/1989 | Lipp |
| 4,850,166 A | 7/1989 | Taylor |
| 4,852,314 A | 8/1989 | Moore, Jr. |
| 4,860,506 A | 8/1989 | Yoshimi et al. |
| 4,888,927 A | 12/1989 | Yoshimi et al. |
| 4,894,974 A | 1/1990 | Mayhew et al. |
| RE33,220 E | 5/1990 | Collier |
| 4,937,122 A | 6/1990 | Talbert |
| 4,977,714 A | 12/1990 | Gregory, Jr. |
| 5,022,943 A | 6/1991 | Zaima |
| 5,071,688 A | 12/1991 | Hoffman |
| 5,098,762 A | 3/1992 | Nakajima |
| 5,099,627 A | 3/1992 | Coulton et al. |
| 5,157,892 A | 10/1992 | Ryther |
| 5,180,619 A | 1/1993 | Landi et al. |
| 5,204,127 A | 4/1993 | Prusha |
| 5,204,161 A | 4/1993 | Pettit et al. |
| 5,206,067 A | 4/1993 | Bonzo |
| 5,238,452 A | 8/1993 | Levy et al. |
| 5,277,953 A | 1/1994 | Tsuda |
| 5,299,401 A | 4/1994 | Shelton |
| 5,366,787 A | 11/1994 | Yasui et al. |
| 5,369,926 A | 12/1994 | Borland |
| 5,369,930 A | 12/1994 | Kreizinger |
| 5,377,468 A | 1/1995 | Repasky |
| 5,396,750 A | 3/1995 | Kleyn |
| 5,399,406 A | 3/1995 | Matsuo et al. |
| 5,433,050 A | 7/1995 | Wilson et al. |
| 5,467,609 A | 11/1995 | Feeney |
| 5,468,184 A | 11/1995 | Collier |
| 5,471,806 A | 12/1995 | Rokhlin |
| 5,473,847 A | 12/1995 | Crookston |
| 5,487,247 A | 1/1996 | Pigg |
| 5,487,930 A | 1/1996 | Lockshaw et al. |
| 5,493,839 A | 2/1996 | Sax et al. |
| 5,519,946 A | 5/1996 | Renzi |
| 5,526,621 A | 6/1996 | Shelton |
| 5,526,625 A | 6/1996 | Emblin et al. |
| 5,527,588 A | 6/1996 | Camarda et al. |
| 5,543,198 A | 8/1996 | Wilson |
| 5,561,953 A | 10/1996 | Rotter |
| 5,561,958 A | 10/1996 | Clement et al. |
| 5,591,511 A | 1/1997 | Yasui |
| 5,633,053 A | 5/1997 | Lockshaw et al. |
| 5,634,315 A | 6/1997 | Toya |
| 5,640,812 A | 6/1997 | Crowley et al. |
| 5,670,220 A | 9/1997 | Skoien |
| 5,689,898 A | 11/1997 | Renzi |
| 5,741,571 A | 4/1998 | Bowerman et al. |
| 5,761,864 A | 6/1998 | Nonoshita |

(56) References Cited

U.S. PATENT DOCUMENTS

| | | |
|---|---|---|
| 5,888,610 A | 3/1999 | Fournier et al. |
| 5,914,175 A | 6/1999 | Nudo et al. |
| 5,946,878 A | 9/1999 | Grund et al. |
| 5,957,506 A | 9/1999 | Stepp |
| 5,958,551 A | 9/1999 | Garcio-Ochoa |
| 6,004,652 A | 12/1999 | Clark |
| 6,017,597 A | 1/2000 | Minakami et al. |
| 6,079,175 A | 6/2000 | Clear |
| 6,101,768 A | 8/2000 | Springstead et al. |
| 6,122,892 A | 9/2000 | Gonidec et al. |
| 6,134,854 A | 10/2000 | Stanchfield |
| 6,171,680 B1 | 1/2001 | Fahmy |
| 6,185,895 B1 | 2/2001 | Rettew |
| 6,189,270 B1 | 2/2001 | Jeffers et al. |
| 6,209,273 B1 | 4/2001 | Jeffers et al. |
| 6,210,774 B1 | 4/2001 | Garcia-Ochoa |
| 6,269,598 B1 | 8/2001 | Wintermantel |
| 6,279,279 B1 | 8/2001 | Larimore |
| 6,286,289 B1 | 9/2001 | Powell et al. |
| 6,415,580 B2 | 7/2002 | Ojala |
| 6,449,915 B1 | 9/2002 | Park |
| 6,457,288 B2 | 10/2002 | Zambelli et al. |
| 6,591,567 B2 | 7/2003 | Hota et al. |
| 6,594,964 B2 | 7/2003 | Charland |
| 6,598,366 B2 | 7/2003 | Hsieh et al. |
| 6,609,592 B2 | 8/2003 | Wilson |
| 6,668,504 B2 | 12/2003 | Hughart |
| 6,773,791 B1 | 8/2004 | Ruggie et al. |
| 6,780,099 B1 | 8/2004 | Harper |
| 6,827,180 B2 | 12/2004 | Wilson |
| 6,852,386 B2 | 2/2005 | Nadezhdin et al. |
| 6,887,555 B2 | 5/2005 | Woo et al. |
| 6,913,667 B2 | 7/2005 | Nudo et al. |
| 6,939,599 B2 * | 9/2005 | Clark .................. B32B 3/30 428/178 |
| 7,090,911 B2 | 8/2006 | Lascelles |
| 7,131,242 B2 | 11/2006 | Martensson et al. |
| 7,134,250 B2 | 11/2006 | Forrester et al. |
| 7,147,741 B2 | 12/2006 | Sing |
| 7,150,133 B2 | 12/2006 | Regina et al. |
| 7,165,369 B2 | 1/2007 | Jandl |
| 7,185,947 B2 | 3/2007 | Boehm |
| 7,288,326 B2 | 10/2007 | Elzey et al. |
| 7,401,682 B2 | 7/2008 | Proscia et al. |
| D589,171 S | 3/2009 | Gleeson et al. |
| 7,536,835 B2 | 5/2009 | Schluter |
| 7,651,751 B2 | 1/2010 | Hasch et al. |
| 7,669,384 B2 | 3/2010 | Kaida et al. |
| 7,722,112 B2 | 5/2010 | Ehrlich |
| 7,743,884 B2 | 6/2010 | Thomas et al. |
| 7,766,280 B2 | 8/2010 | Cloft et al. |
| 7,810,296 B1 | 10/2010 | Turku |
| 7,911,075 B2 | 3/2011 | Pagliasotti |
| 7,922,954 B2 | 4/2011 | Marschke |
| 8,043,690 B2 | 10/2011 | Hand et al. |
| 8,046,969 B2 | 11/2011 | Dagher et al. |
| 8,051,613 B2 | 11/2011 | Lu et al. |
| 8,052,377 B2 | 11/2011 | Coney et al. |
| 8,100,341 B1 | 1/2012 | Roderick et al. |
| 8,127,505 B2 | 3/2012 | Lu et al. |
| 8,141,313 B2 | 3/2012 | Dagher et al. |
| 8,176,635 B2 | 5/2012 | Queheillalt et al. |
| 8,192,570 B2 | 6/2012 | Hand et al. |
| 8,245,947 B2 | 8/2012 | Roderick et al. |
| 8,273,208 B2 | 9/2012 | Brinner |
| 8,287,984 B2 | 10/2012 | Grall |
| 8,343,398 B2 | 1/2013 | Khatchikian |
| 8,356,450 B2 | 1/2013 | Larimore |
| 8,387,315 B2 | 3/2013 | Hosking et al. |
| 8,393,129 B2 | 3/2013 | Arsene et al. |
| 8,394,477 B2 | 3/2013 | Hill et al. |
| 8,407,965 B2 | 4/2013 | Dorozhkin et al. |
| 8,438,806 B2 | 5/2013 | Lim |
| 8,453,399 B2 | 6/2013 | Anderson |
| 8,459,597 B2 | 6/2013 | Cloft et al. |
| 8,464,831 B2 | 6/2013 | Olander Burak et al. |
| 8,490,355 B2 | 7/2013 | Walker |
| 8,512,853 B2 | 8/2013 | Chakrabarti |
| 8,528,184 B2 | 9/2013 | Holmes, IV et al. |
| 8,530,027 B2 | 9/2013 | Kozar et al. |
| 8,534,018 B2 | 9/2013 | Walker |
| 8,555,581 B2 | 10/2013 | Amend |
| 8,561,372 B2 | 10/2013 | Fujimoto |
| 8,607,520 B2 | 12/2013 | Mencio |
| 8,609,219 B2 | 12/2013 | Kozar et al. |
| 8,615,945 B2 | 12/2013 | Walker |
| 8,615,956 B2 | 12/2013 | Valente et al. |
| 8,627,635 B1 | 1/2014 | Armstrong |
| 8,635,822 B2 | 1/2014 | Walker |
| 8,667,755 B1 | 3/2014 | Finfrock et al. |
| 8,695,298 B2 | 4/2014 | Jilken |
| 8,697,223 B2 | 4/2014 | Schroer et al. |
| 8,707,643 B1 | 4/2014 | Kalkanoglu et al. |
| 8,722,169 B2 | 5/2014 | Corver |
| 8,739,497 B2 | 6/2014 | Meuser |
| 8,763,333 B1 | 7/2014 | Finfrock et al. |
| 8,776,450 B2 | 7/2014 | Lee |
| 8,881,476 B2 | 11/2014 | Sullivan et al. |
| 8,915,339 B2 | 12/2014 | Kanous et al. |
| 8,931,221 B2 | 1/2015 | Somani et al. |
| 8,932,700 B2 | 1/2015 | Shimizu et al. |
| 8,973,310 B1 * | 3/2015 | Henderson ............ E04D 13/178 52/302.1 |
| 9,022,845 B2 * | 5/2015 | Henderson ................ F24F 7/02 29/897.3 |
| 9,050,766 B2 * | 6/2015 | Walker ................... B29D 28/00 156/245 |
| 9,085,933 B1 * | 7/2015 | Crittenden ............ E06B 3/5892 52/455 |
| 9,091,049 B2 * | 7/2015 | Walker ................ E04B 1/7069 52/302.1 |
| 9,109,389 B1 * | 8/2015 | Crittenden ............ E06B 3/5892 454/195 |
| 2002/0028318 A1 | 3/2002 | Clark |
| 2003/0126806 A1 * | 7/2003 | Ellis ....................... E04D 13/17 52/95 |
| 2003/0161994 A1 | 8/2003 | Je-Suk et al. |
| 2003/0167714 A1 | 9/2003 | Jandl |
| 2004/0101649 A1 | 5/2004 | Thoma |
| 2004/0112007 A1 | 6/2004 | Thibeau |
| 2004/0134137 A1 | 7/2004 | Geer et al. |
| 2004/0177590 A1 * | 9/2004 | Nudo ...................... B32B 3/12 52/783.1 |
| 2004/0197519 A1 | 10/2004 | Elzey et al. |
| 2004/0226238 A1 | 11/2004 | Haapiainen |
| 2005/0053515 A1 | 3/2005 | Yates et al. |
| 2005/0066619 A1 | 3/2005 | McDonald |
| 2005/0072097 A1 | 4/2005 | Holloway |
| 2005/0144906 A1 | 7/2005 | Morris et al. |
| 2005/0204695 A1 | 9/2005 | Blazevic |
| 2006/0005509 A1 | 1/2006 | Yohnke et al. |
| 2006/0083894 A1 | 4/2006 | Vetrovec et al. |
| 2006/0131933 A1 | 6/2006 | Boehm |
| 2006/0144013 A1 | 7/2006 | Rouanet et al. |
| 2006/0218869 A1 | 10/2006 | Ellis |
| 2006/0242920 A1 | 11/2006 | Griffner |
| 2006/0248855 A1 | 11/2006 | Olvey |
| 2006/0260265 A1 | 11/2006 | Zatkulak |
| 2006/0266001 A1 | 11/2006 | Barker et al. |
| 2007/0034446 A1 | 2/2007 | Proscia et al. |
| 2007/0095016 A1 | 5/2007 | Sakae |
| 2007/0141304 A1 | 6/2007 | Agrawal |
| 2007/0169432 A1 | 7/2007 | Bridge |
| 2007/0204541 A1 | 9/2007 | Sade |
| 2007/0209318 A1 | 9/2007 | McCarthy |
| 2007/0266494 A1 | 11/2007 | DeLuca et al. |
| 2007/0283639 A1 | 12/2007 | Kortuem et al. |
| 2008/0028704 A1 | 2/2008 | Cooper et al. |
| 2008/0034690 A1 | 2/2008 | Gartz et al. |
| 2008/0163582 A1 | 7/2008 | Trevethick |
| 2008/0202066 A1 | 8/2008 | Arsene et al. |
| 2009/0009083 A1 | 1/2009 | Park et al. |
| 2009/0038262 A1 | 2/2009 | Marschke |

(56) References Cited

U.S. PATENT DOCUMENTS

| | | |
|---|---|---|
| 2009/0044484 A1 | 2/2009 | Berger |
| 2009/0090083 A1 | 4/2009 | Dagher et al. |
| 2009/0183450 A1 | 7/2009 | Lu et al. |
| 2009/0277113 A1 | 11/2009 | Taraba et al. |
| 2010/0101171 A1 | 4/2010 | Clifton et al. |
| 2010/0120347 A1 | 5/2010 | Gehring et al. |
| 2010/0146884 A1 | 6/2010 | Lu et al. |
| 2010/0147499 A1 | 6/2010 | Arai et al. |
| 2010/0178157 A1 | 7/2010 | Arai et al. |
| 2010/0186305 A1 | 7/2010 | Larimore |
| 2010/0189953 A1 | 7/2010 | Lim |
| 2010/0257795 A1 | 10/2010 | Pagliasotti |
| 2010/0279065 A1 | 11/2010 | Schroer et al. |
| 2010/0300026 A1 | 12/2010 | Candiracci |
| 2010/0300645 A1 | 12/2010 | Glover |
| 2010/0325990 A1 | 12/2010 | Taraba et al. |
| 2010/0325991 A1 | 12/2010 | Trower et al. |
| 2011/0030300 A1 | 2/2011 | Liu |
| 2011/0047932 A1 | 3/2011 | Fleming, III |
| 2011/0072746 A1 | 3/2011 | Dagher et al. |
| 2011/0162299 A1 | 7/2011 | Azzolini |
| 2011/0203196 A1* | 8/2011 | Lee .............. E06B 7/14 52/173.1 |
| 2011/0265407 A1 | 11/2011 | Bryson |
| 2011/0272034 A1 | 11/2011 | Fex, Jr. |
| 2012/0017525 A1 | 1/2012 | Knapp et al. |
| 2012/0047839 A1 | 3/2012 | Walker |
| 2012/0047844 A1 | 3/2012 | Walker |
| 2012/0090265 A1 | 4/2012 | McCarville et al. |
| 2012/0149291 A1 | 6/2012 | Roderick et al. |
| 2012/0159877 A1 | 6/2012 | Reid |
| 2012/0174518 A1 | 7/2012 | Litaize |
| 2012/0186184 A1 | 7/2012 | Mencio |
| 2012/0266553 A1* | 10/2012 | Shiao .............. E04D 13/1618 52/232 |
| 2012/0285116 A1 | 11/2012 | Walker |
| 2013/0025220 A1 | 1/2013 | Yu et al. |
| 2013/0036692 A1 | 2/2013 | Aspenson et al. |
| 2013/0084424 A1 | 4/2013 | Cangiano et al. |
| 2013/0091792 A1 | 4/2013 | Fujimoto |
| 2013/0125487 A1 | 5/2013 | Power et al. |
| 2013/0145714 A1 | 6/2013 | Walker |
| 2013/0230690 A1 | 9/2013 | Chakrabarti |
| 2013/0316134 A1 | 11/2013 | Anderson et al. |
| 2013/0330510 A1 | 12/2013 | Gonda et al. |
| 2014/0013688 A1 | 1/2014 | Pollack |
| 2014/0053482 A1 | 2/2014 | Lee |
| 2014/0060775 A1* | 3/2014 | Sulzer .............. F24D 3/14 165/49 |
| 2014/0093678 A1* | 4/2014 | Walker .............. E04B 7/20 428/106 |
| 2014/0134394 A1 | 5/2014 | Noble et al. |
| 2014/0137491 A1 | 5/2014 | Somani et al. |
| 2014/0246146 A1 | 9/2014 | Walker |
| 2014/0315041 A1 | 10/2014 | Pereira Da Cunha Ribeiro Valente |
| 2015/0007508 A1 | 1/2015 | Valtanen |
| 2015/0056404 A1* | 2/2015 | Sawafta .............. B32B 3/085 428/106 |
| 2015/0082722 A1* | 3/2015 | Kalkanoglu .............. E04D 1/30 52/302.1 |
| 2015/0096248 A1* | 4/2015 | Tebo .............. E04D 13/17 52/302.3 |
| 2015/0175210 A1* | 6/2015 | Raymond .............. B62D 21/10 296/191 |
| 2015/0176283 A1* | 6/2015 | Smiley, Jr. .............. E04D 13/17 52/105 |
| 2015/0267404 A1* | 9/2015 | Yau .............. E04C 2/523 52/794.1 |
| 2015/0292205 A1* | 10/2015 | Kelly .............. E04B 7/18 52/302.3 |
| 2016/0160502 A1* | 6/2016 | Brousseau .............. E04C 2/205 52/309.4 |
| 2016/0194864 A1* | 7/2016 | Walker .............. E04B 1/40 52/745.06 |

FOREIGN PATENT DOCUMENTS

| | | |
|---|---|---|
| JP | H08183046 A | 7/1996 |
| JP | H1144011 A | 2/1999 |
| JP | 2006-007694 A | 1/2006 |
| SU | 941512 A1 | 7/1982 |
| SU | 1308727 A1 | 5/1987 |
| WO | 2011/039439 A1 | 4/2011 |
| WO | 2012/027353 A2 | 3/2012 |
| WO | 2012/027353 A3 | 3/2012 |
| WO | 2013/155408 A1 | 10/2013 |

OTHER PUBLICATIONS http://www.hpanels.com/images/stories/pdfs/lit_prod_color/english/Cool-Vent.pdf Available at least as early as Aug. 23, 2010.
http://www.cornellcorporation.com/products/cvrs.htm Available at least as early as Aug. 23, 2010.

* cited by examiner

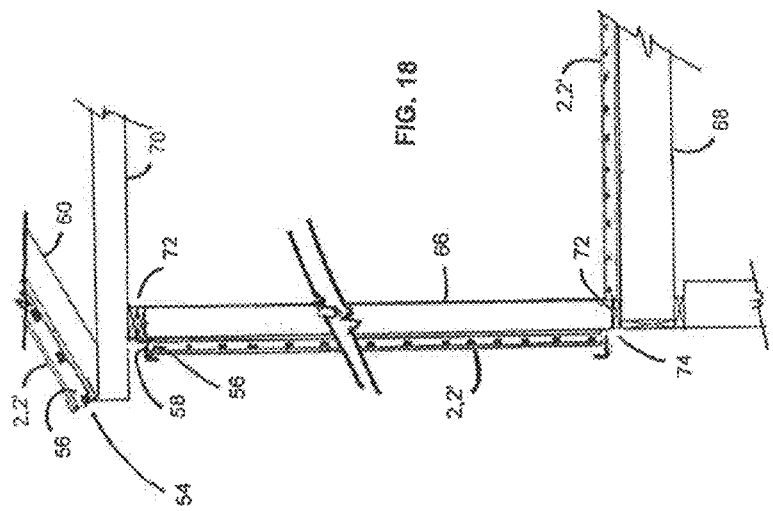
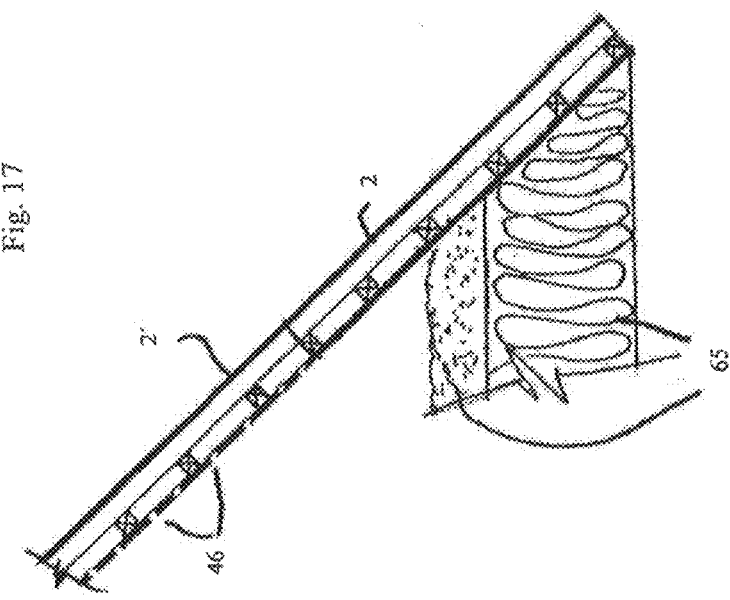

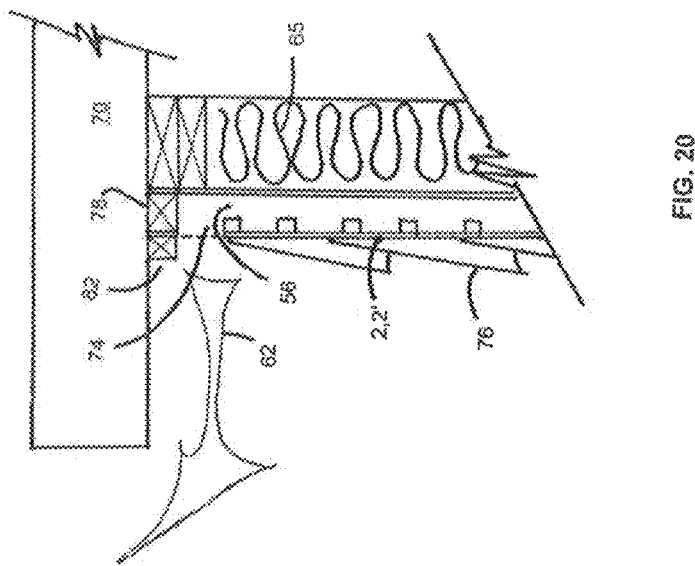
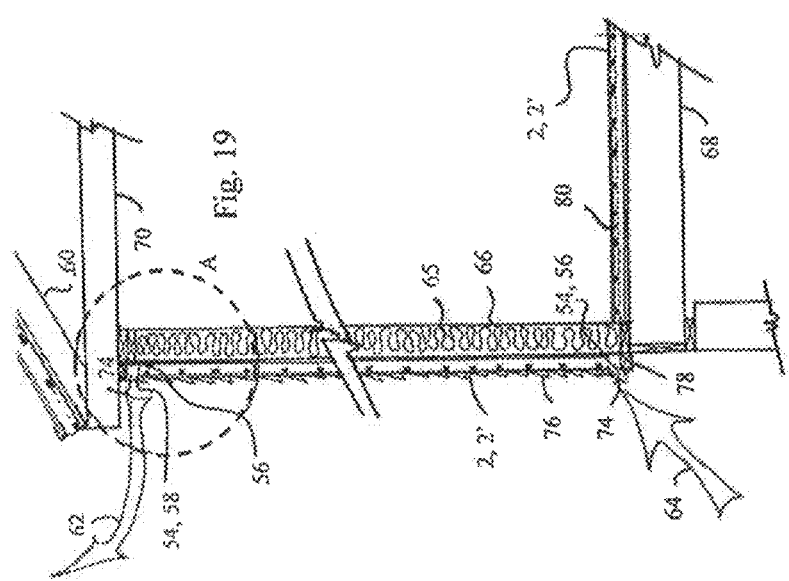

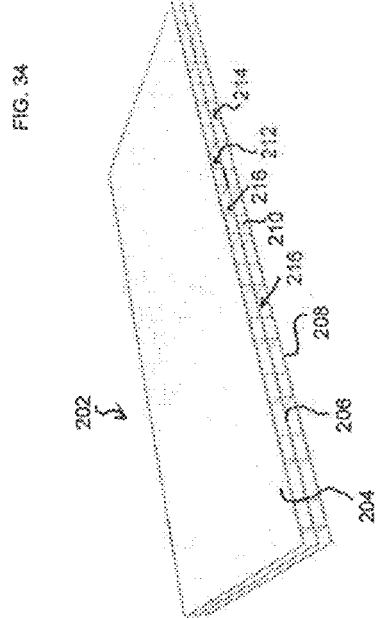
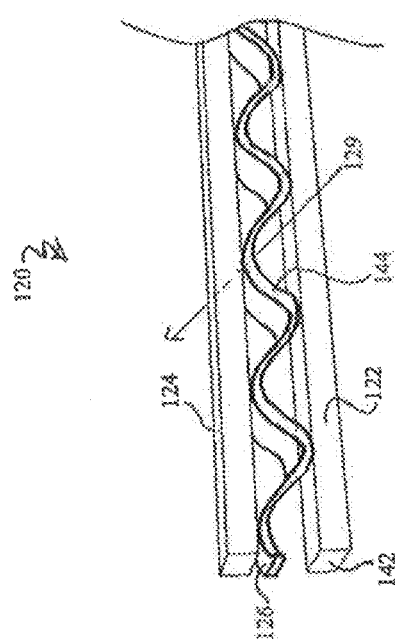

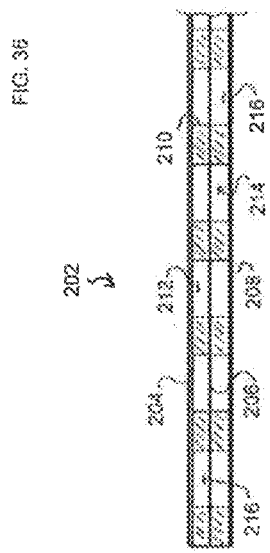
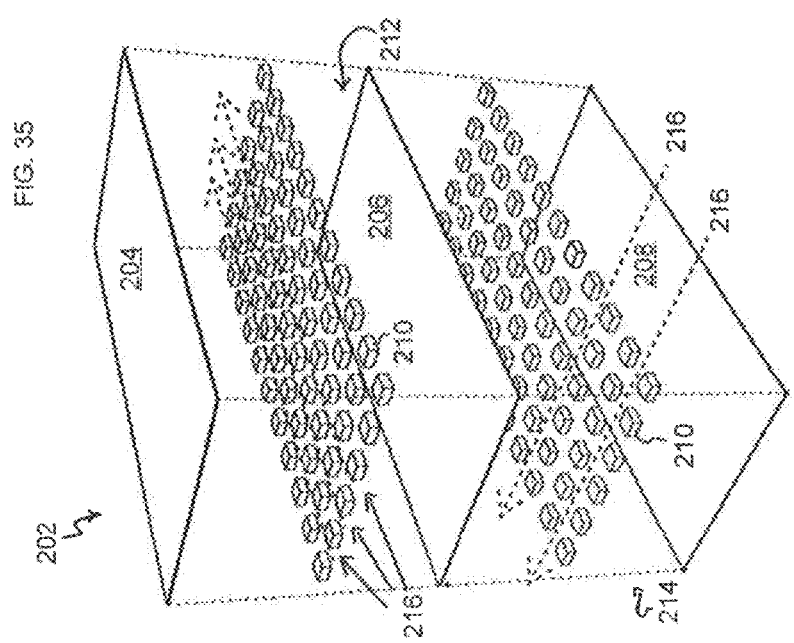

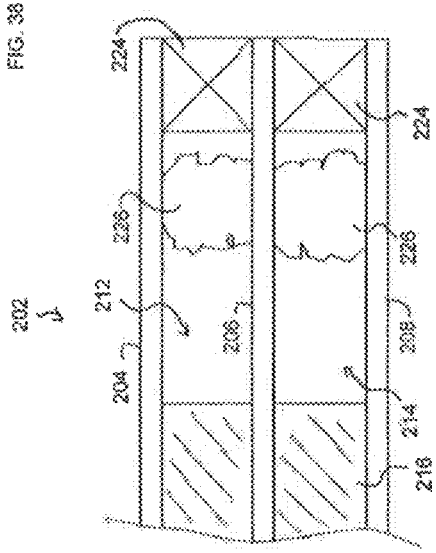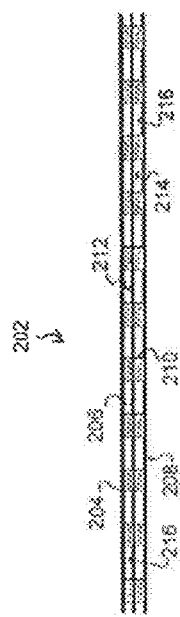

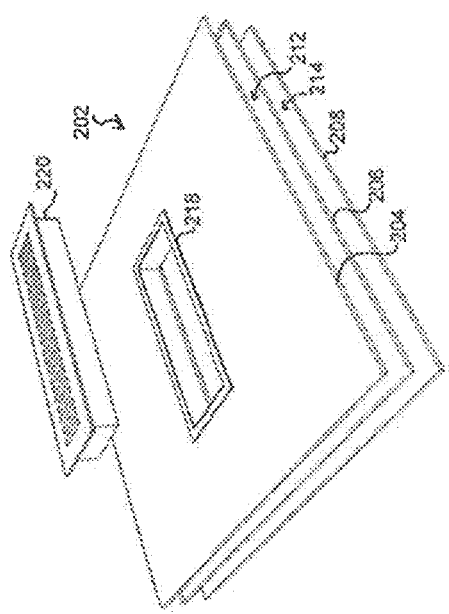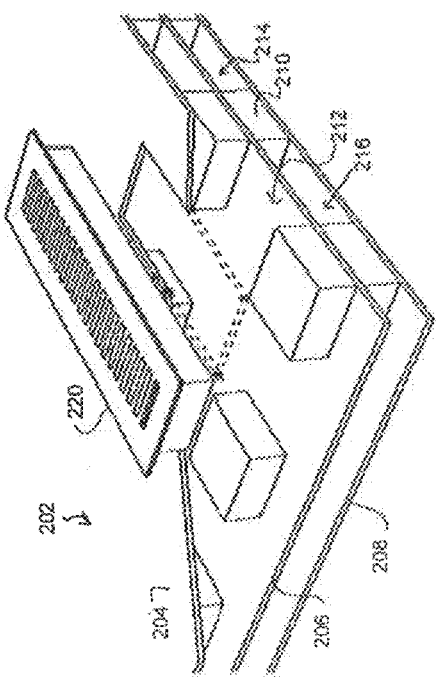

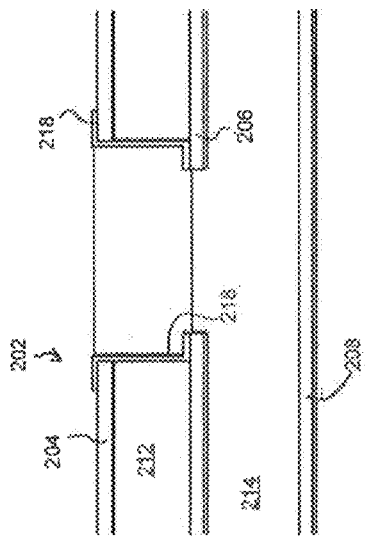
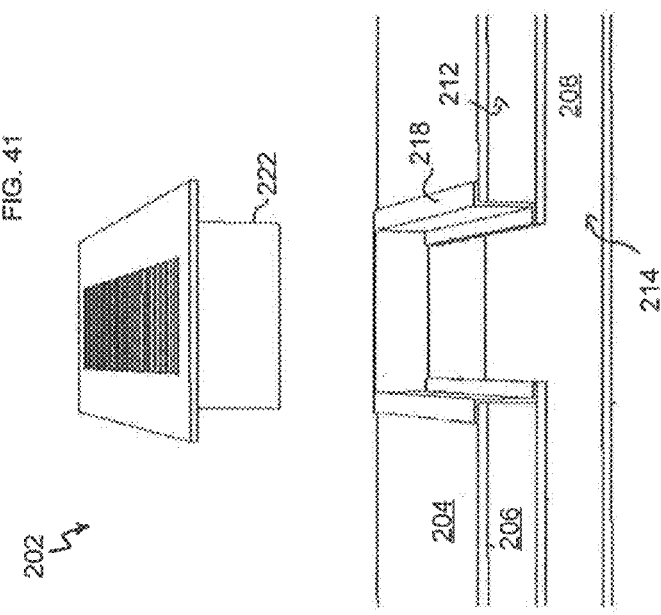

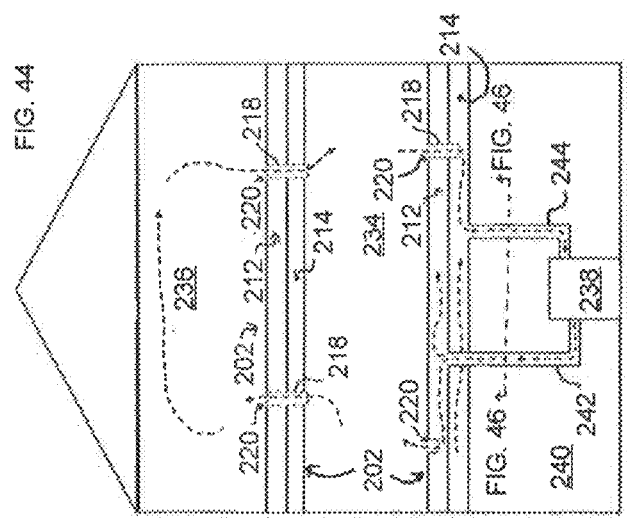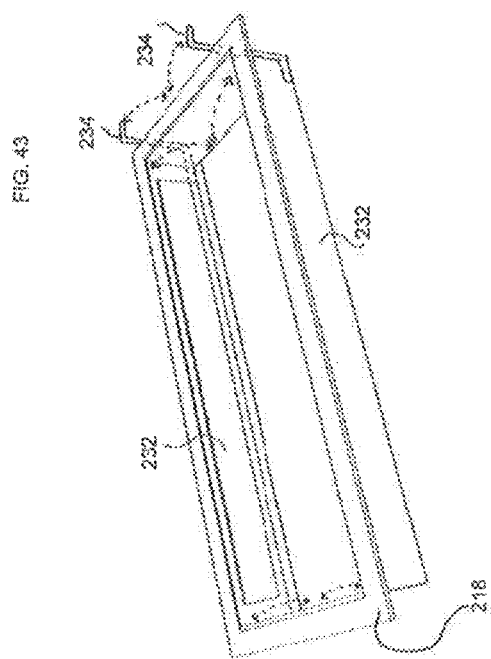

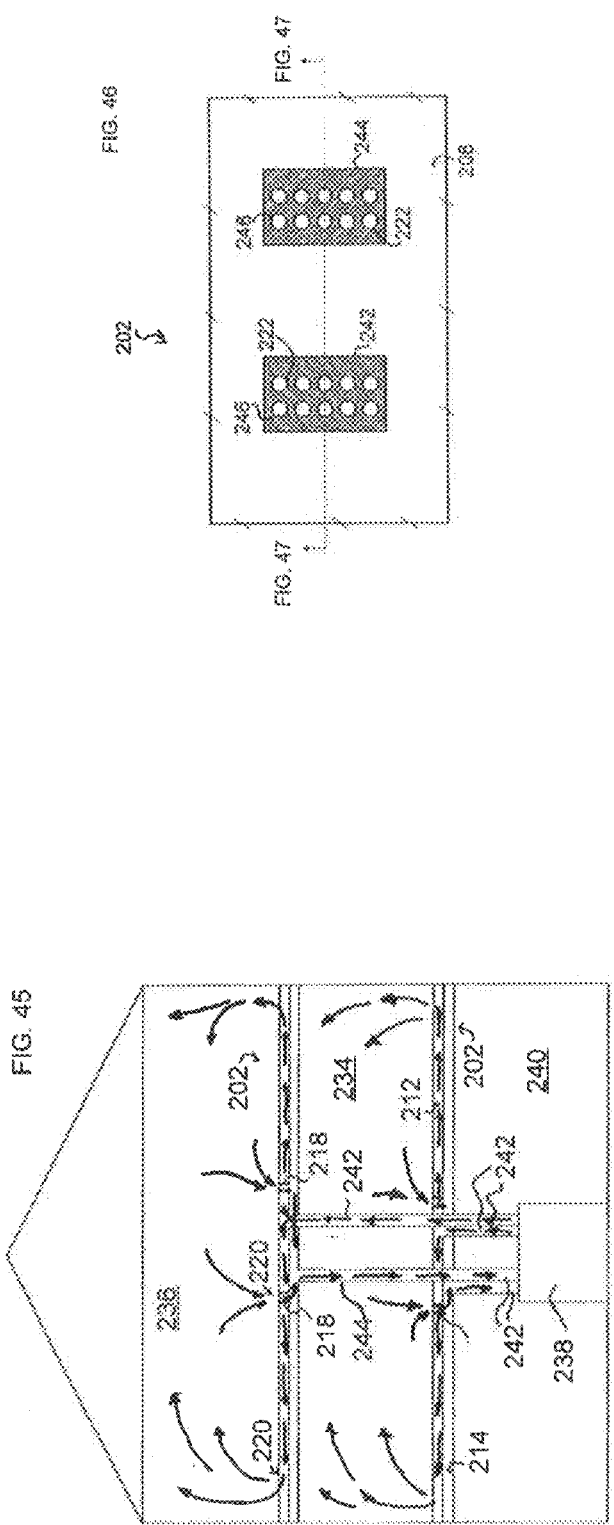

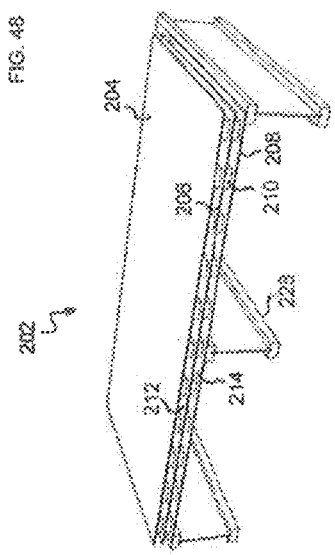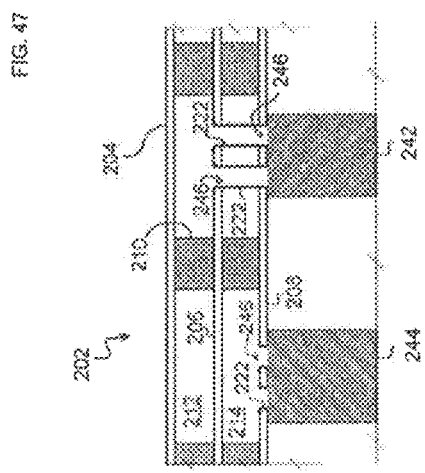

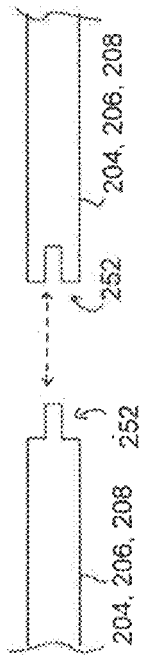
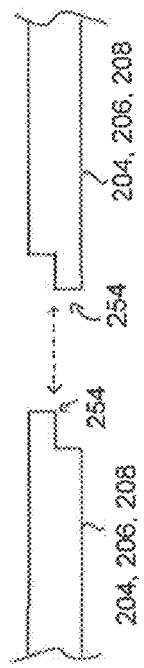
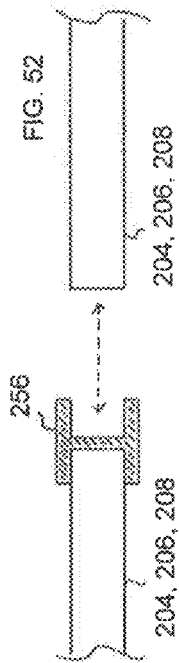
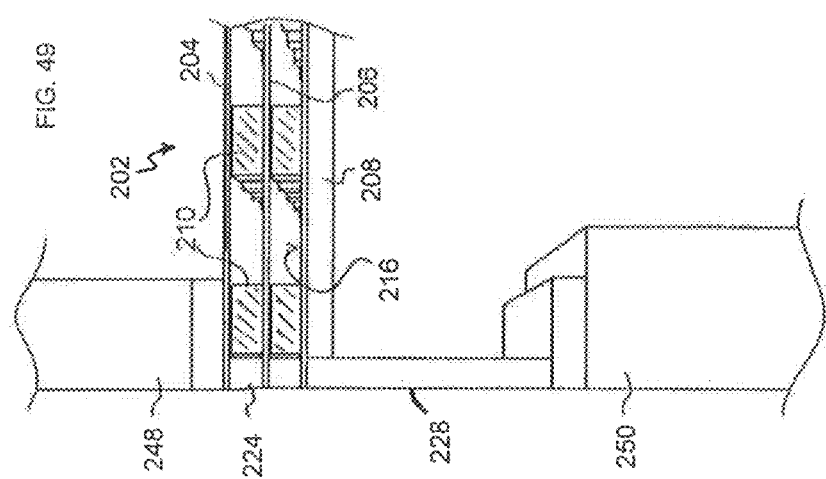

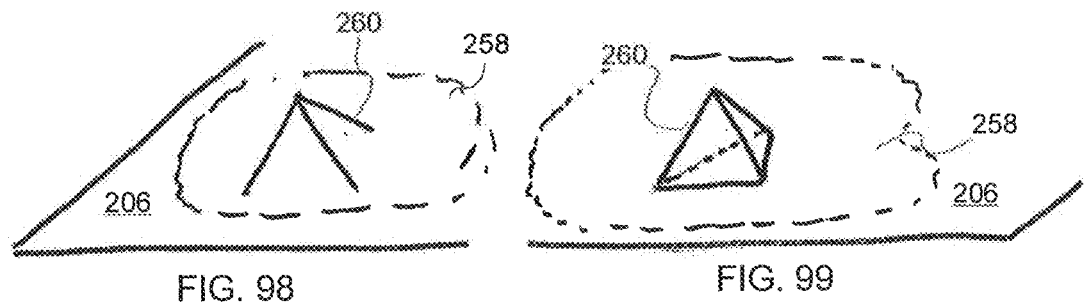
FIG. 98   FIG. 99
FIG. 63
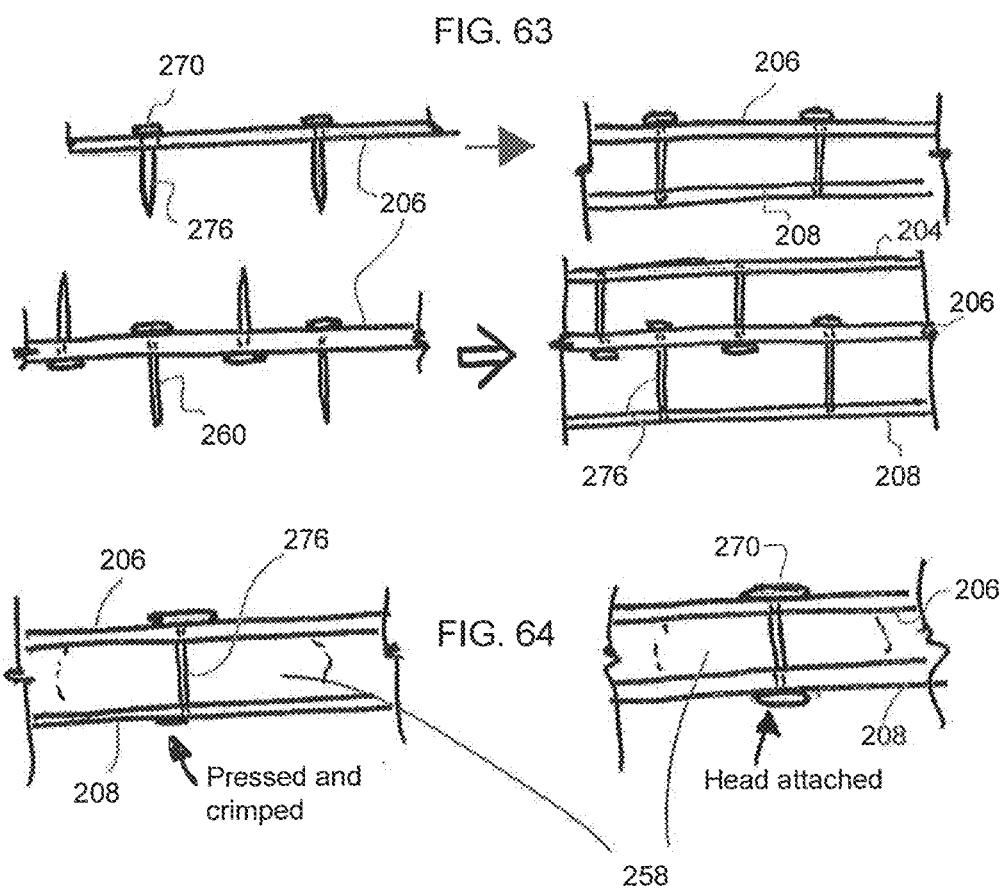
FIG. 64

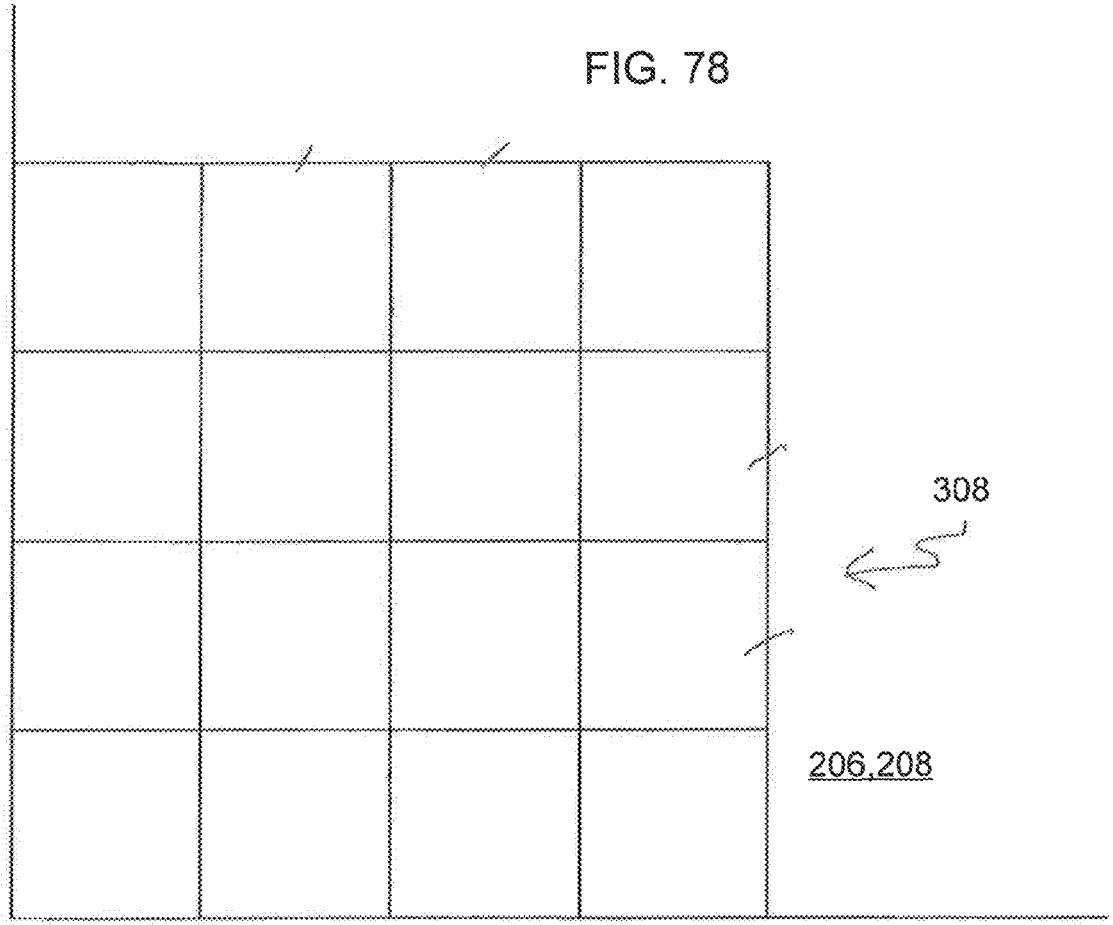

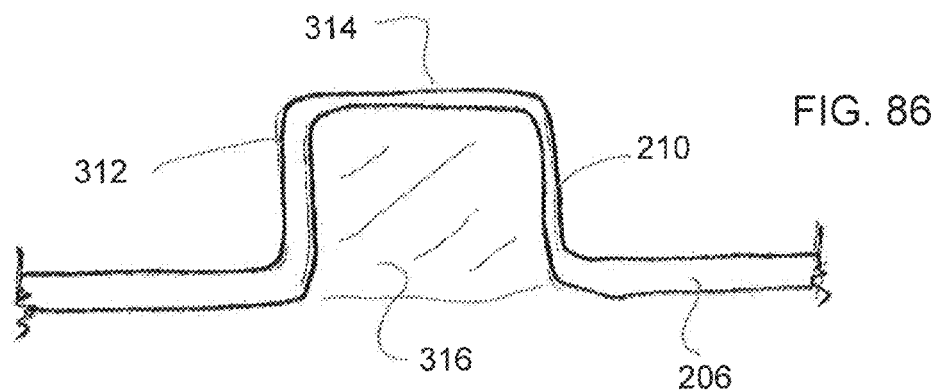
FIG. 86
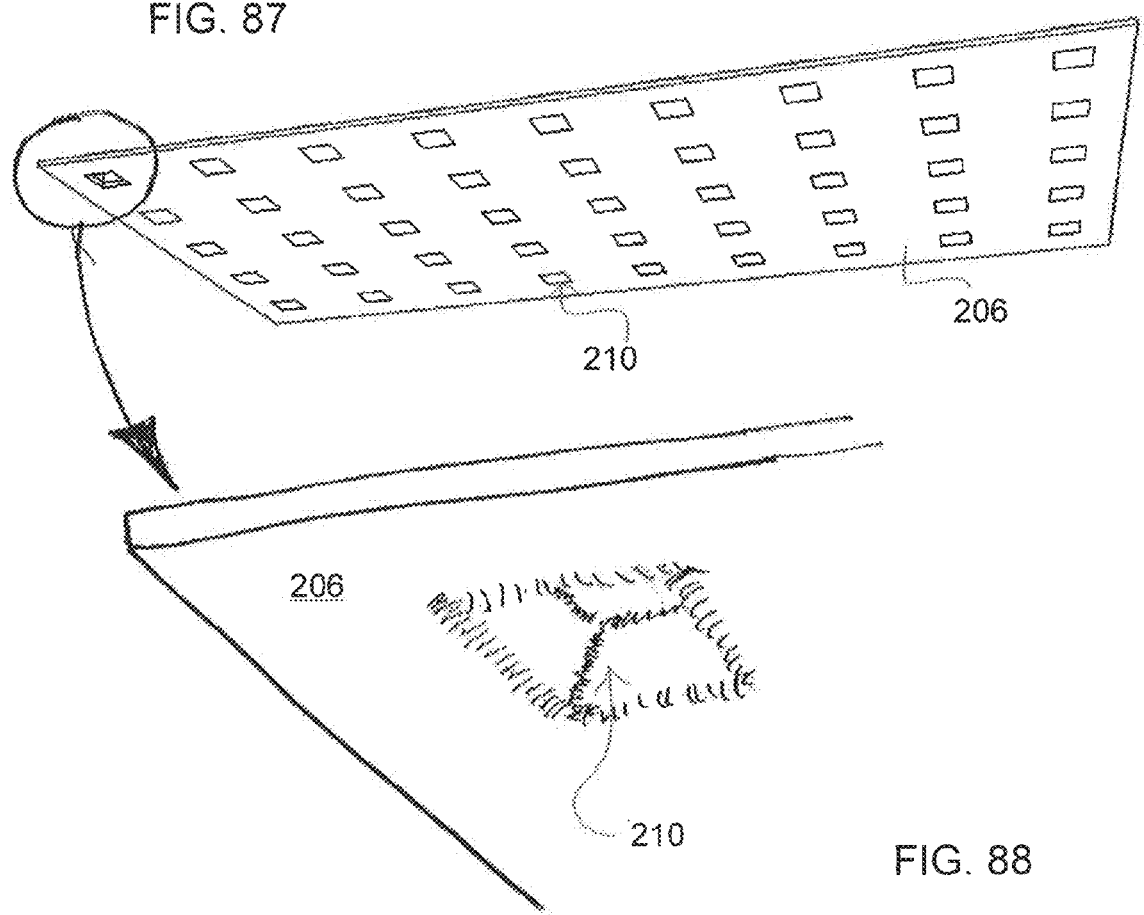
FIG. 87
FIG. 88

VENTILATED STRUCTURAL PANELS AND METHOD OF CONSTRUCTION WITH VENTILATED STRUCTURAL PANELS

PRIORITY

This application claims priority to U.S. patent application Ser. No. 13/782,406 filed Mar. 1, 2013, which is incorporated by reference as if fully restated herein. This application also claims priority to U.S. patent application Ser. No. 14/099,100 filed Dec. 6, 2013, which is Continuation-in-Part of U.S. patent application Ser. No. 13/539,919 filed Jul. 2, 2012, now U.S. Pat. No. 8,615,945 issued Dec. 31, 2013, which is a Continuation-in-Part of U.S. patent application Ser. No. 13/016,320 filed Jan. 28, 2011, now U.S. Pat. No. 8,534,018 issued Sep. 17, 2013, which is a Continuation-in-Part of U.S. patent application Ser. No. 12/987,832 filed Jan. 10, 2011, now U.S. Pat. No. 8,490,355 issued Jul. 23, 2013, which claims the benefit of U.S. provisional Patent Application Ser. No. 61/376,333, filed Aug. 24, 2010.

FIELD OF THE INVENTION

Residential and commercial sheathing for roofs, walls, floors, and ceilings.

BACKGROUND OF THE INVENTION

Sheathing is an essential component of any residential or commercial structure and provides structural support for roofs, walls and floors, as well as providing a surface of sufficient thickness and strength for the attachment of roofing materials such as asphalt shingles and metal roofing, siding materials such as wood clapboards or vinyl siding and flooring finishes such as tile, wood, hardwood, laminates, vinyls or carpets and the like.

Sheathing has traditionally been supplied in 4'×8' sheets, made of plywood or OSB, which provide a desirable modular size that can be handled by one worker. The means of attachment depends on the function, thickness and strength requirements of the application and may include mechanical fasteners such as nails or staples and/or adhesives. Roofs, walls, and flooring use sheets of similar sizes, though varied thickness.

Complex, costly, and non-commercially feasible systems have been proposed to incorporate in some manner ventilation systems into sheathing, but they lack the structural strength and other benefits of the present invention.

SUMMARY OF THE INVENTION

Wherefore, it is an object of the present invention to overcome the above mentioned shortcomings and drawbacks associated with the prior art by providing a ventilated structural panel that allows for ventilation out of and throughout a structure, while simultaneously providing a panel of substantially increased strength, formed of readily available construction materials, for small additional cost.

Another object of the present invention is to provide a ventilated structural panel comprising a first sheet, having edges that define a horizontal axis with a first horizontal edge and a second horizontal edge, and vertical axis with a first vertical edge and a second vertical edge. The panel additionally comprises a second sheet being of substantially the same planar dimensions as the first sheet and having edges that define a horizontal axis and vertical axis, with a first horizontal edge and a second horizontal edge and a first vertical edge and a second vertical edge; the first and second sheet being parallel in plane and preferably matched in at least one of the vertical axis and the horizontal axis. A plurality of spacing structural elements (also referred to as "structural spacing elements") fixedly attaches the first sheet to the second sheet, such that the strength of the combined panel is multiple times greater than the combined individual strength of the first and second sheet. The ventilated structural panel can be at least semi-permeable to the passage of gases and liquids and the first or bottom sheet of the panel could have one or more perforations.

The invention is an interlocking construction panel of the same size and approximate weight of conventional sheathing products that incorporates integral ventilation into the structure. The invention may be used as a conventional sheathing and is attached with the same mechanical methods of nailing and/or adhesives. It is cut and fitted in the same manner. It interlocks to provide continuity of strength and ventilation.

The panel is engineered such that it provides the same or superior strength of conventional methods of providing construction strength and ventilation, with fewer materials. The materials involved in the construction of the panel are relatively inexpensive and readily available.

The panels facilitate the use of a wide variety of insulation possibilities without the need for special consideration for ventilation, since the ventilation is integral with the panels. This is useful for common fiberglass as well as blown products such as fiberglass, Rockwool, cellulose and other products. This is especially useful for the new high performance spray foam expanding insulations that are becoming popular because of their high energy efficient performance and ability to seal infiltration, as the foams can break, plug or destroy conventional foam, plastic, or cardboard ventilation products, or intrude into the seams.

The panels could be combined with a multitude of construction materials and methods in the same way conventional sheathing is used today. The panels could be used with conventional soffit and ridge vents by cutting the sheathing on the panels for access to the ventilation cavity. Drip edges would have to have an extended leg to cover the side ventilation or it could be blocked with conventional trim.

The panel may be constructed sheets of commonly available 4'×8' sheathing of a thickness determined by structural and roof fastening requirements, but may preferably vary from ¼" to 1½" in thickness, and more preferably vary from ⅜" to ¾" in thickness. The top and bottom sheets may also vary in thickness.

The two sheets are attached to each other via the spacing structural elements, with adhesive and/or mechanical means such as nailing, stapling, screwing or machine impressed metal connections, so as to provide for the transfer of forces.

In essence, the two sheets function as the top and bottom chords of a truss or "I" beam providing superior strength, load carrying capacity, and resistance to deflection (stiffness). As a result, rafter or stud or purloin spacing may be increased where these panels are used, which would reduce material requirements, allowing the elimination of rafters and trusses with the greater spacing.

The spacing structural elements may protrude beyond two contiguous edges of the panel, and the spacing structural elements may be chamfered to enhance interlocking with adjacent panels. The spacing structural elements would likewise be indented on the two opposite contiguous edges.

Another embodiment of the invention is a panel comprised of two sheets of the same size (i.e., same area, but perhaps different thicknesses) connected to each other with a matrix of crossed spacing structural elements such that the combined entity is one structural panel. Ideally, the panel is the same size as conventional building sheathing, generally 4'×8', but can be of any size or thickness. The sheets are connected so as to be are parallel in plane and matched in the vertical axis, one on top of the other, such that they can be used in place of traditional sheathing materials currently used in building construction such as plywood sheathing, OSB sheathing and other composite sheathing materials.

In one embodiment, the panel includes a first and a second 4'×8' sheet of plywood, Oriented Strand Board (OSB), or a composite board of wood and/or plastic, each sheet having a thickness of ¼" to ¾" depending on the application. Roofs would usually consist of the two sheets measuring ¼" to ⅝" in thickness, depending on strength and span requirements and shingle attachment requirements, and whether the shingles are attached by staples or nails. Wall sheathing sheet thickness would also be of ¼" to ½" thickness depending on strength requirements. The top wear layer of the flooring panel will usually have a ½" to ¾" finish layer depending on strength requirements and floor covering.

Blocks may be used as the as the spacing structural elements, spacing the sheets ideally 1½" from each other. Blocks of a preferably of square or rectangular form, but the blocks could be of any shape or size, including circular, oval, regular polygons, and irregular shapes. The spacing can vary depending on the application and ventilation requirements—more spacing not only enhances ventilation and potentially increases the strength of the assembly, but would also require closer spacing of the blocks or spacers. While panels ionstructed with blocks would not have the degree of added strength as panels constructed of elongated members (discussed below), panels constructed of blocks would potentially be less expensive, and provide sufficient increased strength for construction with conventional 16 or 24 inch spaced of stud, rafter, truss, or joist is used.

The blocks are generally spaced from 1 to 12 times their own width apart horizontally and vertically. The specific spacing would depend on the sheet thickness and strength requirements. Blocks were found to only increase the strength of the panel, over the combined individual strength of the separate sheets comprising the panel, by approximately one half the amount of increase as panels utilizing rectangular shaped elongated members. But, using blocks does offer additional construction possibilities over rectangular elongated members due to the increased contagious space inside a panel offered by using blocks compared to using a matrix of elongated members. The blocks can be oriented on the same axis of the sheets or arranged on an angle of preferably 45°; but other orientations, such as 30° or 60°, are possible depending on the application. The angled orientation strengthens the plywood or OSB assembly.

Another embodiment of the invention uses spacing structural elements consisting of a matrix of rectangular shaped elongated members, preferably comprised of wood members with a square, cross section, arranged in layers, each layer oriented perpendicular to the next, and each layer interconnected to each adjacent layer or adjacent sheet with mechanical means and/or adhesives. The individual elongated members would ideally be of ¾"×¾", but could be larger or smaller. The individual elongated members would ideally be long enough to stretch from one edge of a sheet to another—this required length varying depending on the orientation of the elongated member.

The individual elongated members would be aligned in layers and spaced, parallel, apart from one another preferably between 1 to 18 times the thickness of the elongated member, or ¾" to 13.5 inches for elongated members with cross sections measuring ¾"×¾", and more preferably between 5 and 16 times the thickness of the elongated member, and most preferably between 8 and 12 times the thickness of the elongated member. In another embodiment, each elongated member preferably measures between 0.25 and 1.50 inches in height and between 0.25 and 1.50 inches in width, more preferably measures between 0.5 and 1.0 inches in height and between 0.5 and 1.0 inches in width, and most preferably measures between 0.7 and 0.8 inches in height and between 0.7 and 0.8 inches in width. The matrix of elongated members could consist of two layers perpendicular to each other or of multiple successive perpendicular layers. The matrix can be attached to the sheets either parallel to the sheet axis or on an angle. If an angular orientation is used, the elongated members will be ideally oriented 45° to each axis of both sheets, but other orientations such as 30° or 60° are possible depending on the application. The length of the elongated members would be of a length that they stretched from a first edge of a first sheet, to a second edge of the first sheet. Chamfered elongated members would preferably measure the "edge to edge" length of a sheet, but would be shifted in the direction of the chamfered end. This would allow for the terminal chamfered end of a given elongated member to extend into a mating indented end on an abutting panel, while simultaneously allowing room for a chamfered end on an opposing abutting panel to mate with the indented end of the given elongated member. For example, chamfered mating elongated members would measure 48 inches and 96 inches in an orientation parallel to the sheet axis, and chamfered mating elongated members with a 45° orientation would measure approximately 69 inches or 137 inches respectively at the greatest measurements.

In another embodiment, the indented end of an elongated member can have a concave face that will accept all or a portion of the chamfered end of a mating elongated member. In such an embodiment, the total length of the elongated member would preferably be extended by the length in which the chamfered end recesses within the concave portion of the indented end. In the manufacturing of the panels, the elongated members may initially be secured to the sheets at lengths greater then required, and then be trimmed to finished length at a later point in the manufacturing process.

The spacing structural elements can also be constructed of elongated members comprised of a plurality of plywood veneers, each veneer being typically ⅛" thick. This plywood matrix would be built up by multiple layers of veneered elongated members, each veneered elongated member being ideally ½" to ¾" thick and spaced from ½" to 4" apart. The plywood matrix would consist of a first layer of similarly shaped and parallel aligned veneered elongated members, followed by one or more additional layers laid perpendicular to the first and/or immediately preceding layer, until a multi-layer plywood matrix of desired thickness is assembled. The veneered elongated members would be attached with adhesives. The resulting plywood matrix can be attached to the sheets either parallel to the sheet axis or on an angle. If an angular orientation is used, the veneered elongated members will be ideally oriented 45° to each axis of both sheets, but other orientations such as 30° or 60° are possible. The length of the veneered elongated members would be similar to that of the non-veneered elongated members above depending, depending on the angle of the orientation of the members to the axis of the sheets, and whether or not the veneered elongated members were chamfered.

In all cases, including spacing blocks and elongated members, the spacing structural elements can protrude on two contiguous edges and be chamfered to enhance interlocking with adjacent panels. The spacing structural elements can be similarly matingly indented on the two opposite contiguous edges. The extension is normally less than or equal to 1 inch and ideally between ½" to ¾". Additionally, the elongation and indentation may be modified to provide for both contiguous mating of adjacent panels and a spacing gap between adjacent panels of between 0.0625 inches and 0.25 inches. For example, the elongated members length could be increased by, for example, ⅛ inch, or the indentation could be reduced by ⅛ inch, or both, such that the elongated members may mating abut, but the neighboring first and second sheets would be spaced between 0.0625 inches and 0.25 inches apart.

The panels with all attributes herein described can also be manufactured similarly to plywood except that the two exterior sheets are instead separated by a plurality of elongated members that are spaced apart and, in layers, are laid on to one another perpendicular to each other to permit the passage of air and the transfer of forces. These elongated members function as the spacing structural elements. The number of elongated members can vary as can the thickness of the elongated members, the width of the elongated members, the spacing of the elongated members and the orientation of the elongated members, for instance, some may be oriented on an or arranged in the same axis of the sheets.

In all cases where there are matrices of elongated members acting as the spacing structural elements, there may be one, two, three, or four layers of elongated members, and where veneer elongated members are used, up to twelve layers may be used. Each additional layer potentially adds cost and weight, but also potentially adds strength.

The apparatus may include three layers of elongated members, with two layers perpendicular to one another and diagonally oriented to the axis of the sheets, and one layer perpendicular to an axis of the sheets. The apparatus may include three layers of elongated members, with two layers perpendicular to one another and each perpendicular to an axis of the sheets, and one layer diagonally oriented to the axes of the sheets. The apparatus may include four layers of elongated members, with two layers perpendicular to one another and each perpendicular to an axis of the sheets, and two layers perpendicular to one another and diagonally oriented to the axes of the sheets. The apparatus may include three or four layers of elongated members, with each layer oriented perpendicular to the next, and all layers either perpendicular to an axes of the sheets, or all layers diagonally oriented to the axes of the sheets.

In one embodiment, the individual sheets for each panel are spaced equally apart from each other in parallel planes and in the same vertical axis, ideally at a distance of 1½" from each other, with a matrix of spacing structural elements or members arranged in a cross hatch pattern between the two sheets. The matrix of members would ideally consist of a first layer of elongated members, each parallel, coplanar, and spaced equally from one another, the first layer being perpendicular to a second layer of elongated members, each parallel, coplanar, and spaced equally from one another. Each elongated member would generally have a square cross section and would extend in length from one side of the panel to another. For a perpendicular arrangement to the panels, where the panels are spaced at 1½" apart, this would require members of ¾" square faces with lengths of 48" and 96", or, if chamfered, longer, depending on the length of the chamfer.

A layer of screening (e.g., fiberglass, aluminum, plastic) could be affixed between the first and the second layers of elongated members. This would aid in adhesion and/or fastening of elongated members, and would facilitate the running of wires through the interior of the panels.

The elongated members are generally spaced apart from a neighboring elongated member in the same layer from 1 to 12 times their own width, more preferably 3 to 9 times their own width, and most preferably 5 to 7 times their own width. The specific spacing would depend on the sheet thickness and strength requirements.

For rooting sheathing, the top layer would preferably be laid in the long horizontal direction, and have a length of 96 inches, with a repeat of 5⅝" for shingle attachment if using nails for shingles and the object is to nail into the elongated member. The panel faces could be stamped, painted, or otherwise visibly marked with the orientation of the underlying matrix for ease of use by the workman.

The elongated members would usually be oriented perpendicular to one another on the same axis of the sheets but other orientations are possible depending on the application. Testing indicates that the perpendicular orientation significantly strengthens the plywood or OSB assembly more than any other orientation, allowing the use of thinner exterior sheets. Tests have demonstrated that a strength increase in bending stiffness for an assembly of two ¼ inch sheets, with a perpendicular matrix of two layers of ¾"×¾" elongated members spaced 5 inches apart, has a bending strength approximately 10 times greater than a single sheet of ½" of plywood alone.

The elongated members of the matrix can consist of square members made of wood, wood composite, plastic, or similar material, arranged perpendicular or close to perpendicular for an offset matrix, and interconnected to each other with mechanical means and/or adhesives.

The individual matrix members would ideally be ¾"×¾" square, and long enough to extend beyond the panel edge. The size of the elongated members could be larger or smaller and long enough to complete the required matrix of the sheets, which depends on the orientation, and extend to or beyond one edge. Spacing would be 1 to 12 times the thickness of the elongated member or ¾" to 9 inches. The matrix of "elongated members" could consist of two layers perpendicular to each other or multiple layers. The matrix can be attached to the sheets either parallel to the sheet axis or on an angle of 45°, but other orientations are possible depending on the application. In all cases, a provision is made so that the panels interconnect structurally.

For the matrix of elongated members, the elongated members may be indented preferably between ¼" and ⅝" and more preferably between ⅜" and ½" on two contiguous sides, while the other two sides would be extended by between preferably ¼" and ⅝" and more preferably between ⅜" and ½" with an end member. Additionally, the length of the elongated members could be between ¼" and ¾" longer than the sheet on two contiguous sides to machine a tongue and groove attachment.

In all embodiments, the spacing structural elements can protrude on two contiguous edges and may be chamfered to enhance interlocking with adjacent panels. The spacing structural elements would be similarly indented on the two opposite contiguous edges. The extension would normally be no more than 1 inch and would ideally be between ½" to ¾".

Additionally, the one or both sheets can be manufactured from plastic materials. These plastic sheeted panels could be used for waterproof applications such as for roofing or basement wall applications, with one or both sheets providing a barrier to liquid water and/or water vapor. The joints would be waterproofed with an application of waterproof mastic or tape. The panels could be combined with a multitude of construction materials and methods in the same way conventional sheathing is used today. Further, a top sheet of one panel may be extended in length and attached such that it overlaps a top sheet of an abutting lower adjacent panel by approximately two to four inches.

The panels could also be manufactured with a perforated bottom sheet to facilitate ventilation into the panel matrix. The perforations would ideally be round in shape, sized ¼" to 1" in diameter, and arranged in a matrix that is ideally staggered from the adjacent holes with a spacing of 4 to 12 diameters in widths. A layer of screening (e.g., fiberglass, aluminum, plastic) could be affixed along the interior or exterior surface of the perforated sheet. The perforations allow for the exhausting of heat, gases, and moisture in attics and non-living spaces. The holes should be such that the panel can still transfer necessary tensile and compressive forces. Both solid and perforated panels can be used together in building assembly, such as a roof.

The panels can facilitate the use of a wide variety of insulation possibilities without requiring special consideration for ventilation since the ventilation is integral with the panels. This is useful for common fiberglass as well as blown products such as fiberglass, Rockwool, cellulose and other products. This is especially useful for the new high performance spray foam expanding insulations that are becoming popular because of their high energy efficient performance and ability to seal infiltration.

The panels can be used in both residential and commercial construction. The panels can be used both for on site installation and for factory built modular homes. The panels would be useful for manufactured homes and trailers.

To facilitate construction, the exterior of one or both sheets could be marked with exterior lines showing the location of the interior elongated members. The exterior facing sheet could also be of waterproof construction and made of waterproof material, such as some form of plastic, providing for the exposed layer of roofing or wall covering. The top sheet could be sized larger than the bottom sheet such that a top sheet of a first panel would extend to overlap a top sheet of an adjacent, and preferably vertically lower, panel.

In addition to wall and roof sheathing, a flooring system of the ventilated structural panels as described would have many benefits. Increased structural strength, spanning capability and reduced deflection, all of which would result in less materials needed for supports (joists or trusses or composite joists) and better performance in terms of strength and stiffness. A properly engineered panel could be used for flooring providing a plenum for air distribution providing warmed and cooled air to be distributed within the floor. The warmed air would be a desirable characteristic in bathrooms. A properly engineered panel could be used for flooring providing a plenum for electrical distribution where wires and data communication cables could be easily run. A properly engineered panel could be used for flooring to provide a plenum for radiant heat or forced hot air heat. In this case, one interior surface would generally receive a layer of reflecting material and the spacers would have to be mechanically connected. A properly engineered panel could be used for flooring providing a plenum for plumbing distribution where pipes, tubes and conduits of proper size could be run. Finally, a flooring system with this panel construction is naturally quieter than one sheet of sheathing, providing a nose buffer. This noise buffering benefit would also apply to walls and roofing.

This panel offers three main simultaneous advantages of ventilation, ease of use, and significantly increased strength. First, these panels offer ventilation both through the panel sheets and between the panel sheets. In this way, the panels may remove moisture and gasses passing through an interior facing sheet, and exhaust them via the continuous air channel created between the sheets by the spacing structural elements. This air channel will be approximately the width and height of the combined width and height of any contiguous surface formed by the ventilated structural panels being attached contiguous with one another. Such a large air channel can provide for dramatically increased air flow over the interior facing sheet, and thus dramatically increased ventilation between the interior and exterior—even if only passively. A particular advantage this offers is for roofing situations in colder climates to assist in avoiding ice dams.

A ventilated structural paneled roof provides for ventilation of moisture and gasses from the house, and allows a flow of cold air along the entire roof surface, in the interior of the panels, to prevent the formation of ice dams. A ventilated structural paneled roof allows for the entire roof to remain cold in the winter, preventing snow from melting and ice dams from forming. Any heat that migrates into the ventilation plenum is exhausted to the outdoors and does not melt the snow on the roof. Similarly, ventilation of a wall surface provides the same benefits noted above. Ventilation in warm climates or during warm months can exhaust hot air from the attic space, extending the life of roofing materials and reducing cooling costs. Also, the inventive panels can typically achieve ventilation of at least 1/50, when compared to free, unobstructed end area, greatly exceeding many code requirements.

Second, the structural connection between the two sheets of material interconnected with spacing structural elements with adhesive and or mechanical means to transfer shear forces provides that the entire entity becomes a synergistic structural panel with characteristics that exceed the strength of the individual parts. The top and bottom sheets act like the flanges on a beam or truss and provide better load carrying strength, increased span capability and less deflection than the individual sheets together. Preliminary tests indicate that an assembly of two ½ inch sheets of plywood spaced with ¾ inch blocks is 4 times stronger than just one sheet of ½ inch plywood alone, and two ¼ inch sheets of plywood spaced with a matrix of two ¾" by ¾" members can be 10 times stronger than just one sheet of ½ inch plywood alone.

This extra strength can be used advantageously to increase the load capacity or the length of the unsupported span of the panel, which reduces the required number of underlying supporting rafters, studs, joists, trusses or purloins, and thus cost of building.

The spacing structural elements material, size, arrangement, thickness, shape and orientation can vary with the application and be adapted to the specific need of the application.

The plurality spacing structural elements may be arranged such that a number of linear pathways are created. Each pathway's dimensions are limited by the dimensions and arrangements of the spacing structural elements. Utilizing blocks, the pathways may measure in height the full distance separating the first and the second sheet; the width measurement is dependent on how far apart the blocks are spaced from one another. Utilizing two layers of elongated members, the height of the pathways will measure approximately one half of the distance that separates the two sheets. Like the blocks, the width of the pathways formed with elongated members will be equal to the distance separating two neighboring elongated members in the same layer. When the two layers of elongated members are arranged perpendicular to each other, the pathways will also be orthogonal. Each pathway allows air to move along each pathway unobstructed from at least one edge of the panel to at least one opposite edge of the panel.

The spacing structural elements can protrude on two contiguous sides with chamfered edges. The extent of the protrusion could be matched by an indention of the spacing structural elements on the opposite contiguous two edges which would provide for interlocking of panels. This interlocking of panels would provide structural continuity, increasing structural integrity and minimizing discontinuous deflection and buckling.

Third, the panel offers significant advantages as to ease of use. Since the panel is assembled from readily available building materials, it is familiar to the designers, suppliers and trades in terms of size and weight. It can be cut, sized and attached in the same manner of conventional sheathing. No special tools or skills are needed. No special orientation is needed to ensure the continuity of ventilation, except that the interlocks should be maintained for increased structural integrity. Ventilation is maintained without any special considerations or the use of any special additional materials, except insect and moisture blocking at the exposed edges.

In another embodiment, the panels can also be constructed as two sheets separated by a single layer matrix as described in paragraph 28. The matrix members can consist of wood, plywood, OSB, medium-density fiberboard (MDF), other wood composites, plastic or other materials and shaped in a rectangular or most likely square profile and extending either the length in the longitudinal direction or the width in the perpendicular direction. Said matrix can be extended on two contiguous edges and chamfered and indented on the opposite two edges to facilitate interlocking as previously described.

The members would be placed parallel to each other and fastened to both the top and bottom panels with adhesives and/or mechanical means. The spacing between members would be from 2 times the thickness an individual matrix member to 16 times the thickness, but ideally from 4 times to 12 times.

The single layer panels could also have pertorations as previously described. The perforations would ideally be round but could also be other shapes such as oblong, oval, square or rectangular or a combination of geometric shapes such as square with rounded corners.

The single layer panels would be usefill for wall sheathing applications where the strength of the perpendicular matrix may not be as important or for some flooring applications. The panels may be used for decorating concrete formwork. The orientation of the single layer matrix may be either longitudinal, lateral, or diagonal depending on the specific application.

In an additional embodiment, the panel may be comprised of simply one sheet of panel with a matrix of members, without a second sheet. It could be constructed of plywood, OSB, MDF or other materials such as plastic or other composite wood material. In a further additional embodiment, the matrix of spacing structural elements can also be manufactured integrally (also termed unitary) with the panels in either OSB or Plywood or other materials such as MDF, plastics or other wood composites.

Manufacturing integral spacing structural elements, including the matrix of elongated members, would eliminate the need to separately attach the elongated members to each sheet.

Integral raised members would serve as the matrix of elongated members. Two similar sheets may have integral elongated members formed longitudinally in a first sheet and laterally in a second sheet. The two sheets would then be joined together by adhesives and/or mechanical means, with the matrix members in contact with one another. The finished flat panel surface would be exposed on the top and bottom. An alternative arrangement would provide for the integral raised members to be formed at angles to the edges of each respective sheet. Preferably the integral raised members on the first sheet would be formed such that, when they are mated with the integral raised members on the second sheet, the integral raised members of the first sheet will be perpendicular to the integral raised members of the second sheet.

The same characteristics regarding the size, shape and spacing, and ranges therein, of the individual integral elongated members would be as the elongated members previously described.

In producing panels utilizing integral raised elongated members, plywood sheets, for example, could be manufactured with a plurality of raised ridges or strips. The raised ridges or strips would function as the integral elongated members. Two sheets would then be attached to each other with adhesives and/or mechanical means via the plurality of integral elongated members, preferably with the integral elongated members of each sheet in perpendicular orientation to the other respective sheet. These panels could also be manufactured from OSB, medium density fiberboard, or other wood composite materials or plastics. These panels and the sheets and integral elongated members could be manufactured in multiple steps, or in a single step. The integral members could be added during the panel production, or material could be removed after production to leave the plurality of elongated members, or the sheet and members could be formed substantially simultaneously, including with a mold.

The integral raised elongated members could be made during the panel manufacturing process with special tools, equipment, rollers, molds and other such means as necessary. The shape of the integral raised member could take many shapes depending on the tooling, rollers, presses, machinery and other factors, including flat or round tops, sharp or rounded edges, and flattened or rounded sides. They could have rounded chamfered corners with or without a flat top, they could have angled chamfered corners, they could be rectangular or square in shape.

The integral raised members could be either manufactured simultaneously with the sheets or could be shaped by removing material after manufacturing a sheet of extra thickness, to accommodate the finished thickness and integral raised member. Applications of the panels utilizing integral spacing structural elements would include roofing, flooring, and siding for residential and commercial construction.

The panels with integral matrices' could be manufactured out of Plywood, OSB, MDF or other similar material, including plastics.

The panels with integral matrices' could also have perforations as previously described. The perforations would ideally be round but could also be other shapes such as oblong, oval, square or rectangular or a combination of geometric shapes such as square with rounded corners.

A further embodiment utilizing integral spacing structural elements would utilize the first sheet utilizing spacing structural elements, and a second sheet without integral spacing structural elements. In this embodiment non-integral spacing structural elements can also be used to attach the second sheet to the integral spacing structural elements of the first sheet to the second sheet.

A still further embodiment utilizing integral spacing structural elements would utilize both the first and the second sheet, each with integral spacing structural elements, being connected to one another via non-integral spacing structural elements.

Yet another embodiment utilizing integral spacing structural elements involves manufacturing the panel such at that the location where the integral members of the first sheet contact the integral members of the second sheet, there is provided that at least one first integral member of the first sheet may enter into a recess of at least one second integral member of the second sheet. The recess in the at least one second integral member functioning as a notch for the at least one first integral member to be received into. The at least one first and at least one second integral member could also be adhesively and/or mechanically joined. Additionally the least one first integral member may also be provided with a recess in which the at least one second integral member may enter. It is envisioned that the notched recesses may be provided only on the integrated members of one sheet, could be provided on the integrated members on both sheets. The notches could be provided uniformly on every elongated member one or both sheets, or could be staggeredly provided at alternating locations and/or on alternating integrated members on one or both sheets. It is also envisioned that this notch/recess arrangement could similarly be employed with non-integrated member embodiments.

This notch like interface between members of multiple layers of members may also be utilized for panels including non-integral spacing structural elements, such as those discussed above.

It should be noted, that the edges of the sheets on any panels in this application may be shaped with tongues on two contiguous edges and corresponding groves on the remaining two contiguous edges for interlocking of multiple panels, and/or interlocked with the indented and overlapped spacing structural elements arrangement described in paragraphs above.

It should also be noted a number of different arrangements are contemplated in which spacing structural elements create unobstructed pathways for air to move through the panel, from at least one edge of the panel to at least one of an opposite and an adjacent edge of the panel. The height of the unobstructed pathways will normally be equal to the height of the members. The width of the pathways will normally be equal to the spacing between adjacent members of a common layer. The number of parallel unobstructed pathways created in the panel for air to move in any one direction will preferably range from between 1 and 30, more preferably between 2 and 25, even more preferably between 4 and 20, yet even more preferably between 5 and 19, and most preferably between 6 and 12. If the elongated members were spaced at approximately 16 inches on center, the pathways could be approximately 15 inches in width. Similarly, if the elongated members were spaced at approximately 24 inches on center, the pathways could be approximately 23 inches in width. In such a way it is achievable to have at least between two to three unobstructed pathways in a first direction, and between four and six unobstructed pathways in a second, preferably perpendicular direction, each measuring approximately ¾" in height and 15" to 23" in width. It is also achievable to have at least between four and ten unobstructed pathways in a first direction, and between eight and twenty unobstructed pathways in a second, preferably perpendicular direction, each measuring approximately ¾" in height and 4" to 12" in width.

It should also be noted that the spacing structural elements, and in particular the elongated members, can be formed in specialized shapes to convey additional qualities to the spacing structural elements, and thus the panels. Some specialized shapes include non-perforated and perforated I-beam, truss, skip truss, honeycomb, and corrugated shaped engineered matrix members.

It should further be noted that the invention will preferably be configured in one of the four ways following ways. First, a panel could be configured as a single sheet with a single layer of elongated members attached to the sheet, the elongated members arranged parallel with one another, and parallel with one axis of the panel and perpendicular to the other axis. That is, the elongate members could be arranged parallel to a long axis or a short axis of the sheet. In a second panel configuration, a single layer of members, as described in the first alternative, may be arranged between and connected to two sheets. Third, a panel could be configured as at least a double layer of elongate members attached to a single sheet, with each layer of elongate members arranged perpendicular to each adjacent layer of elongate members, at least one layer arranged parallel to one of a long or a short axis of the single sheet, and the elongate members being attached to one another where the multiple layers of elongate members intersect. Fourth, an at least double layer of elongate members, as described in the third alternative, may be arranged between and connected to two sheets.

To reiterate, the panels, and their constituent sheets and spacing structural elements, can be constructed or made from porous or non-porous wood, cellulose or other organic material, composite, ferrous, metallic, plastic, or any other material that can be shaped into a flat sheets and/or the spacing structural elements. The top and bottom sheets and the spacing structural elements can each be of different materials and thicknesses. The top sheet can be waterproof and the bottom sheet can be perforated to facilitate ventilation.

It should further also be noted that the panel typically has an empty volume of approximately 70%, but can range from 40% to 90%, or preferably from 50% to 80%, or more preferably from 65% to 75%, depending on sheet thickness and spacing structural element size, shape, and placement.

The panels may have a clear, unobstructed airflow of approximately 30% of the area of the end of any panel assembly, but can range from 10% to 60%, or preferably from 20% to 50%, or more preferably from 25% to 40%. With the use of special engineered matrix members, discussed in further detail below, the clear, unobstructed airflow can be up to around 75%, but can range from 65% to 85%, or more preferably from 70% to 80% of the end area of the panel assembly.

The clear unobstructed airflow on a panel with solid matrix members of a range from approximately $\frac{1}{50}$ to $\frac{1}{70}$ when comparing free, unobstructed end area with panel coverage. This depends on roof slope, matrix member size and spacing. Some building codes require ventilation of $\frac{1}{300}$, and some codes are contemplating requiring or recommending ventilation of $\frac{1}{150}$. The inventive panels could provide 6 to 12 times greater ventilation performance.

A further object of the present invention is to provide a multi-plenum structural panel comprising a top sheet, a middle sheet, and a bottom sheet, each sheet having a first horizontal edge and a second horizontal edge, and a first vertical edge and a second vertical edge, all three sheets being parallel in plane, and all three sheets having at least one of both vertical edges and both horizontal edges aligned along a same plane; a first plurality of spacing structural elements, fixedly attaching the top sheet to the middle sheet, and a second plurality of spacing structural elements fixedly attaching the middle sheet to the bottom sheet, such that the yield strength of the combined multi-plenum structural panel is greater than the combined individual yield strengths of the top, the middle, and the bottom sheets; an upper plenum defined by a spacing between the top or first sheet and the middle or second sheet; a lower plenum defined by a spacing between the middle or second sheet and the bottom or third sheet; the plurality of spacing structural elements being formed such that a plurality of unobstructed pathways are created in each plenum for air to move from at least one edge of the multi-plenum structural panel to at least one of an opposite and an adjacent edge of the multi-plenum structural panel.

A yet further object of the present invention is to provide a method of constructing a building including one or more multi-plenum structural panels comprising a top sheet, a middle sheet, and a bottom sheet, each sheet having a first horizontal edge and a second horizontal edge, and a first vertical edge and a second vertical edge, all three sheets being parallel in plane, and all three sheets having at least one of both vertical edges and both horizontal edges aligned along a same plane; a first plurality of spacing structural elements, fixedly attaching the top sheet to the middle sheet, and a second plurality of spacing structural elements fixedly attaching the middle sheet to the bottom sheet, such that the yield strength of the combined multi-plenum structural panel is greater than the combined individual yield strengths of the top, the middle, and the bottom sheets; an upper plenum defined by a spacing between the first sheet and the second sheet; a lower plenum defined by a spacing between the second sheet and the third sheet; the plurality of spacing structural elements being formed such that a plurality of unobstructed pathways are created in each plenum for air to move from at least one edge of the multi-plenum structural panel to at least one of an opposite and an adjacent edge of the multi-plenum structural panel, the method comprising the steps of supporting the mass of one of an interior and exterior wall with the multi-plenum structural panel; and connecting one of an air heater and an air conditioner in a fluid tight connection with the at least one of the upper and the lower plenums.

An additional embodiment of the ventilated structural panels can consist of a multi-layered or multi-plenum panel consisting of two plenums, constructed out of three sheets of material separated by spacing structural elements of preferably blocks. One plenum would supply treated, heated, cooled, humidified, dehumidified, or otherwise conditioned air while the other plenum would provide the return air to be conditioned. The original design of the multi-plenum panels provides at least two distinct and significant benefits—inexpensive multi-location air supply and return, and much greater strength and structural integrity for subflooring.

Floor sheathing in residential homes is usually a ⅝ or ¾ inch thick plywood or OSB panel supported on joists or engineered lumber joists which are usually spaced at 12 inches on center or 16 inches on center. By contrast, multi-plenum panels are much stronger than regular floor sheathing because its multi-layer design acts like a specialized "I" beam and can provide for long spans with better performance than standard sheathing.

The two cavities or plenums could allow for the distribution of conditioned air to the home or building. In the winter, warm air could be pushed into the upper plenum and tapped with vents in each room, as required, with a standard commercially available metal or plastic register placed into the upper plenum.

Return air would be tapped into the lower plenum by a special "plenum tap" system made of metal or plastic that penetrates the top and middle sheets and is fixed into the top and middle sheets with mechanical means and/or adhesives. The "plenum tap" is now ready to accept a standard, commercially available register.

The same procedure is used for providing cool air distribution, however, to prevent cold floors, the cool supply could be directed to the lower plenum while the return warmer air is directed through the upper plenum.

In one embodiment an extruded or deposited glob of uncured semi-liquid or foam substance is used as the spacing structural element. The glob would preferably be dispensed at various locations on the surface of the bottom or middle sheet, analogous to various placements of the spacing structural elements described above, but compositions with greater strength could be spaced farther apart.

The globs may be extruded alone, or may be used in conjunction with one or more inserts. The inserts can be shaped as spheres, boxes, rods, spikes, barricade shapes, barred, flanged, or spindle shaped, for example. The inserts can be three-dimensional shapes as in a sphere or a box, and can be hollow or solid. The inserts can have smooth outer surfaces, or can have protrusions lining their surface. The inserts serve multiple functions. First, they add structural integrity to the glob. Second, they can perform as spacers to prevent the two sheets on either side of the glob from pressing too close together. That is, they can mechanically define a minimum clearance between the two adjacent sheets. Also, protrusions or spikes on the surface of the inserts can aid in mechanical connection between two adjacent sheets to one another. The inserts can additionally be used without the globs, and function as the spacing structural elements themselves.

Though preferably 4×8 feet in measurement, as mentioned above, the sheets can be a variety of sizes. For example, larger sheets could be used and make larger panels in a first step, that could be cut down to 4×8 foot or 1×2 meter panels in a second step.

Depending on the different situations, the sheets used in the single or multi-plenum panels, that is the top, middle, or bottom sheets, could be made of be made of many and a variety of materials, including but not limited to: wood and wood fibrous materials; wood fiber panels; wood plywood panels; wood masonite material; plastic materials; fiberglass materials; carbon fiber materials, drywall, or some combination of thereof.

Composite sheets composed of a combination of materials could be made of fibers and some binding agent. Said fibers could be wood, cellulose, hemp and other plant materials such as cotton, man-made materials such as glass, plastics, metal, carbon, etc. The binding agent can be made of a variety of materials that have the qualities to bind fibers and cure with or without heat or other agents to a usable structural material with compressive and tensile strength capabilities.

The sheets can be layers of different materials. For example, the sheets can be composed of metal or have a metal layer. As another example, the bottom sheet can be drywall or a composite drywall panel where the bottom sheet is composed of the gypsum material placed on a wood or other substrate with tensile strength.

The sheets can be a variety of shapes depending on the use. For example, the sheets can be flat or corrugated or shaped for additional strength with geometric patterns. Also, for sheets of composite construction, corrugated materials can also be used to face the sheet.

The sheets can also have insulating properties beyond that of normal plywood or OSB sheets. The sheets can be made of insulating material, or be a composite sheet of an insulating material with one or more layers of surface materials (like metal or plastic) capable of providing the needed strength and performance. Additionally, any or all of the sheets may have a reflective radiant barrier applied to any surface to further aid in insulation.

To aid in microbial, rot, mold, mildew, and pest prevention, any or all sheets may have an anti-fungal, anti-mold, or other effective preventative treatment applied to any or all surfaces, including surfaces of spacing structural elements. Any wood sheet could be made of pressure treated lumber if condensation or an application against concrete is anticipated. Similarly, any or all sheets can have a painted or protective coating applied to any surface, depending on the need.

In one production embodiment, the single or multi plenum panels may be constructed with a 3D printing process, using a variety of available materials including fibrous compounds, plastics, carbon fiber, metal compounds, and other materials suitable for 3D printing applications. 3D printing can be utilized for the entire panel construction or for portions of the panels such as a sheet and the spacing structural elements, or any combination thereof.

The spacing structural elements can be made of a variety of materials and shapes and may include the following but not limited to: wood blocks in any shape and thickness; wood composite blocks in any shape and thickness; wood blocks cut from existing OSB and plywood products; solid plastic materials; adhesives of any type; foams, both closed and open cell; plastics, permeable materials including plastics and foams and adhesives; metal, and composites.

The spacing structural elements may be extruded, molded, cut, welded, pressed, glued, or punched, or otherwise formed.

The spacing structural elements may be spaced at various positions, in addition to those shown, as required for strength for various applications.

The spacing structural elements may be made of various shapes, including square, round, rectangular, triangular, elongate, tubular, truss like, honeycomb, corrugated shapes, and of various thicknesses. These include tubes of round, square or rectangular shapes, and hollow extrusions.

Where the shape of the spacing structural element has an orientation, like tubes, it can be oriented with the shape (e.g. tube) axis perpendicular to the sheet, or with the shape axis parallel to the sheet. For elongate spacing structural elements or sticks in a matrix, the matrix may be oriented perpendicular to each other. Spacing structural elements with openings may be arranged in a grid type matrix, with spacing structural elements perpendicular to one another, to allow air flow.

Further description will be provided with reference to the Figures below.

BRIEF DESCRIPTION OF THE DRAWINGS

Below is a brief description of the drawings of the inventive panel, in which:

FIG. 17 is a sectional view of a portion of a roof arrangement constructed using perforated and non-perforated panels;

FIG. 18 is a sectional view of a house showing a wall, floor, and roof constructed using the panels;

FIG. 19 is a sectional view of an insulated house showing a wall, floor, and roof constructed using the panels;

FIG. 20 is an exploded view of the portion indicated as portion A in FIG. 19;

FIGS. 32-33 are close up perspective views of two additional embodiments of specialized shaped engineered matrix members;

FIG. 34 is a iso perspective view of a multi-plenum embodiment of the panel according to the present invention;

FIG. 35 is an exploded iso perspective view of the panel of FIG. 34;

FIG. 36 is a close up partial side view of the panel of FIG. 34;

FIG. 37 is a side view along the long edge of the panel of FIG. 34;

FIG. 38 is a close up side view of an end edge of a panel of FIG. 34 that forms a plenum boundary;

FIG. 39 is a cut-away close up iso perspective view of the panel of FIG. 34 with a register in exploded view to show detail;

FIGS. 40 and 41 are iso perspective views of the panel of FIG. 34 including a plenum tap, with a register in exploded view to show detail, and the blocks omitted;

FIG. 42 is a sectional side view of the panel of FIG. 34 including a plenum tap;

FIG. 43 is an iso perspective view of a plenum tap with selector doors and levers;

FIGS. 44 and 45 are a sectional side view of buildings with panels of FIG. 34 used for structural support and conditioned air delivery and return;

FIG. 46 is an upward looking sectional view along the sectional line marked "FIG. 46" in FIG. 44;

FIG. 47 is a side sectional view along the sectional line marked "FIG. 47" in FIG. 46;

FIG. 48 is an iso perspective view of the panel of FIG. 34 arranged on joists;

FIG. 49 is an side sectional perspective view panel of FIG. 34 installed adjacent to the exterior wall of a building;

FIGS. 50 to 52 are close up partial side views of edges of sheets of joined adjacent panels of FIG. 34, separated to show detail;

FIGS. 63 and 64 show multiple side sectional views of panels with nail shaped through inserts;

FIG. 78 is a partial plan view of the truss matrix of FIG. 75;

FIG. 86 is a close up sectional view of the molded middle sheet of FIG. 84;

FIGS. 87 and 88 are a perspective view and up close perspective view of the molded middle sheet of FIG. 84 from below;

FIG. 98 is a close up perspective view of a wire frame pyramid shaped insert embedded into a glob; and FIG. 99 is a close up perspective view of a solid pyramid shaped insert embedded into a glob.

DETAILED DESCRIPTION OF THE DRAWINGS

Figure 1:
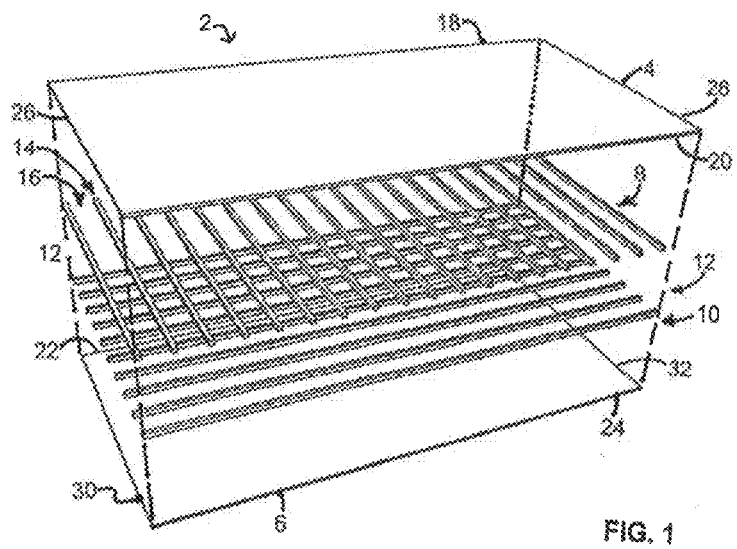
FIG. 1 is an exploded depiction of an embodiment of the panel.
Figure 2:
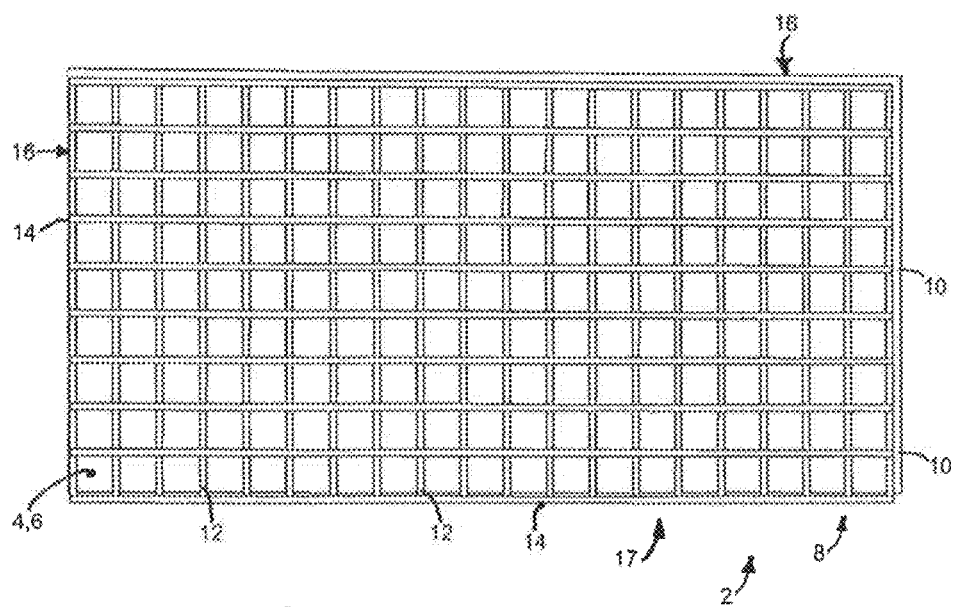
FIG. 2 is plan view of an embodiment of the panel.

As seen in FIGS. 1 and 2, the panel 2 is comprised of a first sheet 4 and a second sheet 6 fixedly mated together via spacing structural elements 8. In one embodiment the spacing structural elements 8 are comprised of a first layer 10 and a second layer 12 of rectangular shaped elongated members 14, spaced apart from each other a predetermined spacing distance 16. The arrangement of elongated members 14 in the first layer 10 is perpendicular to the arrangement of elongated members 14 in the second layer 12, forming a matrix 17 of elongated members 14.

As shown in FIG. 1, a first horizontal edge 18 and a second horizontal edge 20 of the first sheet 4 substantially align with a first horizontal edge 22 and a second horizontal edge 24 of the second sheet 6, respectfully. Similarly, a first vertical edge 26 and a second vertical edge 28 of the first sheet substantially align with a first vertical edge 30 and a second vertical edge 32 of the second sheet 6, respectfully. For sake of clarity, the second sheet 6, though present each embodiment depicted, is not shown in FIGS. 2, 3 and 6-10 below.

Figure 3:
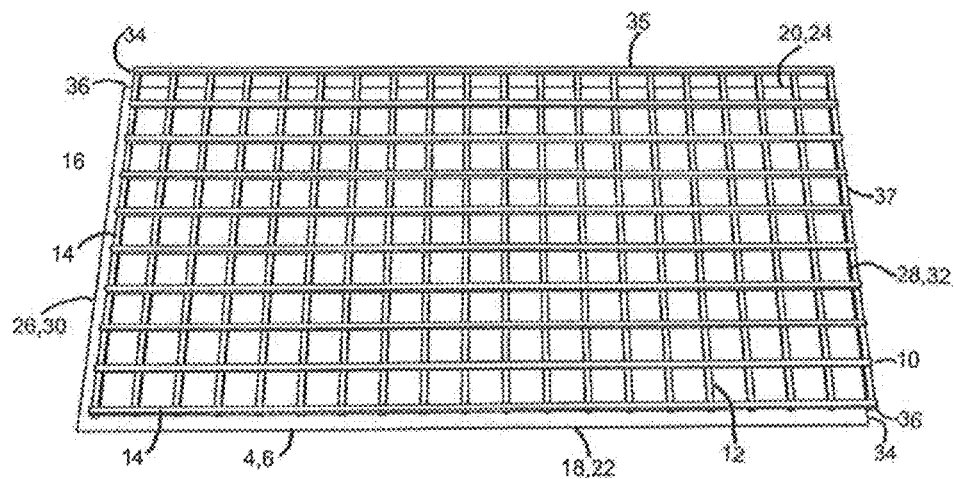
FIG. 3 is a plan view of an embodiment of the panel depicting the indented space and protruding segments.

As shown in FIG. 3, the first 10 and the second layer 12 of elongated members 14 are indented a certain first distance 34 inward from the first horizontal edges 18, 22 of the first and the second sheet 4, 6. The first 10 and the second layer 12 of elongated members 14 correspondingly overlap the second horizontal edges 20, 24 of the first and the second sheet 4, 6 by the same first distance 34, creating first protruding segments 35. Similarly, the first 10 and the second layer 12 of elongated members 14 are indented a certain second distance 36 inward from the first vertical edges 26, 30 of the first and the second sheet 4, 6. Likewise, the first 10 and the second layer 12 of elongated members 14 correspondingly overlap the second vertical edges 28, 32 of the first and the second sheet 4, 6 by the same second distance 36, creating second protruding segments 37.

These matching indents and overlaps aid in fittingly mating a first panel 2 to a neighboring second panel 2 in a secure "tongue in grove" fashion. By providing corresponding indent and overlap on all four edges, a surface formed of multiple panels may be assembled faster, have increased strength and rigidity as a unit, and helps ensure a continued smooth panel surface. As in the embodiment shown, the first distance 34 of indent and overlap with respect to the horizontal edges can be of the same value as the second distance 36 of indent and overlap in the horizontal direction. It is to be noted that the indent and overlap have been exaggerated in FIG. 3, to show detail.

Figure 4:
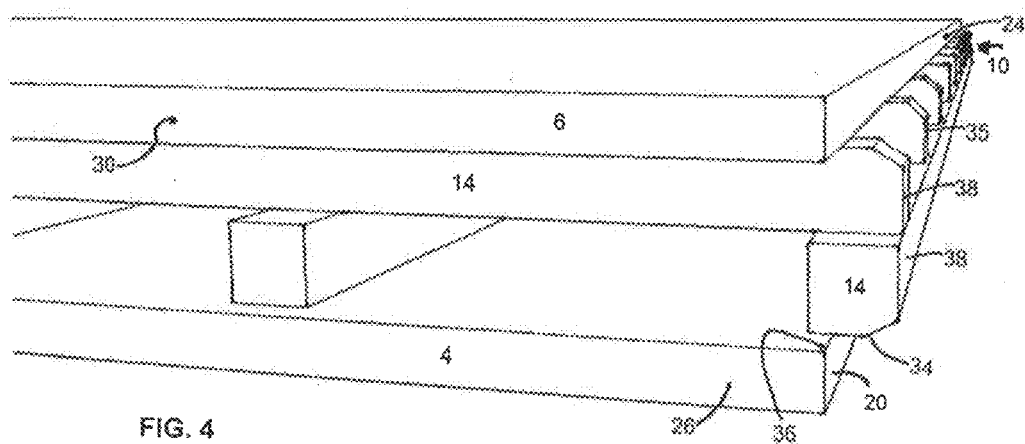
FIG. 4 is a close-up iso view of an embodiment of the panel, depicting the indented space, protruding segments, and chamfered edges.

As shown in FIG. 4, a portion of the first protruding segments 35 that overlap the second horizontal edges 20, 24 of the first and the second sheet 4, 6, have a chamfered edge 38. These chamfered edges facilitate inserting the first protruding segments 35 of the first 10 and the second layer 12 of a first panel 2 into a second adjacent panel 2, and specifically into a space provided by the inward indent of the elongated members 14 the first distance 34 from first horizontal edges 18, 22 of the first 10 and the second layer 12 of the adjacent panel. The chamfer on the chamfered edge 38 would terminate between 1/8" and 3/8" from the second horizontal edges 20, 24 of the first and the second sheet 4, 6, and preferably would terminate approximately 1/4" from the second horizontal edges 20, 24 of the first and the second sheet 4, 6.

In a like manner a portion of the second protruding segments 37 that overlap the second vertical edges 28, 32 of the first and the second sheet 4, 6, have a chamfered edge 38 (not shown). These chamfered edges similarly facilitate inserting the second protruding segments 37 of the first 10 and the second layer 12 of a first panel 2 into a second adjacent panel 2, and specifically into the space provided by the inward indent of the elongated members 14 the second distance 36 from the first vertical edges 26, 30 of the first 10 and the second layer 12 of the adjacent panel. The chamfer on the chamfered edge 38 would terminate between 1/8" and 3/8" from the second vertical edges 28, 32 of the first and the second sheet 4, 6, and preferably would terminate approximately 1/4" from the second vertical edges 28, 32 of the first and the second sheet 4, 6.

Figure 5:
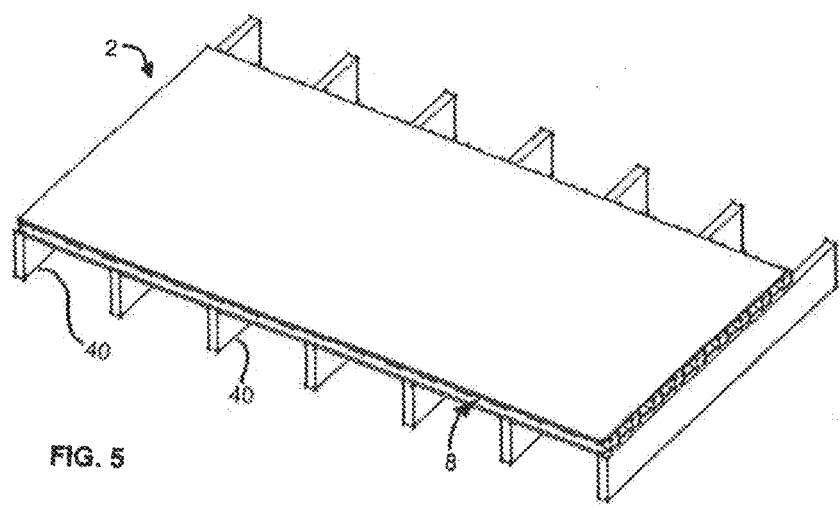
FIG. 5 is an iso view of the panel mounted on mounting elements.

As shown in FIG. 5, the panel 2 may be mounted onto mounting elements 40 such as roofing rafters or trusses, flooring joists, or wall studs, just as normal plywood or OSB board would be mounted—twelve inches on center. Because of the panels' increased strength, they may be mounted to mounting elements 40 spaced farther apart than a plywood or OSB board of the same thickness as the sum of the thickness of the first and second sheet of the panel would require under similar conditions—including allowing the panels to be mounted on mounting elements 40 spaced sixteen, twenty four, thirty six, forty two, forty eight, and ninety six inches apart on center.

Figure 6:
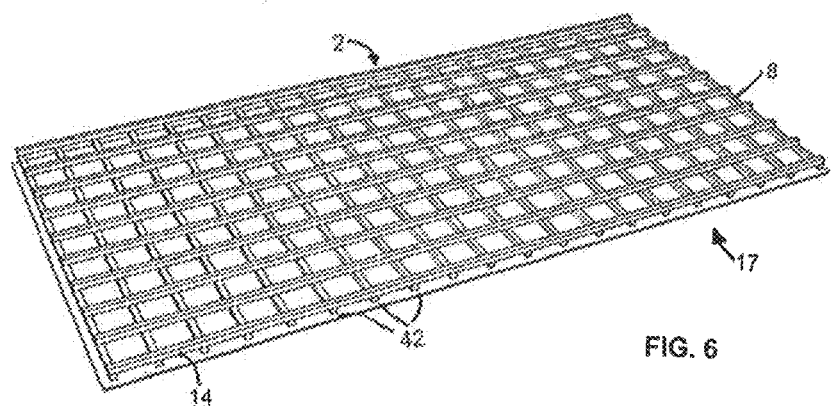
FIG. 6 is an iso view of an embodiment of the panel utilizing plywood veneer as spacing structural elements, without showing the top sheet.

Turning to FIG. 6, a plurality of plywood veneer strips 42 may also function as the elongated members 14. In such an embodiment, each elongated structural element 14 may be made up of a plurality of plywood veneer strips 42, ranging from two to ten 1/8 inch plywood veneer strips 42 per elongated structural element 14, and preferably six 1/8 inch plywood veneer strips 42 per elongated structural element 14.

Figure 7:
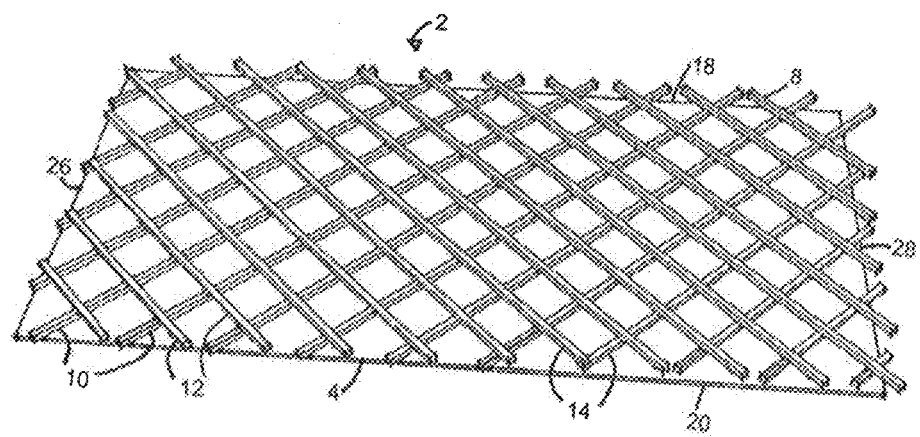
FIG. 7 is an iso view of an embodiment of the panel where the spacing structural elements are aligned diagonally, without showing the top sheet.

As shown in FIG. 7, the matrix 17 of elongated members 14 may be arranged diagonally with respect to the horizontal 18, 20, 22, 24 and vertical 26, 28, 30, 32 edges of the first and the second sheet 4, 6. In this embodiment, the elongated members 14 of the first layer 10 may be arranged at an angle of between 30° and 60° with respect to the first horizontal edge 18 of the first sheet 4, and preferably at an angle of 45° with respect to the first horizontal edge 18 of the first sheet 4. The elongated members 14 of the second layer 12 may also be arranged at an angle of between 30° and 60° with respect to the first horizontal edge 18 of the first sheet 4, and preferably at an angle of 45° with respect to the first horizontal edge 18 of the first sheet 4.

Figure 8:
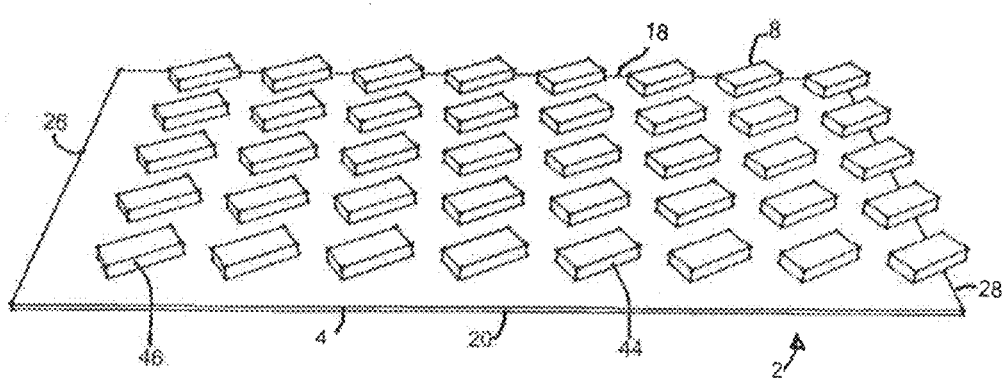
FIG. 8 is an iso view of an embodiment of the panel utilizing rectangular blocks as spacing structural elements, without showing the top sheet.
Figure 9:
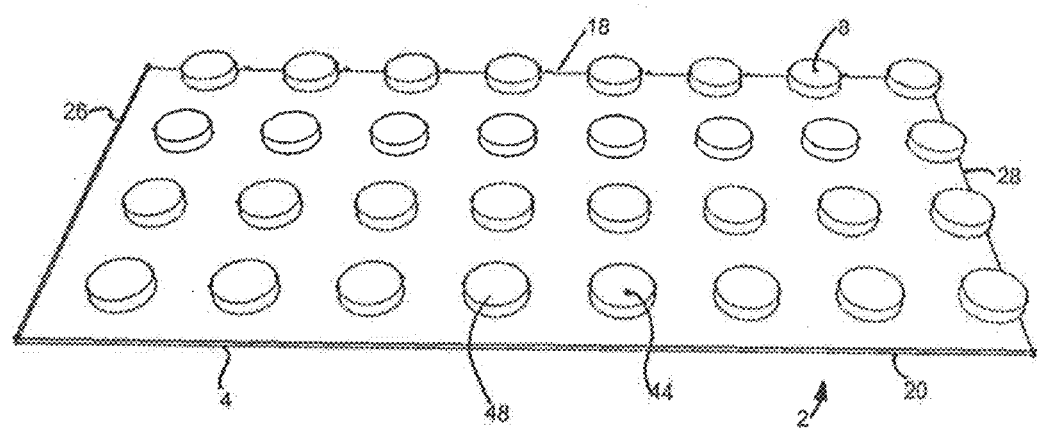
FIG. 9 is an iso view of an embodiment of the panel utilizing circular blocks as spacing structural elements, without showing the top sheet.
Figure 10:
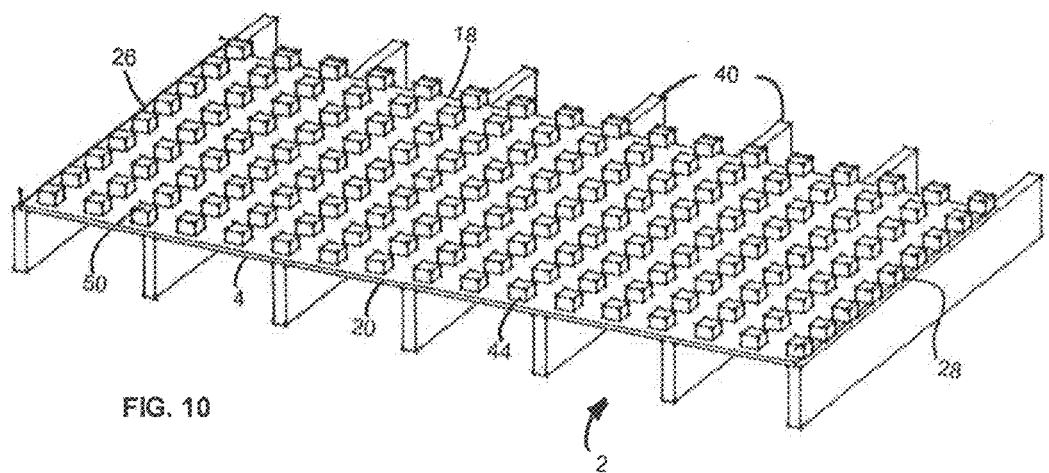
FIG. 10 is an iso view of an embodiment of the panel utilizing square blocks as spacing structural elements, without showing the top sheet.

As shown in FIGS. 8 through 10, the spacing structural elements 8 may also be comprised of blocks 44 being preferably rectangular 46, circular 48, or square 50 in shape. Though according to tests, panels 2 utilizing blocks 44 as the spacing structural elements 8 increased the strength of a comparable plywood board by only half as much as panels 2 utilizing elongated members 14 as the spacing structural elements 8, panels utilizing blocks 44 as the spacing structural elements 8 offer an increased assortment of paths that a pipe, tube, wire, or other insert 52 may be run through the panel 2, especially if the insert has dimensions approaching one half the spacing between the first and second sheet 4,6.

As shown in FIGS. 8 and 9 the blocks 44 would also preferably be indented a first and second distance 34, 36, and similarly have first and second protruding segments 35, 37, correspondingly overlapping their respective edges the same first and second distances 34, 36.

As shown in FIG. 8, the blocks 44 could also be aligned diagonally with respect to the horizontal 18, 20, 22, 24 and vertical 26, 28, 30, 32 edges of the first and the second sheet 4, 6. In this embodiment, the blocks 44 may be arranged at an angle of between 30° and 60° with respect to the first horizontal edge 18 of the first sheet 4, and preferably at an angle of 45° with respect to the first horizontal edge 18 of the first sheet 4.

Figure 11:
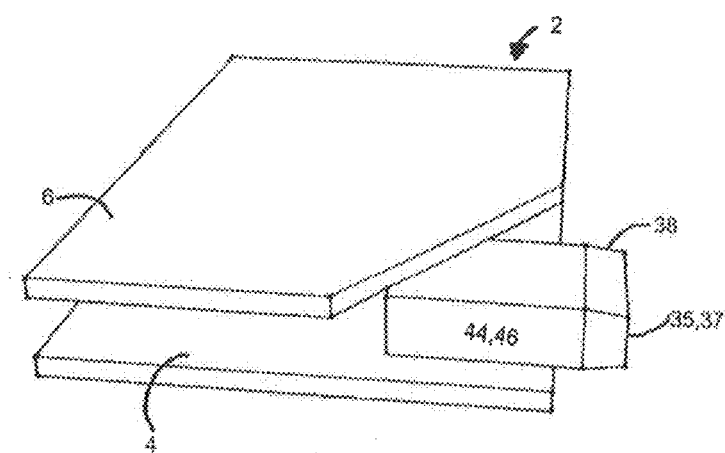
FIG. 11 is a close-up iso view of an embodiment of the panel, depicting the indented space, protruding segments, and chamfered edges.

As shown in FIG. 11, the protruding segments 35, 37 of the blocks 44 would similarly be provided with a chamfered edge 38, to assist in inserting the protruding segments 35, 37 of the blocks of a first panel 2 into the space provided by the blocks 44 of an adjacent second panel 2 indented at least as much as the distance the protruding segments 35, 37 protrude past the edge of the first and the second sheet 4, 6.

Figure 12:
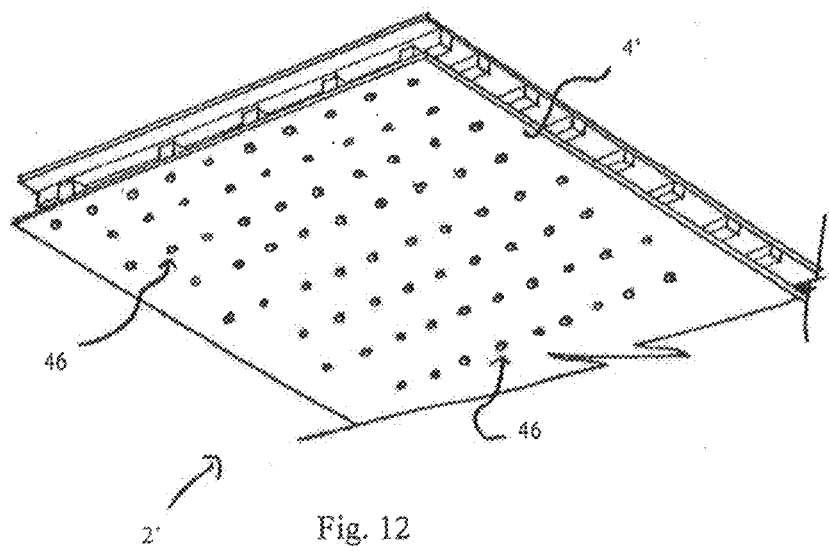
FIG. 12 is an iso view of an embodiment of the panel with perforations in one sheet, viewed from the underside.

Turning to FIG. 12, a perforated panel 2' with a perforated first sheet 4' is shown. The perforations 46 are arranged in a matrix type arrangement and facilitate the passage of air from the outside of the perforated panel 2', through the perforated first sheet 4', via the plurality of perforations 46 into the interior of the perforated panel 2'. The perforations 46 are through holes of between 1/16 inches and 1 1/2 inches in diameter, and preferably between ¼ inches and 1 inch in diameter, and most preferably between ⅜ inches and ⅝ inches in diameter. The matrix arrangement may be staggered, with each hole spaced between 4 and 12 diameters from adjacent holes. Additionally, a layer of screening 80 (not shown) may be attached to the inner surface of the perforated first sheet 4'. The perforated panel 2' is constructed in a similar manner to the non-perforated panel 2, with the exception of perforating or using a perforated first sheet 4', and the perforated panel 2' may be used in the same manner as the non-perforated panel 2.

Figure 13A:
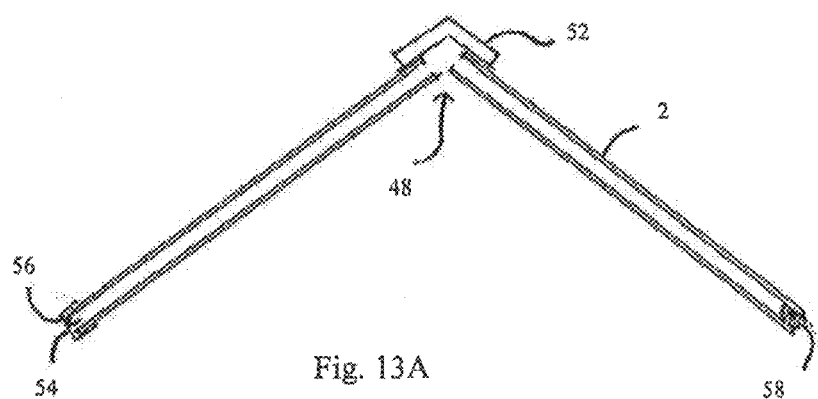
FIGS. 13A and 13B are side views of two roof arrangements constructed with the panels.
Figure 13B:
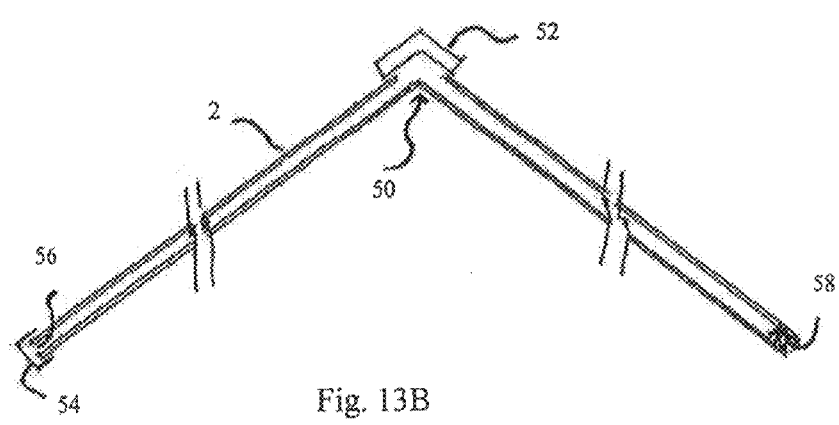

Turning to FIGS. 13A and 13B, two panel roofing arrangements are shown. FIG. 13A shows a panel arrangement suited for unfinished attics and non-living spaces. The panels 2, 2' are arranged so that neither the first nor the second sheets 4, 4', 6 of the panels 2, 2' opposite the ridge meet, leaving an interior ridge gap 48 and an exterior ridge gap. The ridge will be capped with a ridge vent 52. The bottommost terminal edges 56 of the panels 2, 2' will be include a screen 54, insect block 58, or other permeable occlusion, arranged to allow air passage into the interior of the panels 2, 2', but hinder insect entry.

FIG. 13B shows a panel arrangement suited for finished attics and living spaces. The panels 2, 2' are arranged so that the first sheets 4, 4' of the panels 2, 2' opposite the ridge meet, forming a solid interior ridge 50, but the second sheets 6 of the panels 2, 2' opposite the ridge meet do not meet, leaving an exterior ridge gap. The ridge will be capped with a ridge vent 52, and the bottommost terminal edges 56 of the panels 2, 2' will be likewise permeably occluded.

Figure 14:
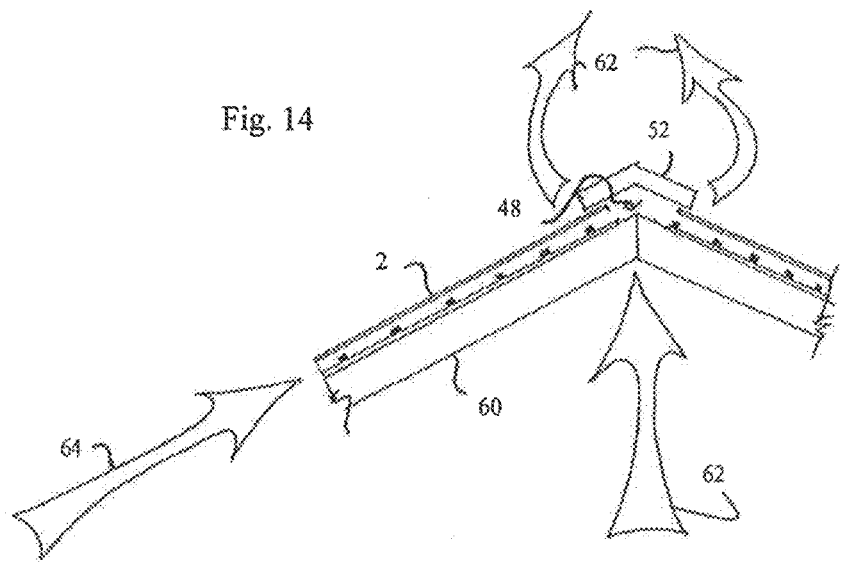
FIG. 14 is a sectional view of a roof arrangement constructed with the panels for an unoccupied attic.

As shown in FIG. 14, a panel arrangement for an unoccupied attic is demonstrated. Panels 2, 2' are arranged on trusses and rafters 60 so as to leave an interior ridge gap 48 and an exterior ridge gap, as described in FIG. 13A. The ridge is capped by a ridge vent 52. Warm, moist air 62 from the interior of the house is exhausted through the ridge vent, via the interior ridge gap 48 and exterior ridge gap. The panels are installed with the permeably occluded 54, 58 terminal edges 56 adjacent to openings in soffits or lower fascia (not shown). Cooler air 64 enters through the permeably occluded 54, 58 terminal edges 56, travels through the interior of the panels 2, 2', absorbing heat from the first and the second sheets 4, 4', 6 and mixing with warm moist air entering through perforations 46, and exits through the ridge vent 52, via the exterior ridge gap.

Figure 15A:
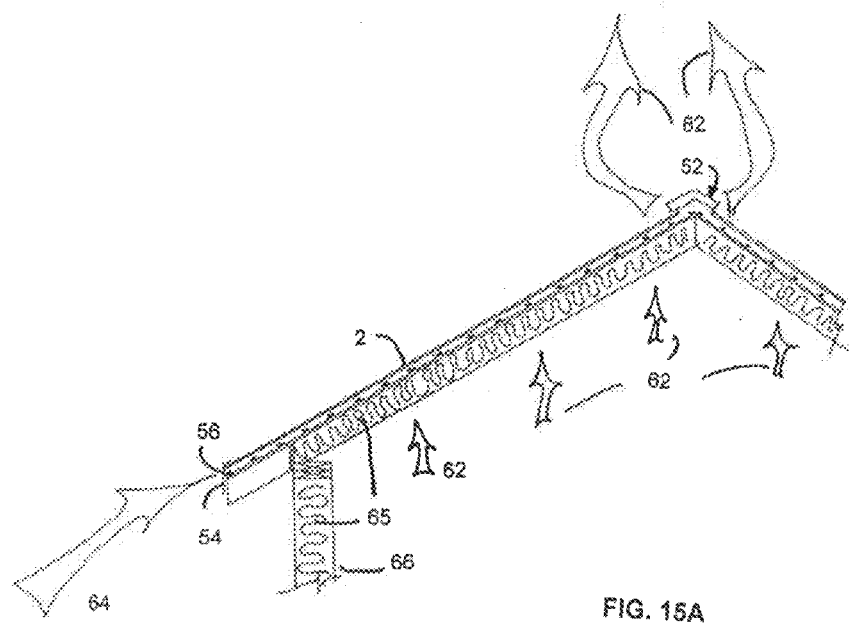
FIG. 15A is a sectional view of a roof arrangement constructed with the panels for an occupied attic.

As shown in FIG. 15A, a panel arrangement for an occupied attic or directly roofed living space is demonstrated. Panels 2, 2' are arranged on trusses and rafters 60 so as to leave an only an exterior ridge gap, as described in FIG. 13B. The ridge is capped by a ridge vent 52. Warm, moist air 62 progresses from the interior of the house through insulation 65 and transfers its heat and moisture to the insulation 65 and first sheets 4, 4' of the panels 2, 2'. The panels are installed with the permeably occluded 54, 58 terminal edges 56 adjacent to openings in soffits or lower fascia (not shown). Cooler air 64 enters through the permeably occluded 54, 58 terminal edges 56, travels through the interior of the panels 2, 2', absorbing heat from the first and the second sheets 4, 4', 6 and exits warm air 62 through the ridge vent 52, via the exterior ridge gap. The upper terminal edges 56 forming the upper ridge gaps in each embodiment may also be permeably occluded 54, 58.

Figure 15B:
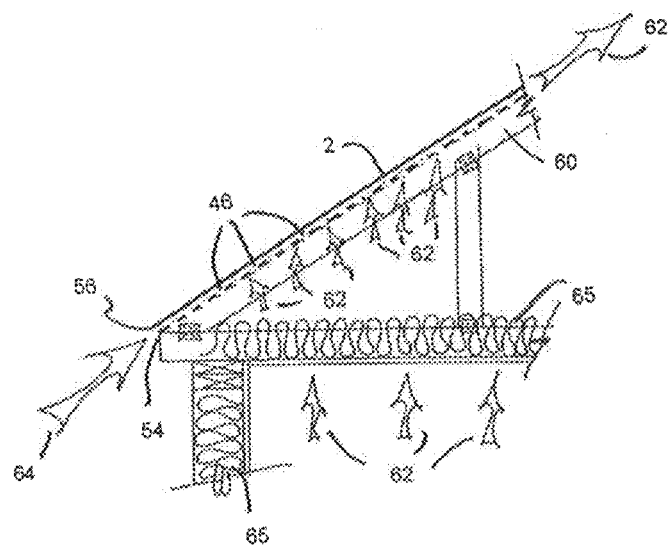
FIG. 15B is a sectional view of a roof arrangement constructed with the panels for an unoccupied attic space, where some of the panels are perforated.

As shown in FIG. 15B a panel arrangement for an unoccupied attic space, using perforated panels is demonstrated. The perforated panels 2' are arranged such that the perforated first sheet faces the interior of the building, allowing warm air 62 to directly enter into the interior of the panel matrix through the perforations 46, from multiple locations in the attic space. Because of the increased ventilation due to the perforations 46 in the perforated panels 2', the panels may be arranged either with or without an interior ridge gap 48. It is envisioned that a ridge vent 52 will be used to cap an exterior ridge gap (not shown) to allow the exhaust of warm air 64 out of the panel matrix, and in combination may be used with one or more gabled vents (not shown).

Figure 16:
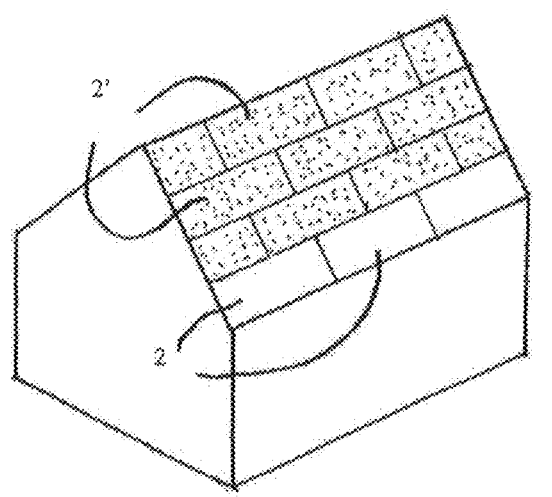
FIG. 16 is an iso view of a roof arrangement constructed using perforated and non-perforated panels.

As shown in FIGS. 16 and 17, the perforated panels 2' and non-perforated panels 2 may be used in conjunction in a roofing construction arrangement. In one embodiment, the perforated panels 2' are arranged in the top one or more rows of the roof sheathing and the non-perforated panels 2 are arranged in the bottom one or more rows of roof sheathing. The inner first sheets 4' of the upper rows of panels 2' normally lack abutting insulation 65, allowing warm moist air to more freely enter perforations 46. The inner first sheets 4 of the lower rows of panels 2 normally have abutting insulation 65, diminishing air transfer rates through perforations 46, and therefore would normally have non-perforated first sheets 4. It is to be appreciated that sheeting arrangements of all perforated panels 2', all non-perforated panels 2, or any combination of perforated and non-perforated panels 2' 2, would still fall in the scope of this invention.

Turning now to FIGS. 18 and 19, the panels may be likewise used in wall sheathing and flooring. As shown in FIG. 18, a panel 2, 2' may be attached to a wall joist/wall stud 66 and floor joist 68, in a similar manner as traditional sheeting materials. As with roofing embodiments, the terminal edges 56 will include permeable occlusions 54, 58. In one embodiment, a terminal gap 74, facilitated by joist spacing elements 72, here proximate to the ceiling joists 70, provides a passageway for air to enter and exit the interior of the panels 2, 2'.

Figure 20A:
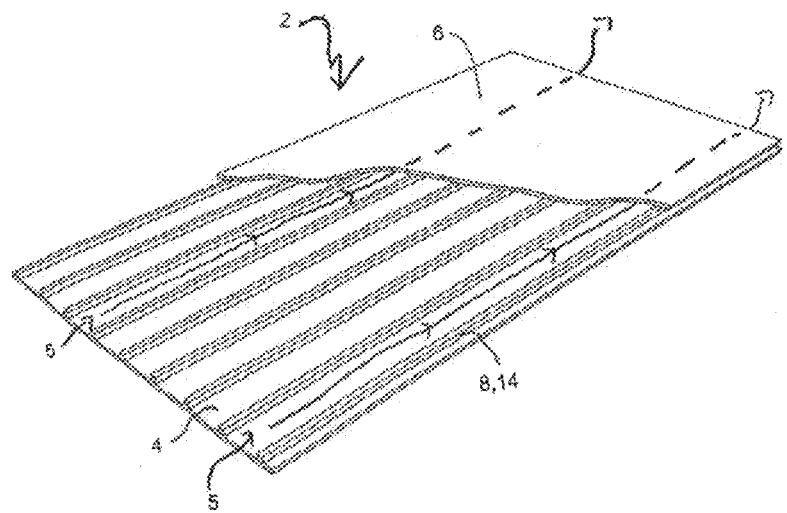
FIGS. 20A and 20B are iso-views of panels with a single layer of spacing structural elements, each having a portion of the top sheet cutaway to show detail.
Figure 20B:
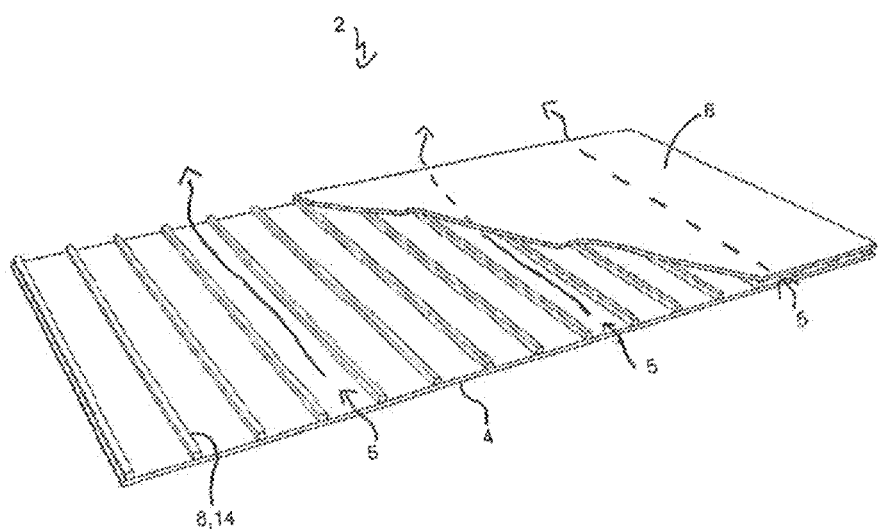

In the embodiment shown in FIG. 19, a panel 2, 2' is attached to an insulated 65 wall joist/wall stud and a floor joist 68, with siding 76 attached to the exterior sheet of the panels 2, 2'. The flooring panel 2, 2' contains a layer of screening 80 between the first layer 10 and the second layer 12 of elongated members 14. Cool air 64 enters the panel 2, 2' interior by passing through a lower terminal gap 74, facilitated by joist spacing elements 72, then through the permeably occluded 54, 58 lower terminal edge 56, moves up through the interior of the panel 2, 2' absorbing heat and moisture from the first and the second sheets 4, 4', 6, and exits warm air 62 through the permeably occluded 54, 58 upper terminal edge 56, and out an upper terminal gap 74. The air flow may be channeled by one or more first channeling component 78, and as shown in FIG. 20, one ore more second channeling components 82. The first and the second channeling components may be decorative as well as functional, and serve additionally as housing trim.

FIG. 20 shows a close up of the upper section of FIG. 19, indicated as portion A, showing in detail the upper terminal gap, and the first and the second channeling components 78, 82.

Figure 21:
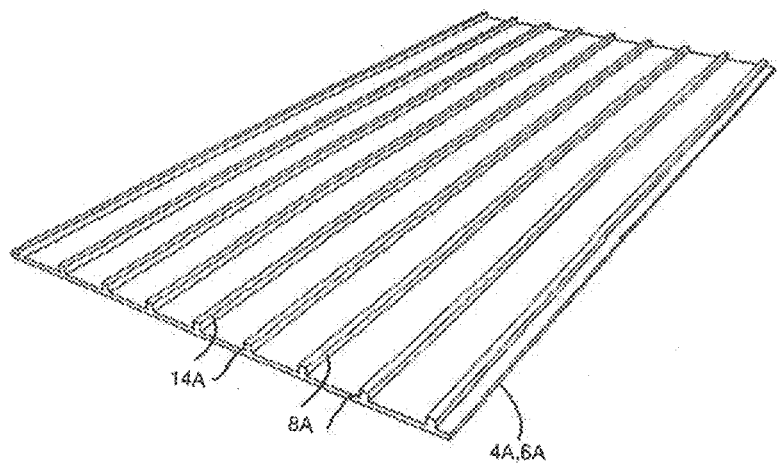
FIG. 21 is an iso-view of a panel with a sheet having integrated spacing structural elements.
Figure 22:
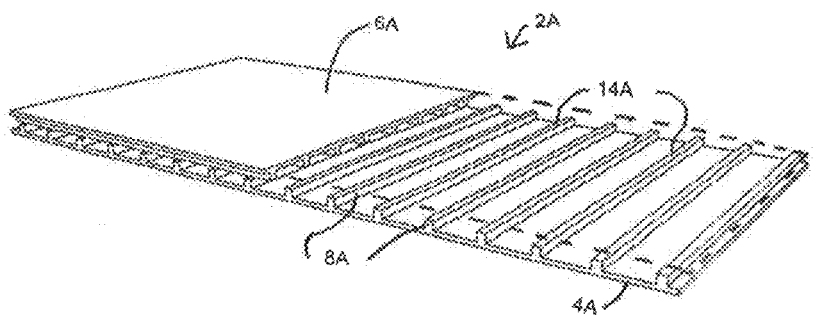
FIG. 22 is an iso-view of a panel with two sheets, each having integrated elongated members, with a portion of the top sheet cutaway to show detail.
Figure 23:
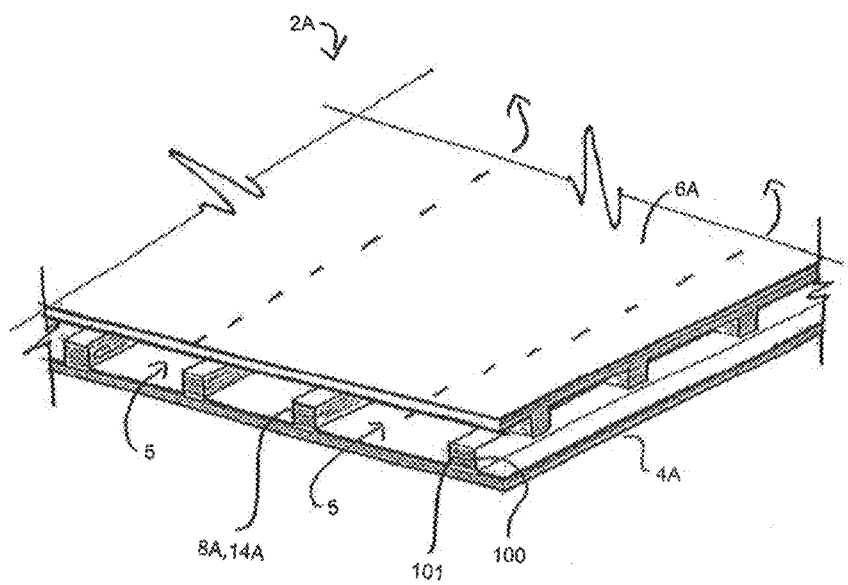
FIG. 23 is an iso-view of a panel with two sheet, each having integrated elongated members with rectangular profiles.
Figure 24:
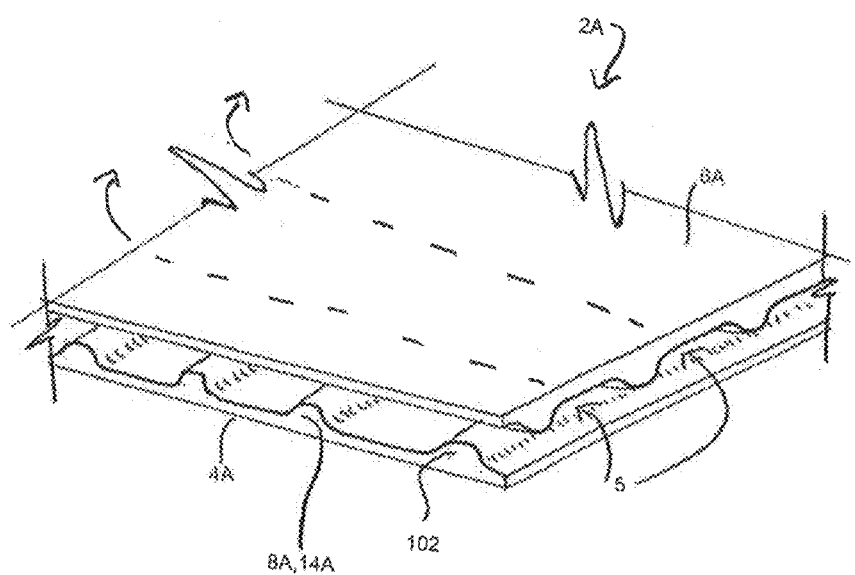
FIG. 24 is an iso-view of a panel with two sheets, each having integrated elongated members with curved profiles.

Turning to FIGS. 21 and 22. A first sheet 4A of a panel 2A with integrated spacing structural elements 8A is shown. The spacing structural elements 8A may take the form of, for example, integrated blocks 44A (not shown) or integrated elongated members 14A. In panels 2A employing integrated elongated members 14A, the integrated elongated members 14A generally run horizontally on a first sheet 4A and will generally run vertically on a second sheet 6A.

Turning to FIGS. 23, 24, and 26A-D, the profiles of the integrated elongated members are generally either rectangular 100, square 101, or curved 102, or some combination of each, depending upon the application requirements, each providing a plurality of parallel, unobstructed, contiguous pathways 5. As shown in FIG. 26, for example, the integrated elongated members may have flat tops 104, flat sides 106, and angled edges 108, and/or curved tops 110, curved sides 112, and rounded edges 114 or chamfered edges 116. Additionally the sides maybe perpendicular where they intersect the top and/or the interior surface of the sheet 4A, 6A, or at a non-perpendicular angle.

Figure 25:
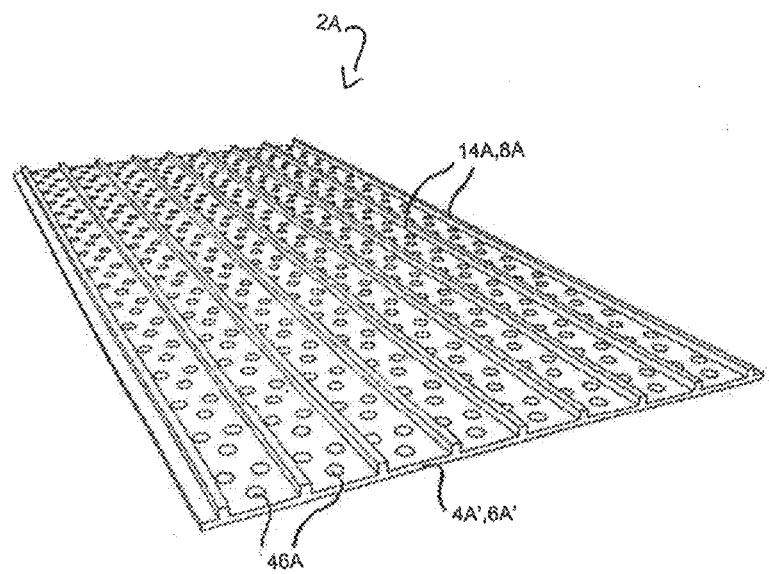
FIG. 25 is an iso view of a sheet having integrated elongated members and the plurality of perforations.
Figures 26A, 26B, 26C, 26D:
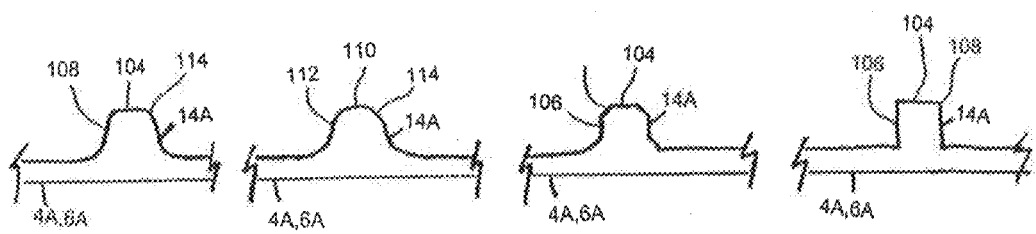
FIGS. 26A-26D are profile views of multiple examples of potential profiles of integrated elongated members.

As shown in FIG. 25, similar to panels 2' described above, a first sheet 4A' and/or second sheet 6A' of panels 2A' with integrated elongated members 14A may also possess perforations 46A, and may be used in similar embodiments as those described in paragraphs above.

Figure 27:
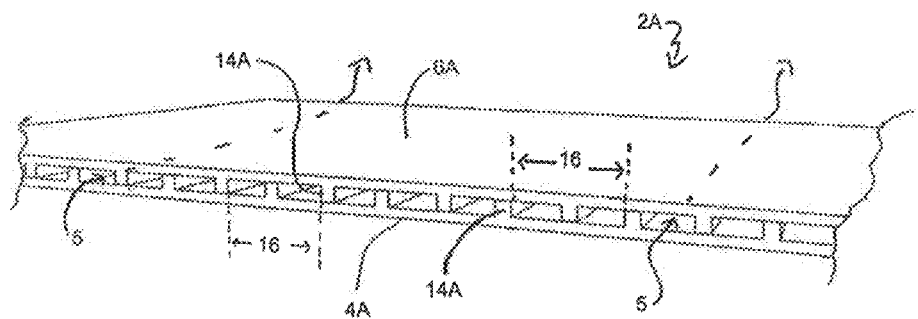
FIG. 27 is an iso views of a panel comprised of a single layer of nesting elongated members.

Turning to FIG. 27, a panel 2A comprised of a first and a second sheet 4A, 6A, each having integrated elongated members 14A. In this embodiment, the integrated members 14A on the first sheet 4A are arranged parallel to the integrated members 14A on the second sheet 6A. This arrangement allows the integrated members 14A on the first sheet 4A to be nested within the spacing distance 16 separating the integrated members 14A on the second sheet 6A from one another, when the first and the second sheet 4A, 6A are brought together to form the panel 2A. In the same way, this allows the integrated members 14A on the second sheet 6A to be nested within the spacing distance 16 separating the integrated members 14A on the first sheet 4A from one another. The integrated members 14 A on the first sheet 4A would attach directly to the interior surface of the second sheet 6A in this embodiment. The parallel unobstructed continuous pathways 5 for air would be defined by the interior surface of the first and second sheets 4A, 6A and their respective integrated members 14A, similar to other single layer embodiments, as compared to being defined by the interior surface of one of the first sheet and second sheet 4A, 6A, and at least three separate elongated members 14, 14A, as in multiple layer embodiments.

In a related embodiment, integrated elongated members 14A of a first and second sheet 4A, 6A could be arranged parallel such that, instead of nesting within respective spacing distances 16 in the posing sheets 4A, 6A, as shown in FIG. 27, the parallel elongated members 14A of each sheet 4A, 6A could stack substantially directly on top of one another along the full length of the elongated members 14 A (not shown). This would create parallel unobstructed continuous pathways 5 for air that would be two elongated members 14A high, and defined by for elongated members 14A, two from each of the first and the second sheet 4A, 6A, and the interior surface of both the first sheet 4A and the second sheet, 6A.

Figure 28:
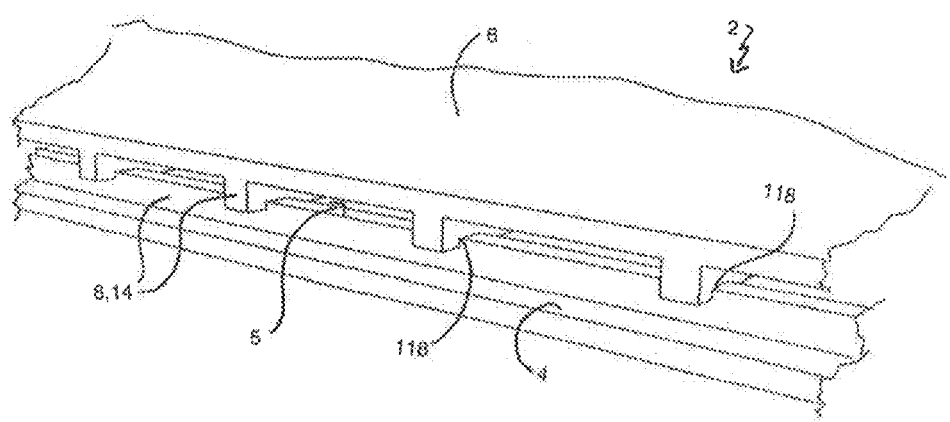
FIG. 28 is an up close iso view of two elongated members with a notched attachment.
Figure 29:
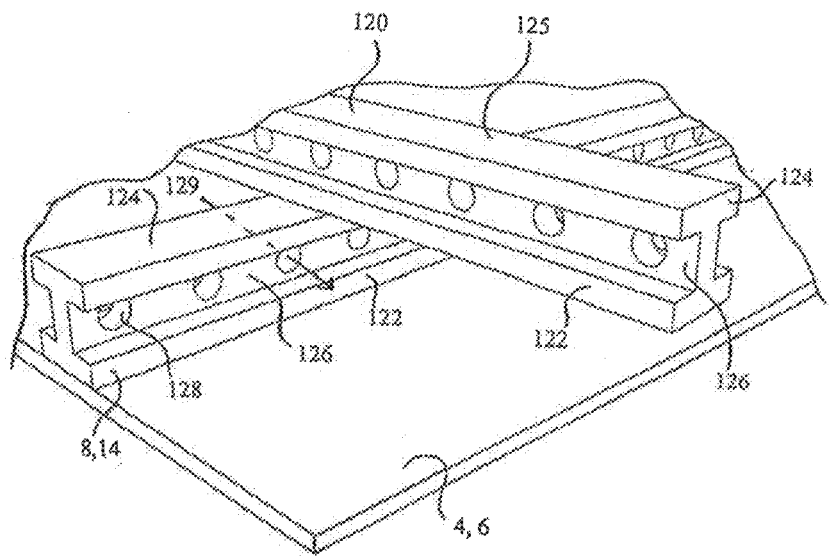
FIGS. 29-31 are an up close perceptive views of panels using three different embodiments of specialized shaped engineered matrix members, where the top sheet in each panel is not shown.

Turning to FIG. 28, a panel 2 is shown wherein the respective elongated members 14 of the first and the second sheets 4A, 6A interacts with one another at their point of attachment in a notch/recess fashion. At the point where a first elongated member 14 contacts a second elongated member 14, one or both of the first and the second elongated member 14 is provided with a notch 118. In the case where only one of the first or the second elongated member is provided with a notch 118 at their point of interaction, this allows either the first or second elongated member 14 to recess into the notch 118 on the opposed elongated member 14. Or, in the case that both the first and second elongated members 14 are provided with opposing notches 118 at the point of interaction, this allows each elongated member to recess into the notches 118 provided on the opposed elongated member 14. While this notch/recess arrangement creates a potentially stronger bond amongst the elongated members 14 and therefore the panel 2 as a whole, at the same time this decreases the size of the parallel, contiguous, unobstructed pathways 5 for air within the panel 2.

Additional embodiments of the elongated matrix members 14 are envisioned. In their simplest form, an elongated matrix member 14 is a stick or extrusion with a square or rectangular cross section and a length equal to a parallel axis of the sheet 4, 6 to which it is attached. The elongated matrix members 14 are ideally ¾"×¾" in cross section, but, as mentioned above, can be larger (2" or greater) or smaller (¼" or smaller) as required for the application. The elongated matrix members 14 are preferably attached to at least one sheet 4, 6 and to one another where multiple layers of elongated matrix members 14 intersect, in order to transfer shear stresses, though the elongated matrix members 14 may have one or more locations where they intersect that they are not attached, in order to increase flexibility of the overall panel, as may be required in certain situations.

Additionally, engineered matrix members 120 can be utilized and manufactured from a variety of materials, like organic, wood, cellulose or other fibrous materials, plastics, metals or other materials that can be shaped or extruded, and can be formed into the square or rectangular cross sectional shapes discussed previously, or formed into one of many specialized shapes.

Specialized shaped engineered matrix members 120 will preferably have a first flat section 122 with a rectangular outer face, an opposed second flat section 124 with a rectangular outer face, and transverse section 126 connecting an inner face of the first flat section 122 to an inner face of the second flat section 124. The outer face of at least one of the first and the second flat section 122, 124 will preferably be attached to at least one of a sheet 4, 6 and an outer face of a first or a second flat section 122, 124 of an additional specialized shaped engineered matrix member 120 disposed in an adjacent layer. The range of shapes and structures of the specialized shaped engineered matrix members 120 will vary mainly based upon the design of the transverse section 126.

In a first embodiment of specialized shaped engineered matrix members 120, "I" beam shaped members 125 are formed by the first and second flat sections 122, 124 of engineered matrix members 120 being joined by a relatively thin and elongate transverse section 126. The thin elongate transverse section 126 and the inner faces of the first and the second flat sections 122, 124 define two narrow channels, one on each side of the thin elongate transverse section. These narrow channels act to increase the size of parallel, contiguous, unobstructed pathways 5 for air to pass between two adjacent "I" beam shaped members 125 of a common layer, as compared to similarly spaced elongated members 14 with a square or rectangular cross section.

Additionally, the thin elongate transverse sections 126 in the "I" beam shaped members 125 may be solid or perforated. The perforated "I" beam shaped members 125 offer the benefit of enhanced cross ventilation performance and increase the interior cabling options of the panels, as the perforations 128 provide additional pathways 129 for air and/or cables to pass through the panel 2, and through the very "I" beam shaped members 125. Either perforated or solid, the "1" beam shaped members 125 offer the benefit of being easily extruded and utilized in a panel 2.

Figure 30:
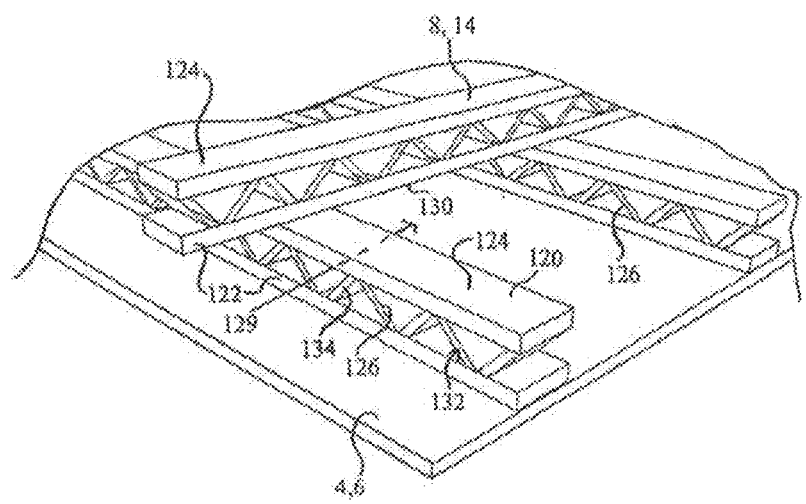

Turning to FIG. 30, in a second embodiment of specialized shaped engineered matrix members 120, "truss" shaped members 130 are constructed by the first and second flat sections 122, 124 of engineered matrix members 120 being joined by a truss web 132 transverse section 126. The truss web 132 is formed of a plurality of truss web supports 134 that can be both diagonal supports of the same or varying angles, and vertical supports. The truss web supports 134 will normally be of approximately an equal width as that of the first and the second flat sections 122, 124.

In a first embodiment of truss shaped members 130, the truss web 126 is comprised of a plurality of diagonal truss web supports 134 that form a continuous series of triangles down the length of the truss shaped member 130. That is, except for terminal ends of the truss shaped members, at each intersection of a diagonal truss web support 134 with the inner face of the first and the second flat sections 122, 124, another diagonal truss will also intersect the same inner face of the first and the second flat sections 122, 124 at an adjacent location. Such adjacent intersections form a triangulated parallel chord truss. The truss web supports 134 can be comprised of folded or formed material, and similar to the perforated "I" beam shaped members 125, the truss shaped members 130 to facilitate additional air flow and additional pathways for running cables and pipes through the panels 2, especially with the additional pathways diagonally and orthogonally through the specialized shaped engineered matrix members 120.

Figure 31:
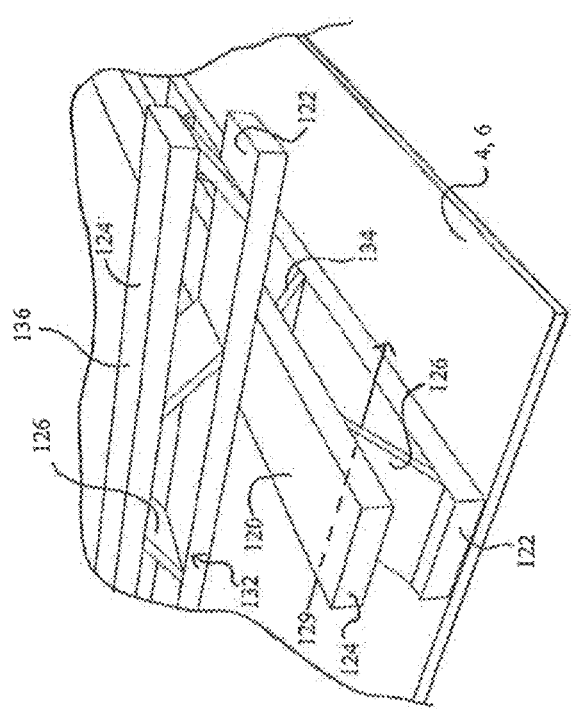

Turning to FIG. 31, in a second embodiment of truss shaped members 130, the intersection of the diagonal truss web supports 134 with the inner face of the first and the second flat sections 122, 124 can be spaced either a fixed or varying distance from one another. These "skip truss" shaped members 136 are similar to the truss shaped members 130, but because they have less truss web supports 134, they are less costly to manufacture and fabricate and offer increased size and angles of pathways through the panels 2 and the specialized shaped engineered matrix members 120, while still retaining much of the superior strength qualities of the truss shaped members 130.

Figure 32:
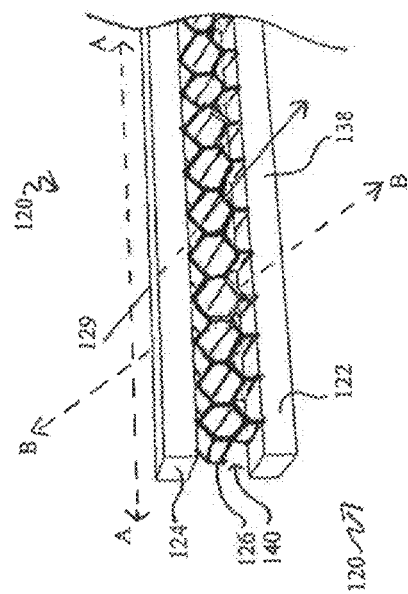

Turning to FIG. 32, in a third embodiment of specialized shaped engineered matrix members 120, honeycomb shaped members 138 are constructed by the first and second flat sections 122, 124 of engineered matrix members 120 being joined by a honeycomb web 140 transverse section 126. The honeycomb web 140 is formed by a plurality of honeycomb or other repeating open geometric shapes connected to one another, and arranged such that an axis of opening B-B is disposed perpendicular to a long axis A-A. Similar to the perforated "I" beam shaped members 125 and the truss shaped members 130, the honeycomb web 140 of the honeycomb shaped members 138 facilitates additional air flow and additional pathways 129 for running cables and pipes through the panels 2, especially with the additional pathways diagonally and orthogonally through the specialized shaped engineered matrix members 120.

Turning to FIG. 33, in a fourth embodiment of specialized shaped engineered matrix members 120, corrugated shaped members 142 are constructed by the first and second flat sections 122, 124 of engineered matrix members 120 being joined by a corrugated or sinusoidal type curved web 144 transverse section 126. The peaks and the troughs of the corrugated web 144 attach to the inner faces of the first and second flat sections 122, and curving a path in-between. The curved shape of the corrugated web 144 provides a different profile and potentially wider pathways 129 for air flow and running cables, as compared to the truss shaped members 130.

The specialized shaped engineered matrix members 120 may be used in all situations as the rectangular shaped elongate members 14. The specialized shaped engineered matrix members 120 may be formed in a separate process and later attached to the sheets 4, 6, or, similar to the integrated elongated members 14A, the specialized shaped engineered matrix members 120 may be formed, in whole or part, together with the sheets 4A, 6A. Panels 2 may be constructed out of all non-engineered spacing structural elements 8, all engineered matrix members 120, or some combination of each.

Turning now to FIGS. 34-37 a further additional embodiment of the invention disclosed herein is disclosed. As can be seen, in this multi-plenum panel 202 embodiment an additional top third sheet 204, parallel in plane with both the first (now middle) sheet 206, and the second (now bottom) sheet 208, has been affixed to the now multi-plenum panel 202 with blocks 210, to create two separate plenums—a upper plenum 212 and a lower plenum 214. The plenums 212, 214 extend from one multi-plenum panel 202 to adjacent multi-plenum panels 202 such that the top and the lower plenums 212, 214 can extend the length and width of an entire floor of a building. The three sheets 204, 206, 208 are ideally joined by regularly spaced blocks 210, which provide excellent strength characteristics and superior clearance between the top and middle sheets 204, 206 and between the middle and bottom sheets 206, 208, facilitating air flow and running pipes or wires as needed.

The multi-plenum panel 202 is preferably composed of three sheets of plywood or OSB preferably in the standard size of 4×8 foot sheets. The sheets are nominally 3 inch thickness. The sheets are spaced from, and joined to one another by blocks 210, preferably made of standard framing lumber of 2×4 inch nominal size (3.5 inch×3.5 inch×1⅝ inch), because of the high strength to weight ratio of wood, combined with its relative high availability and low cost. The blocks 210 are preferably spaced 7 inches on center each way. The blocks 210 are fastened with adhesive and/or mechanical means to enable the essential shear transfer to the middle sheet 206. The blocks 210 of the lower plenum 214 are preferably vertically aligned with the blocks 210 of the upper plenum 212, to allow for better transfer of stress. The size and spacing of the blocks 210 may be changed, but should ideally provide for at least three unobstructed air pathways 216 per every 24 linear inches along the edge of the multi-plenum panels 202 in each plenum. That is, both three pathways 216 in the upper plenum 212 and three pathways 216 in the lower plenum 214 per every 24 linear inches of the multi-plenum panel 202. Additionally, as shown in FIG. 35, there is ideally a pathway 216 between each row of bocks 210, along both the long and short edges of the multi-plenum panel 202. In FIG. 35, there are at least ten pathways 216 between the two long edges and at least five longer pathways 216 between the two short edges per, each plenum 212, 214. Each unobstructed pathway 216 should ideally measure between 5 and 6 square inches, and preferably be over 5.5 square inches in size, and should extend continuously from one edge of a multi-plenum panel 202 to another, opposite edge of a multi-plenum panel 202. It is anticipated that only plenum taps 218, registers 220, and plenum tubes 222 (each described fully below) will substantially impede these unobstructed pathways 216. These pathways 216 will allow for the easy passage of supply and return air, and facilitate easy placement of wire, cables, and pipes through the multi-plenum panels 202, without substantially impeding the passage of air.

The multi-plenum panel 202 allows for large spans for flooring applications of 48 inches with minimal deflection even when using ¼ inch sheets 204, 206, 208. Ideally, the top sheet 204 may be thicker (⅜ inch or ½ inch). The structural mechanism is that the middle sheet 206 facilitates the necessary shear transfer for the multi-plenum panel 202 to act as an "I" beam with significant strength and stiffness.

Ideally, the blocks 210 are a 1⅝ inch thick, which is the common thickness of finished structural lumber typically used in the building trades; however, the thickness could be larger or smaller depending on span requirements and air distribution requirements.

As shown in FIG. 38, the blocks 210 may be inset preferably 1⅝ inches from the edge. In such an arrangement, a strip 224 of 1⅝ inches×1⅝ inches by either 48 inches or 96 inches to be inserted along the edge for bearing strength. Additionally, foam sealant 226 of closed or open cell material could be applied along one or all edges either at the factory or in the field. This is primarily for edges of multi-plenum panels 202 that will form the boundary of the plenums, that is, the edges that are not joined to other multi-plenum panels 202. The sealant 226 helps prevent supply air from leaking from the plenums to unintended surrounding space. Additionally, the edge of the multi-plenum panels 202 may be sealed with impenetrable and/or airtight tape (not shown).

Where two adjacent multi-plenum panels 202 are joined, a maximum unobstructed flow of air between the respective plenums of the adjacent multi-plenum panels 202 is desired—taking into account structural support requirements. Therefore, a perforated strip may be used on all edges, to both increase bearing strength, but still allow for panel to panel flow of air. Alternatively, blocks 210 may be arranged flush with the edges, or additional blocks 210 or larger blocks 210 may be used to reach the edges of the sheets, to aid in bearing strength, while still maintaining air pathways 216. Additionally, the blocks may extend beyond the edges of one or more sheets 204, 206, 208, on one or more edges of the multi-plenum panels 202, and on a corresponding opposite edge of the one or more sheets 204, 206, 208, the blocks can be recessed from the edge by a similar amount. This will allow the blocks from a first multi-plenum panel 202 to matingly fit in a recess space in the plenum of an adjacent second multi-plenum panel 202 to which the first multi-plenum panel 202 is to be joined. Additionally, or alternatively, the blocks may be convexly chamfered on one edge of the multi-plenum panel 202, and the blocks may be concavely indented along an opposing edge of the panel 202—either the convexly chamfered or the concavely indented blocks or both may extend beyond the edge of the sheets 204, 206, 208, and fittingly mate with one another when two multi-plenum panels 202 are abutted side by side with one another, parallel in plane.

The multi-plenum panels 202 would be installed like regular sheathing using a combination of adhesive along the joists 228 and preferably screws through a series of blocks 210 into the joist 228. But as discussed above, because of the dramatically increased strength of the multi-plenum panels 202 verses regular floor sheathing, the joists 228 may be spaced at much greater distances from one another, including 48 inches on center, or farther.

The locations of the blocks 210 would be marked or otherwise shown on the exterior of the top and the bottom sheets 204, 208 to facilitate register 220 placement and plenum taps 218, and otherwise aid in installation of the multi-plenum panels 202.

The multi-plenum panels 202 will preferably include necessary plenum taps 218 in dimensions suitable for commercially available duct covers or registers 220 which are typically in size of 2×10, 2×12, 4×10, 4×12, 4×16, and other sizes.

As shown in the cutaway in FIG. 39, tapping into the upper plenum 212 only requires cutting a hole suitably sized for the register 220. Tapping into the lower plenums 214, on the other hand, will normally require a lower plenum tap 218, as shown in FIGS. 40-42. The opening in the top sheet 204 for the lower plenum tap 218 is approximately 1 inch larger than the opening in the bottom sheet 208. This facilitates cutting the bottom hole and securely attaching the plenum tap 218 to both sheets 204, 206 with caulking and mechanical means. The lower plenum tap 218 can be sized to fit standard registers 220.

The plenum taps 218 should be installed with caulk under all flanges and with screws. Plenum taps 218 can be constructed from either sheet metal or plastic.

As shown in FIG. 43, the plenum taps 218 can be constructed with one or more selector doors 230 and selector levers 232. If the selector lever is in a first position (as shown), the plenum tap selector doors 230 open an air pathway to the lower plenum 214 and close an air pathway to the upper plenum 212. Conversely, if the selector levers 232 are moved to a second position, the plenum tap selector doors 230 fold down to open the air pathway to the upper plenum 212 and close the air pathway to the lower plenum 214. This way, for example, if warm air is supplied through the upper plenum 212 and cold air is supplied through the lower plenum 214, a given register 220 can function as a supply register 220 regardless of whether the upper or lower plenum 212, 214 is supplying the air. If the lower plenum 214 supplies cold air, the selector levers 232 are moved to the first position, the plenum tap selector doors 230 access the lower plenum 214 for air supply and close off the upper plenum 212, to keep air from leaking from the supply (here lower) plenum into the return (here upper) plenum. Conversely, if the upper plenum 212 supplies warm air, the selector levers 232 are moved to the second position, the plenum tap selector doors 230 then access the upper plenum 212 for air supply and close off the lower plenum 214. The same principle will work for return registers 220 affixed to the plenum taps 218 constructed with selector doors 230 and selector levers 232. One register 220 connected to such a plenum tap 218 may be used as a return register 220 regardless of which plenum is supplying air, as the plenum for return air may be selected with the selector lever. This way, dedicated supply registers 220 can be placed near the exterior walls of the building and dedicated return registers 220 may be placed more toward the interior of the building, each accessing the upper or lower plenums 212, 214 as need be.

This multi-plenum panel flooring/air supply system would provide many advantages. For example, the multi-plenum panels 202 allow air distribution with substantially less or no ductwork. This leads to shorter construction time, cost savings, and decreased space requirements. The cost of ductwork for an average sized house can easily be $6,000 to $10,000, depending on complexity and design. If the savings are assumed to be $7,000 on an average house this would equate to a savings value potential of $86.15 per multi-plenum panel 202 used for flooring.

Also, the multi-plenum panels 202 easily allow air distribution to any location in any room. The multi-plenum panel 202 allows air distribution to smaller spaces that conventionally are not supplied conditioned air due to the cost relative to room size such as small bathrooms, laundry rooms, walk-in closets, pantries, small dens/studies. Because of the cost effectiveness, the multi-plenum panel 202 can inexpensively deliver conditioned air to and provide a cold/hot air return from every room, including closets. This is something only very elaborate and expensive systems now provide, because of the high costs providing a complete dual duct system involve.

As an additional benefit, if the upper plenum 212 is used to deliver heated air in the winter, the warmed upper plenum 212 can radiantly create and provide a warm floor to every room on a given level. This is a very desirable feature normally only available by using an expensive liquid radiant heating system.

The same procedure is used for providing cool air distribution in the summer. However, to prevent cold floors, if they are undesired, the cool supply could be directed to the lower plenum 214 while the return warmer air to the upper plenum 212.

If the two plenums are un-insulated between one another, the return air traveling through the return air plenum may be tempered, that is, heated or cooled, by the supply air in the supply air plenum. This offers the benefits of a built in air exchanger recapturing heat loss or cooling losses.

Testing shows deflections in the range of 1/200 for a 150 pound per square foot load having a 48 inch span. For a load more typical of residential design, the multi-plenum panel 202 would expect a deflection of 1/600 for a 48 inch span—greatly exceeding typical design criteria and expanding design building possibilities.

Using a 48 inch span for flooring would reduce the number of joists 228 required for the flooring by two thirds, saving significant material and labor costs. These savings could be around $3,000 for a typical house. Additionally, the electrical, mechanical, and plumbing trades would also benefit from having two thirds less obstacles (joists 228) to run their various wires, ducts and pipes. Again, savings could be significant to these trades, and could be around $2,000 for a typical house. Thus, there are significant savings in time, labor, and money that are associated with utilizing a multi-plenum panel 202 for combined flooring and air supply. Savings of around $12,000 for a typical house are envisioned, equating to a $127 savings per multi-plenum panel 202, for the 94 multi-plenum panels 202 in such a house.

The multi-plenum panels 202 can provide for the distribution of air through the ceiling of a lower level 234 (e.g., first story) and the floor of an upper space (e.g., second story), to the air of an upper level 236. This means one multi-plenum panel 202 directly connected to a central heating and/or cooling unit 238 can supply and return air to two stories or levels at once. For such a design, flooring multi-plenum panels 202 used to support a second story 236 would use longer plenum taps 218 to access air distribution from a first story 234 for the second story 236. That is, to reach and be flush with the first story ceiling, directly below the second story flooring multi-plenum panels 202, longer plenum taps 218 would be required to accommodate the inter-story joist 228 thickness. Such first story 234 to second story 236 plenum taps 218 would allow direct condition air supplied multi-plenum panels 202 under the first story 234 to supply conditioned and return air a two story building.

Turning now to FIG. 44, an air distribution system using multi-plenum panels 202 as described is shown. In the example shown, in a basement or lowest level 240 of a building a central heater/air conditioner 238 supplies heated air through a supply trunk 242 to an upper plenum 212 of the multi-plenum panels 202 of a first story 234. The forced heated air spreads out across the upper plenum 212, remaining separate from the lower plenum 214, and exits the upper plenum 212 in one of a plurality of registers 220 tapped into the upper plenum 212 (only one upper plenum 212 register 220 is shown). The heated air dissipates through the first story 234 air space, heating the first story 234 air. The heated air continues to rise, passing through a longer second story plenum tap 218 and register 220 and into a second story 236 air space. Some of the air will cool down and pass from the second story 236 air space, through an additional longer second story 236 plenum tap 218 and back into the first story 234 air space. It is also envisioned that the longer second floor plenum taps 218 may be electrically wired and narrow fans (not shown) will be placed in the longer second story 236 plenum taps 218 to aid in air circulation. Once cooler air is in the first story 234 air space, it is then returned via suction or lower air pressure through one of a plurality of registers 220 tapped into the lower plenum 214 of the multi-plenum panels 202 of the first story 234 (only one lower plenum 214 register 220 is shown). A return trunk 244 then brings the cooler return air from the lower plenum 214 back to the central heater/air conditioner 238 in the lowest level 240, to be heated, and begin the process over again.

In a further example of an air distribution system using multi-plenum panels 202, as shown in FIG. 45, the central heater/air conditioner 238 supplies forced air and receives return air directly from both the first and second story 234, 236 multi-plenum panels 202. A separate supply trunk 242 attaches to the upper plenum 212 of the multi-plenum panels 202 on each of the first and second stories 234, 236. Similarly, a separate return trunk 244 attaches to the lower plenum 214 of the multi-plenum panels 202 on each of the first and second stories 234, 236. By directly supplying and returning air from each of the two stories 234, 236, the climate of the two stories 234, 236 may be controlled to a higher specificity, resulting in higher comfort levels for building occupants.

Turning now to FIGS. 46 and 47, the connection of the air supply and return trunks 242, 244 to the multi-plenum panels 202 will be discussed. As shown, the air supply and return trunks 242, 244 preferably to do not deliver and receive air from the multi-plenum panels 202 through a single large opening. Rather, a plurality of smaller, preferably circular, openings or mating holes 246 are coupled to circular plenum tubes 222 to form the connection between the trunks 242, 244 and the respective plenums 212, 214. In this embodiment, the trunks 242, 244 extend to the lower face of the bottom sheet 208. For the return trunk 244, a plurality of smaller circular plenum tubes 222 extends from the trunk 244, through circular mating holes 246 in the bottom sheet 208, and into the lower plenum 214. The return plenum tubes 222 will preferably each have flanges to be secured to the inside face of the bottom sheet 208. For the supply trunk 242, a similar plurality of smaller plenum tubes 222 extends from the trunk 242, through circular mating holes 246 in the bottom sheet 208, and into the lower plenum 214, and continues through the lower plenum 214, through circular matting holes 246 in the middle sheet 206, and into the upper plenum 212. Though the supply plenum tubes 222 extend through the lower plenum 214, they do not exchange air with the lower plenum 214. Similarly, the supply plenum tubes 222 will preferably have flanges to be secured to the upper face of the middle sheet 206. The supply plenum tubes 222 may be insulated to prevent heat exchange when crossing the lower plenum 214.

By transitioning between the trunks 242, 244 and the plenums 212, 214 via the plurality of smaller openings (mating holes 246), the structural integrity of sheets 208. 206 and the multi-plenum panel 202 as a whole are better maintained. Additionally, by shaping the openings 246 as circles, the openings 246 avoid high stress/lower strength corners of regular polygon shapes. The supply and return trunks 242, 244 may both be connected to the same multi-plenum panel 202, but preferably are connected to separate multi-plenum panels 202, to better dissipate the structural weakness caused by forming the mating holes 246 in the sheets.

Turning to FIG. 48, a single multi-plenum panel 202 is shown supported by joists 228 spaced 48 inches off center. Preferably, the joists 228 will be aligned under the blocks 210, to aid in stress transfer. At the intersection of two multi-plenum panels 202, additional blocks 210, longer blocks 210, or some other insert may be placed in the plenums to aid in stress transfer.

Turning to FIG. 49, a detail of the edge of a lower level or first story multi-plenum panel 202 is shown. Along the perimeter of the multi-plenum panel 202, a strip 224 has been inserted to better bear the load of the exterior wall 248 above. The joist 228 below the multi-plenum panel 202 is vertically aligned with the strip above the joist 228 and the foundation wall 250 below.

As seen in FIGS. 50-52, different means may be used to connect adjacent multi-plenum panels 202 to one another. As the multi-plenum panels 202 will be carrying pressurized air in at least one of the two plenums 212, 214, it is important to minimize air leakage from the pressurized plenum to the surrounding air space. Further, because, unlike traditional ductwork, the multi-plenum panels 202 serve a primary structural support function also, it is important to transfer stresses at the edge of the multi-plenum panels 202 and provide structural continuity among all multi-plenum panels 202 joined on a single floor. To assist in reducing air leakage at the intersection of two adjacent multi-plenum panels 202, special shaped sheet edges or joining attachments are used.

FIG. 50 shows a tongue and groove pattern 252 along the edges of adjacent multi-plenum panels 202. The tongue of a first sheet 204, 206, 208 will be inserted into a mating groove of an adjacent sheet 204, 206, 208, and provides a continuous connection that transfers stress in both directions and minimizes air flow. Adhesive and/or caulking would also preferably be applied in the tongue and groove fitting 252, to increase the strength of the bond and decrease any air losses.

FIG. 51 shows a lap joint 254, where two mating edges are joined. This method may be easier to be used with thinner sheets 204, 206, 208 are joined together. Adhesive and/or caulk would preferably be applied along the joint to help minimize air loss and also increase joint strength in both directions of vertical stresses.

FIG. 52 shows an elongated "H" clip 256, which could be constructed from metal or plastics, to connect the sheets 204, 206, 208 of adjacent multi-plenum panels 202. Adhesive and/or caulk could be used in conjunction with the clips 256. The clips 256 would be attached to the edges of the sheets 204, 206, 208, and are intended to be continuous and either 48 inches or 96 inches in length. Though the edges shown in this figure are rectangular, alternate shaped edges, like those shown in FIGS. 50 and 51, or other non-rectangular edges could be used with clips 256 that are shaped to be flush with each connecting edge. Such alternate clips 256 would, therefore, not necessarily be shaped like the "H" in FIG. 47, but would shaped to mirror whatever non-rectangular edges of the sheets 204, 206, 208 joined. An advantage of using the clips 256 to mate the edges of two sheets 204, 206, 208 together is that if the clips 256 are formed of high strength material, the clips 256 could add additional structural integrity to the naturally potential weak location of the intersection two multi-plenum panels 202.

With each connection, an impervious and/or airtight adhesive tape can be applied to joined edges to ensure air tightness. Further, an impervious and/or adhesive tape can be applied to the entire edge wrapping into the multi-plenum panel 202 at the top and bottom to ensure all the edges are airtight.

A floor multi-plenum panel 202 prototype was tested with the following results. Three separate 1/4 inch thick 2×4 foot CDX plywood sheets were used for the top, the middle and the bottom sheets 204, 206, 208 of the multi-plenum panels 202. The matrix used to join the bottom and the middle sheet 208, 206 and the middle and the top sheet 206, 204 respectively were 3½ inch by 3½ inch Pine/Spruce blocks 210, with approximately 3½ inch spacing between the blocks 210. That is, three blocks 210 were spaced evenly in 24 inches, and six blocks 210 were spaced evenly in 48 inches. As a result of the bock 210 size and spacing, there was nine square inches of unobstructed free vent area per linear foot. The blocks 210 were attached to the sheets 204, 206, 208 using an interior wood glue type of adhesive—specifically a polyvinyl acetate glue.

The multi-plenum panel 202 was loaded with 1,200 lbs. spaced uniformly across the multi-plenum panel 202 creating a pressure of 150 pounds per square foot. The weighted multi-plenum panel 202 was supported along the short two foot edges creating a 48 inch simple span, with 44 inches clear between the supports. The multi-plenum panel 202 had a maximum deflection of 0.250 inches, an "L/" of 192 and an area moment of inertia, $I_x$, in$^4$ per foot, equal to 20.00.

A control panel was used for comparison. The control panel was a single ½ inch sheet of plywood measuring two feet by four feet. The control panel was loaded with 600 lbs. spaced uniformly across the sheet, creating a pressure of 75 pounds per square foot. The control panel was similarly supported along its shorter two foot edge, creating a 48 inch simple span, with 44 inches clear between the supports. The control panel displayed over an inch of deflection, with only half the load of the floor panel. In more detail, the control panel had a maximum deflection of 01.10 inches, an "L/" of 44 and an area moment of inertia, $I_x$, in$^4$ per foot, equal to 0.016.

Thus, the multi-plenum panel 202 demonstrated a bending strength of 9 times greater than the equivalent thickness of plywood alone. The multi-plenum panel 202 demonstrated a significant strength at a 48 inch spacing and would be serviceable for residential and commercial uses at this span with only ¼ inch sheets 204, 206, 208. These results were a better than predicted strength, despite using an inferior polyvinyl acetate adhesive instead of using a preferable thermoset phenol-formaldehyde adhesive between the blocks 210 and the sheets 204, 206, 208.

Alternate embodiments of the multi-plenum panel are envisioned. The invention consists of three sheets 204, 206, 208 of the same size and assembled in parallel planes separated ideally by blocks 210 of wood in a square shape, but the blocks 210 could also be rectangular, round or the sheets 204, 206, 208 could also be separated by a matrix of elongated wood members, or an extruded or engineered matrix, in a stacked perpendicular matrix or otherwise arranged as described in the above embodiments of the ventilated structural panels 2, 2', 2A. The interior could also be an arrangement of plastic or metal extruded or formed members as described above. Additionally, a single plenum panel embodiment, with two sheets connected by a plurality of spacing structural elements, as described above, may be connected in an air tight manner to a central heater and air conditioner 238 to one of deliver conditioned air to or receive return air from an entire level of a building, or some part thereof.

The sheets 204, 206, 208 can be of various thicknesses. The top sheet 204 could be ¼ inch to ½ inch to even ⅝ inch, ¾ inch or 1 inch to accommodate floor covering and structural needs. The middle sheet 206 only needs to be ¼ inch in thickness to accomplish the structural needs of a 48 inch span. The bottom sheet 208 also needs to only be ¼ inch thick to accomplish the structural needs for a 48 inch span, but each sheet 204, 206, 208 may have the various thickness options listed for of the top sheet 204, as the specific designs may require. Also, the sheets 204, 206, 208 can be of different thicknesses to accommodate different needs. The sheets 204, 206, 208 are ideally 4'×8' sheets, as this size is typically used in the building trade, but the sheets 204, 206, 208 can be sized larger or smaller.

The sheets 204, 206, 208 are ideally constructed of plywood or OSB, but could also be of a plastic, vinyl, metal or other man made or natural material.

The sheets 204, 206, 208 may be treated with an antibacterial agent or even with a waterproofing to prevent the formation of mold should the multi-plenum panels 202 be used for cooling and where condensation is a risk due to cool supply air and high humidity environments. Additionally, the interior of the multi-plenum panels 202 could be entirely coated with a waterproofing covering.

The multi-plenum panels 202 and blocks 210 could also be constructed out of pressure treated lumber and plywood to inhibit any decay or possible mold. An alternative solution is to provide supply air at a temperature where condensation is not in the probable range of the design. Alternatively, if condensation is possible, then the system could be programmed to air dry the plenums 212, 214 sufficiently after achieving desired room ambient temperatures.

Additionally, the sheets 204, 206, 208 could be coated to prevent condensation absorption if it occurs, and could be insulated with a "blanket" of thin reflective insulation on the inside and/or outside faces of each sheet 204, 206, 208.

Figure 53:
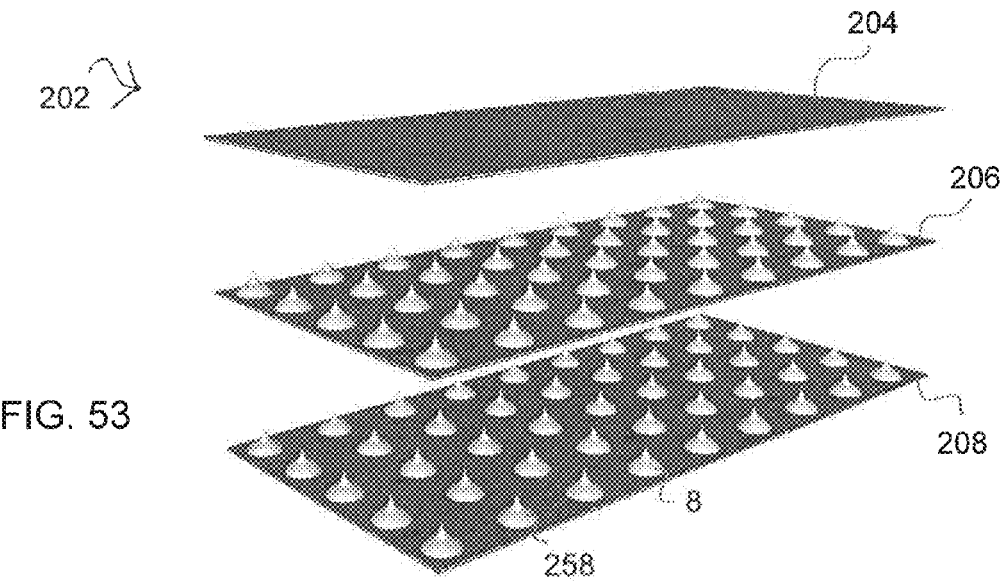
FIG. 53 is an exploded perspective view of the panel of FIG. 34 using glob spacing structural elements, before compression.

Turning now to FIG. 53, the various spacing structural elements for the single and multi-plenum panels 2, 202 will be further described.

Turning to FIG. 53, various embodiments of the spacing structural elements 8 are further described. The spacing structural elements 8 can also be constructed by extruding or depositing a predetermined amount of adhesive or plastic or foam in a regular geometrical pattern or specialized pattern for structural purposes. These deposits or globs 258 would be a deposit of semi-liquid material with adhesive and structural qualities when cured. The material may cure with or without heat, and/or, for example, with exposure to oxygen or various wavelengths of electromagnetic radiation. Once cured, the glob 258 can have the same qualities of the block 210 spacing structural elements 8 above, with similar orthogonal intersecting air flow paths, spacing between, height and width measurement, and other qualities.

The anticipated process utilizing the globs 258 is to deposit the required amounts of semi-solid/semi-liquid material in a predetermined pattern, as required for structural needs, on the bottom sheet 6, 208 of the panel 2, 202. The top sheet 4, 204 (or middle sheet 206 for a multi-plenum panel 202) is then laid on the bottom sheet 208 and compressed to the desired thickness causing some lateral expansion in the globs 258, such that they attain a circular shape of preferably between 2" to 8", as required for structural needs. The quantity of material in each glob 258 is preferably between 1.5 cubic in. and 50 cubic in., not including consideration of the displacement of volume from any imbedded insert 260 (see FIG. 55).

As shown in FIG. 53, for multi-plenum panels 202, the deposits or globs 258 are also made to the top surface of the middle sheet 206 and the top sheet 204 is then placed on the middle sheet 206 and compressed to the desired thickness.

The glob 258 material is semi-liquid/semi-solid adhesive or foam or similar material. The glob 258 may have a flat-bottomed teardrop or "Hershey's kiss" shape after being deposited and before compression. The glob 258 material preferably has a viscosity and quantity such that when the sheets 204, 206, 208 are pressed together the resulting thickness of the assembly is of the desired panel 2, 202 thickness. Spacers 262 and/or inserts 260, described below, may be used to insure proper spacing when the sheets 204, 206, 208 are pressed together. Spacers 262 can be placed around the perimeter and interior between the adhesive deposits to insure the desired thickness when pressed. The spacers 262 can be permanently attached to one or both sheets 204, 206, 208 or just be temporarily placed, to be later removed. The spacers 262 can be positioned on the sheets 204, 206, 208 before, during, or after the globs are deposited.

Figure 56:
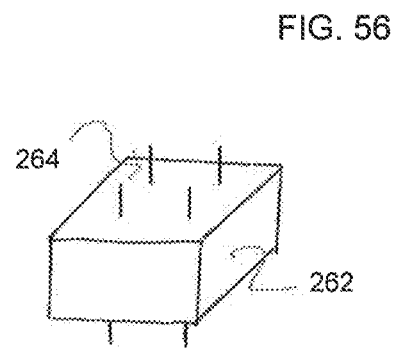
FIG. 56 is a perspective view of a spacer.

The spacers 262 can consist of pressed metal shapes that penetrate one sheet 204, 206, 208 when pressed, and/or could have one or more protrusions or spikes 264 that penetrates the adjacent sheet 204, 206, 208 when the other sheet 204, 206, 208 is pressed into the panel 2, 202 assembly (see FIG. 56). The spacers 262 can also be blocks 210 of wood or plastic that can be adhered to one or both of the adjacent sheets 204, 206, 208. Spacers 262 can also consist of plastic shapes spaced or glued to one sheet. The spacers 262 can be also be free from adhesive, or only have non-permanent adhesive, and be designed to be removed after the globs 258 cure.

Figure 55:
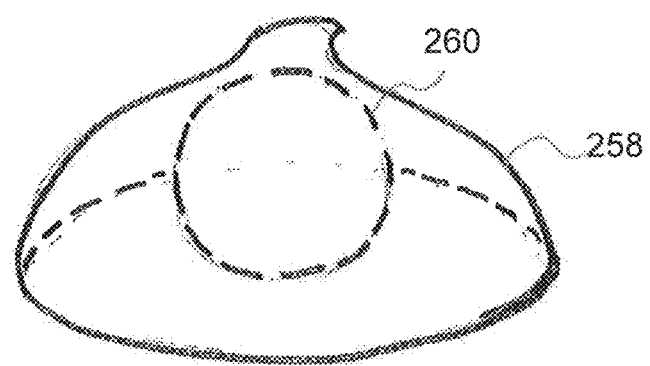
FIG. 55 is a close up view of a glob of FIG. 53, with an embedded insert.
Figure 57:
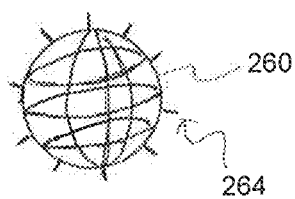
FIG. 57 is a perspective view of a caged insert with spikes.

Referring to FIG. 55, a first example of an insert 260 is shown. A ball or sphere of diameter between ½" and 3" is embedded in a quantity of adhesive and/or foam glob 258. The insert 260 and the glob 258 may be dispensed or extruded at the same time through a common dispenser or extruder, or they may be dispensed via separate dispensers at the same or different times. The insert 260 may be solid or hollow, and may have a continuous surface as shown, a perforated surface, or a cage surface, as shown in FIG. 57. The surface of the insert 260 may be smooth, as shown in FIG. 55, textured, or, FIG. 57, have protruding studs or spikes 264 of sufficient strength to penetrate the sheets 204, 206, 208 being pressed into to create the glob 258/insert 260 combination. The inserts 260 may be constructed of a variety of materials compatible with the adhesive and/or foam. Additionally, the inserts 260 may be used independently of and/or without the glob 258 material. Other embodiments of inserts 260 are shown in FIGS. 98 and 99. FIG. 98 shows a wire frame triangular pyramid shaped insert 260 pressed into a sheet 204, 206, 208, or embedded into a glob 258. FIG. 99 shows a solid triangular pyramid shaped insert adhering to a sheet 204, 206, 208, or embedded into a glob 258. Some of the various qualities of the inserts 260 are discussed further below.

The inserts 260 may be either hollow or solid depending on weight, cost, and the material requirement. Though only a single large sphere is shown in FIG. 55, it is anticipated that a plurality of smaller inserts 260 could be used in each glob 258 to add structural integrity to the glob 258.

The inserts 260 may have a continuous surface, as shown in FIG. 55, which allows for ease of production and stronger insert 260 units. The inserts 260 may also have a perforated surface, which, depending on the size of the perforations, could allow the glob 258 material to seep into and better bind with the inserts 260. If the inserts 260 are used without a glob 258, the perforations could allow air to pass through the inserts 260 and thus increase air flow through the plenum. Also, the inserts 260 may have a frame like or cage exterior, as shown in FIG. 57. This would add the least amount of weight to the panel and allow for greatest integration between the insert 260 and the glob 258, or, if used independent of the glob 258 the greatest air flow. The cage surface would, all things equal, also be the weakest of the surfaces, which must be accounted for with increased strength via other measures, e.g. stronger material or increased thickness of the cage, using the cage surfaced insert 260 in a glob 258, and/or increasing the number of cage surfaced inserts 260 used compared to the number of continuous surfaced inserts 260 used in the same situation.

The inserts 260 may have a smooth surface, as shown in FIG. 55, which would allow for easier manufacture, but such a smooth surface would decrease the ability of the glob 258 material to adhere to the insert 260 and, in many shapes, would provide no mechanical adhesion between the insert 260 and the adjacent sheet 204, 206, 208. If the adjacent sheet 204, 206, 208 is of a type that must remain un-punctured, or has a layer one that must remain un-punctured or intact, smooth surfaced inserts 260 may be necessary. If used without globs 258, smooth surfaced inserts 260 would preferably be adhered to the sheets 204, 206, 208 with adhesive or bonding. Additionally, the insert 260 may have a textured surface, for example, with dimples or bumps. This would aid in the insert 260 bonding to the glob 258 if used with a glob 258, but would potentially increase manufacturing time and limit the types of materials used.

In another, and likely a preferable embodiment, the inserts 260 would have a surface that included spikes 264, barbs, or other such projections. The spikes 264 would aid in the glob 258 bonding to the insert 260, allowing the glob 258 material to envelop the spikes 264, and would provide a means for mechanical adhesion of the insert 260 to the adjacent sheets 204, 206, 208. The spikes 264 would need to be of a quantity, thickness, length, and with a sufficiently sharp apex and/or edge, that the spike 264 would perforate but not damage the adjacent sheets 204, 206, 208. The spikes 264 would preferably protrude or extend from the surface of the insert 260 a length less that the thickness of the adjacent sheets 204, 206, 208, so that the spike 264 would not fully pierce through the sheets 204, 206, 208, from one surface to the other. The spikes 264 could be uncoated, or could be coated with a cement, vinyl, or resin coating that melts with the heat generated from the friction during insertion, but that solidifies when cooled. The coating would provide extra adhesion between the spike 264 and the sheets 204, 206, 208.

There are a variety of shapes that the inserts 260 may take, depending on if used with glob 258 material or not, and other panel 2, 202 requirements, like strength, air flow, and weight. The inserts 260 may be shaped as spheres or spheroids, cylinders, pyramids, rectangular or triangular prisms or other polyhedrons. The inserts 260 may have one or more bores or passageways extending partially or fully through the shape to allow passage of air or glob 258 material.

Figure 58:
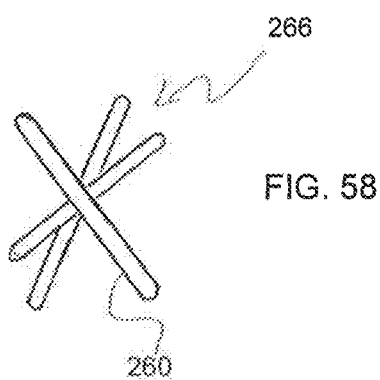
FIG. 58 is a perspective view of a barricade shaped insert.

The inserts 260 may also be shaped, as shown in FIG. 58 for example, as a barricade 266. This design provides three points of contact with each sheet, while using minimal material and providing significant air passage. A spike 264 normal to the sheets 204, 206, 208 may be formed on each of the six terminal ends of the barricade 266, or the terminal ends themselves may be sharpened, barbed, or otherwise function as spikes 264. Additionally, if used with globs 258, the barricade 266 shape can be easily and fully integrated in the glob 258, providing structural support and spacing. The three arms of the barricade 266 can each be oriented at 90 degrees to the other two arms, or the arms can intersect at acute and/or obtuse angles to form taller or shorter barricades 266, and thus more or less spacing between the two sheets 204, 206, 208.

Figure 59:
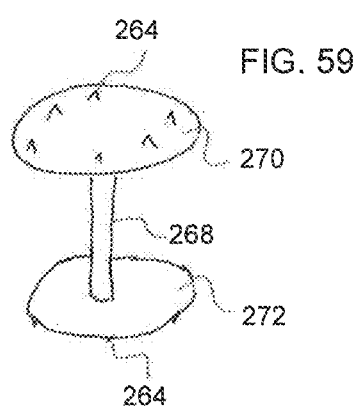
FIG. 59 is a perspective view of a spacer with an elongate mid-section.

The inserts 260 may also have an elongate mid-section 268 that extends and spaces top and bottom portions 270, 272 of the insert 260 from each other. One embodiment, shown in FIG. 59, adopts a spindle type design, with disc shaped top and bottom portions 270, 272 spaced apart by a middle rod 268. The top and/or the bottom portions 270, 272 could have cleats, barbs, or spikes 264 to aid in mechanically attaching the insert 260 to the adjacent sheets 204, 206, 208, and could additionally or alternatively be attached to one or both sheets 204, 206, 208 with an adhesive.

Figure 60:
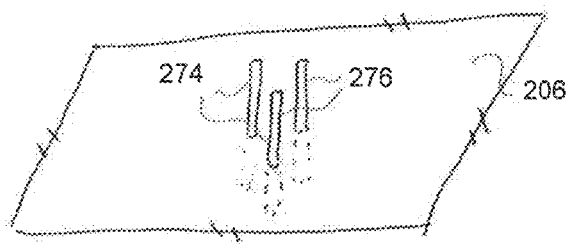
FIG. 60 is a perspective view of three through inserts in a middle sheet.
Figure 61:
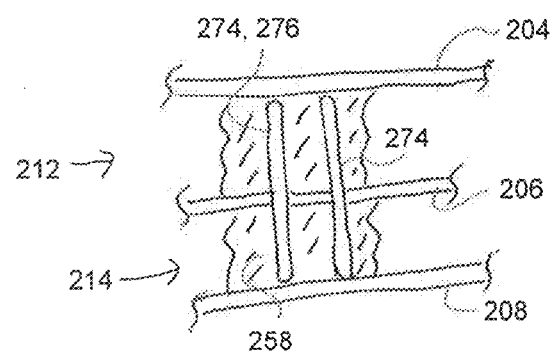
FIG. 61 is a close up side sectional view of a multi-plenum panel where two through inserts pass through a middle sheet and two globs.

The inserts 260 may also extend completely through one or more of the sheets 204, 206, 208. See, for example, FIGS. 60-62. As shown in FIGS. 60 and 61, these through inserts 274 could be as simple as one or more thin rods 276 that extend through the middle sheet 206, both upwardly and downwardly, into both the upper and the lower plenums 212, 214. The rods 276 could be used with or without the glob material 258. The rods 276 could serve a spacing function for the globs 258, easily slicing through the uncured glob 258 material and contacting the inwardly facing surface of the top or bottom sheet 204, 208 as the panel 202 is pressed together. The panel 202 could also be pressed further, pressing the rods 276 into the top and bottom sheet 204, 208 as the entire panel 202 is pressed together, thereby providing a direct mechanical connection between the top, middle, and bottom sheet 208. In the embodiment shown, a plurality of rods 276 would be used with a single glob 258.

The rods 276 may be smooth sided, the least expensive and easiest embodiment to manufacture. Alternatively or additionally, the rods 276 may have vertical ridges around the axis of the rod 276, have horizontal ribs or rings up the length of the rod 276, have a helical ridge twisting up the length of the rod 276, and/or have a textured surface 276.

The through inserts 260 like the rod 276 can be forced, screwed, or punched through the sheet 206 after the sheet 206 is formed.

Figure 62:
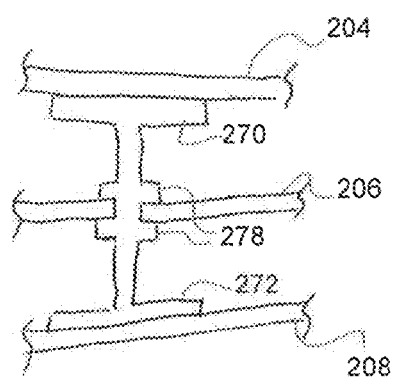
FIG. 62 is a close up side sectional view of an integrated through insert.

In another embodiment, the sheet 206 may be formed or molded around the through insert 260, whereby the through insert 260 is integrated into the sheet 206 when the sheet 206 is formed. For example, FIG. 62 shows an integrated through insert 260 where the middle sheet 206 is formed around the insert 260. The insert 260 has an extended spindle shape with an expanded contact surface 278 on upper and lower surface of the middle sheet 206. The expanded contact surface helps distribute force from the top 204 or bottom sheet 208 to the middle sheet 206, and maintain the through insert 260 in a fixed vertical position with respect to the middle sheet 206. In the embodiment shown, the through insert 260 also has a preferably disc shaped top and bottom portion 270, 272, contacting the inward facing surfaces of the top and bottom sheets 204, 208, and limiting their respective inward movement. The top and bottom portions 270 of the through insert 260 may have cleats, barbs, or spikes, 264 and/or adhesive applied.

The molded through or integrated insert 260 may also have a cage or perforated surface. For example, a cylinder with a cage surface could be integrated into the middle sheet 206 when the sheet 206 is formed. In such an embodiment, the cylinder shaped through insert 260 would project out of the top and bottom of the middle sheet 206. The cylinder shaped through insert 260 could then easily encase and integrate with a glob 258 deposited on the bottom sheet 208 and on the top side of the middle sheet 206 in one simple step.

In another embodiment of a through insert 260, as shown in FIGS. 63 and 64, a nail shaped through insert 260 can be used. The nail shaped through insert 260 could, for example, be driven through the middle sheet 206 in a downward direction, anchored by a disk shaped top portion 270 to the rod 276 on a top surface of the sheet 206. As shown, the inserts 260 can be driven both upwards and downward through the same middle sheet 206. The leading end of the insert 260 may extend all the way through the opposing top or bottom sheet 208, and, as shown, the leading bottom end of the insert 260 could be pressed or crimpled below the lower surface of the bottom sheet 208, or a disk shaped bottom portion 272 could be attached. In this manner, the middle and top and bottom sheets 208 are mechanically fixedly secured together. Additionally, or alternatively, the nail shaped through inserts 260 may be driven into the top sheets 204 downward and into the bottom sheets 208 upward, each toward the middle sheet 206.

Figure 65:
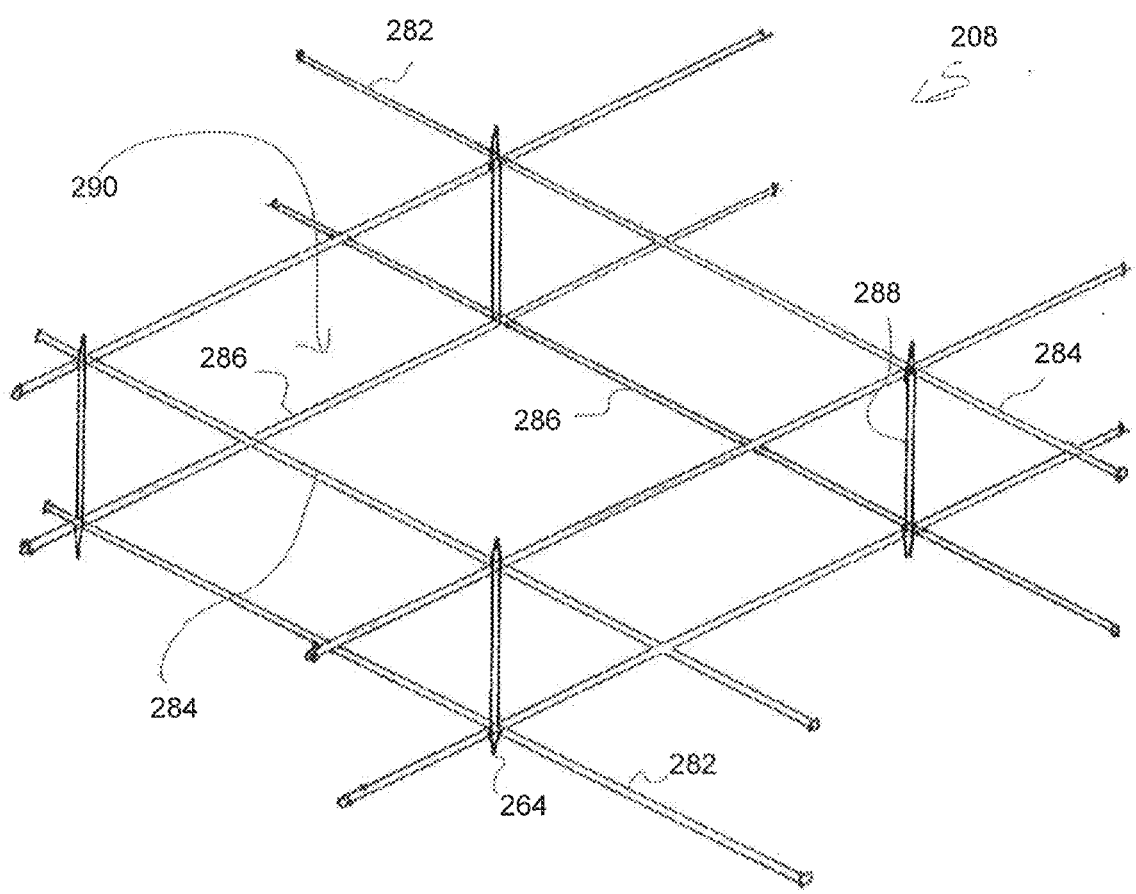
FIGS. 65 and 66 are perspective views of an orthogonal frame used in the panel.
Figure 66:
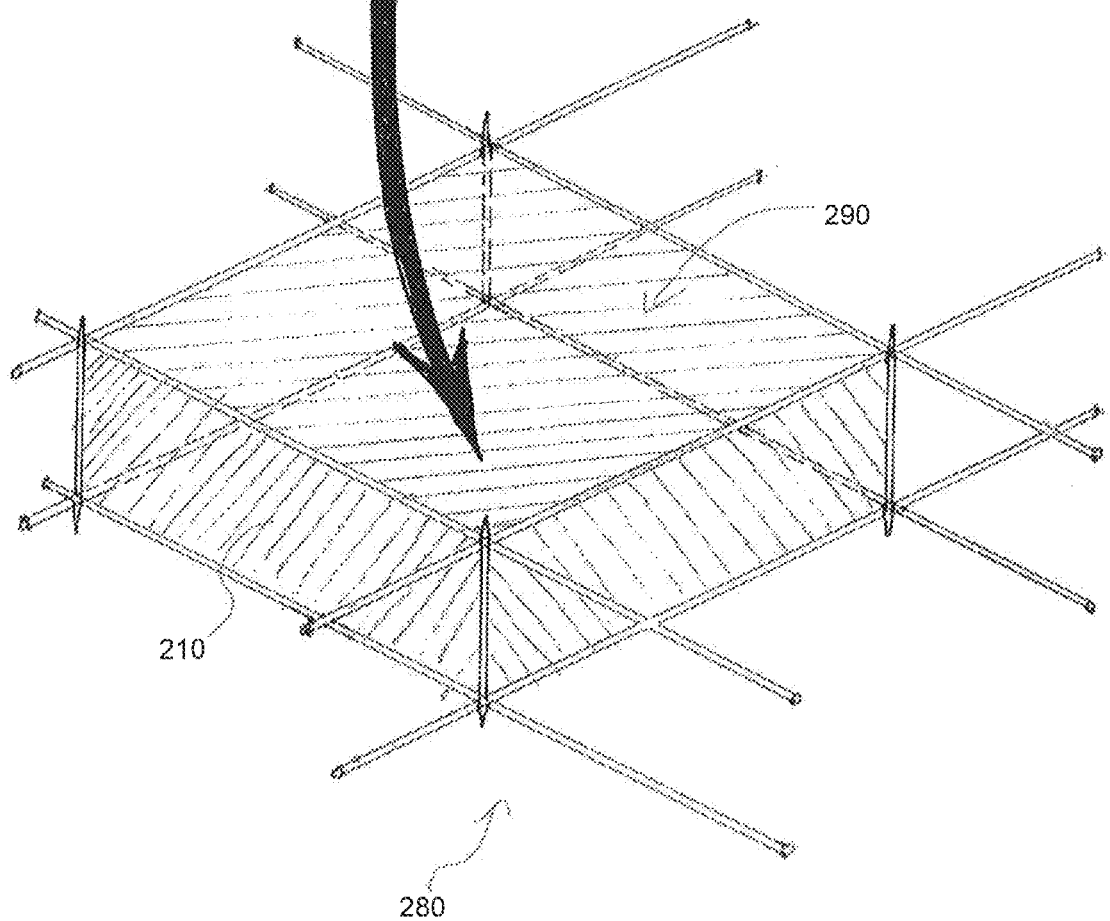

Referring next to FIGS. 65 and 66, a matrix of an orthogonal frame 280 of thin tubes or wires 282 consisting of metal, wire, fiberglass, carbon fiber, plastic or other suitable material, or combinations of such materials assembled in three dimensional a grid pattern is shown. Such pattern has a height of the desired spacing between sheets 204, 206, 208 in the panel 2, 202, not counting any optional upper or lower projections or spikes 264 intended to be inserted into adjacent sheets 204, 206, 208. The orthogonal frame 280 is constructed of an upper lateral grid 284 and a lower lateral grid 286 joined together by a plurality of vertical straps 288. The frame 280 may be unitary, or joined by gluing, welding, melting or otherwise fixedly joining the separate members together. The lateral spacing of the separate individual wires 282 is determined by the requirements of any spacing structural elements 8 that are to be placed within the square or rectangular defined spaces 290, defined by spacing in the upper and lower lateral grids 284, 286.

The spacing structural elements 8 that are to be placed within the defined spaces 290 can be wood blocks 210, plastic blocks 210, permeable material or organic, inorganic material or plastics or composite material of a combination of organic and/or inorganic material such as a wood fibrous material in a resin or adhesive or steamed wood material and adhesive, or glob 258 material.

The orthogonal frame can have spikes 264 that are designed to be embedded in the adjacent sheets 204, 206, 208 when pressed in the panel 2, 202 production. The upper or lower terminal edge of the spikes 264 may be flat, rounded, smooth, sharp, or barbed, depending on the mechanical adhesion requirements.

The spacing structural elements 8, whether a solid or semi-solid adhesive or foam, will preferably have adhesive applied or have adhesive characteristics such that the spacing structural elements 8 will preferably bond to adjacent sheets 204, 206, 208 and transfer structural stress from one sheet 204, 206, 208 to the other.

As shown in FIG. 66, the defined space 290 may be filled by either a solid or a semi-solid material that has been compressed to take the rough shape of the defined space 290. Specifically, FIG. 66 shows the placement of a spacing structural element 8 comprising a block 210 of material placed within the orthogonal frame. This block 210 could be of solid or permeable or semi-solid material of the desired thickness such that the upper and lower edges can strongly adhere to the adjacent sheets 204, 206, 208, without voids, when the adjacent sheets 204, 206, 208 are pressed together. Such spacing structural elements 8 can be of wood, wood composite material, wood steamed composite material, plastics, permeable material, plastic blocks 210, and plastic blocks 210 with a matrix of voids such as open cell foams. The material would preferably be capable of transferring the desired structural stress from one sheet 204, 206, 208 to the other. In a further embodiment a glob 258 could be deposited in the defined space 290 of the orthogonal frame 280.

It is to be noted that if the orthogonal frame 280 was of sufficient strength, it could, by itself, function as the spacing structural element 8 connecting the two adjacent sheets 204, 206, 208 to one another without requiring the addition of a separate block 210 or glob 258 in the defined space 290. Such an embodiment would preferably include a plurality of diagonal truss members 292, described further below.

Figure 67:
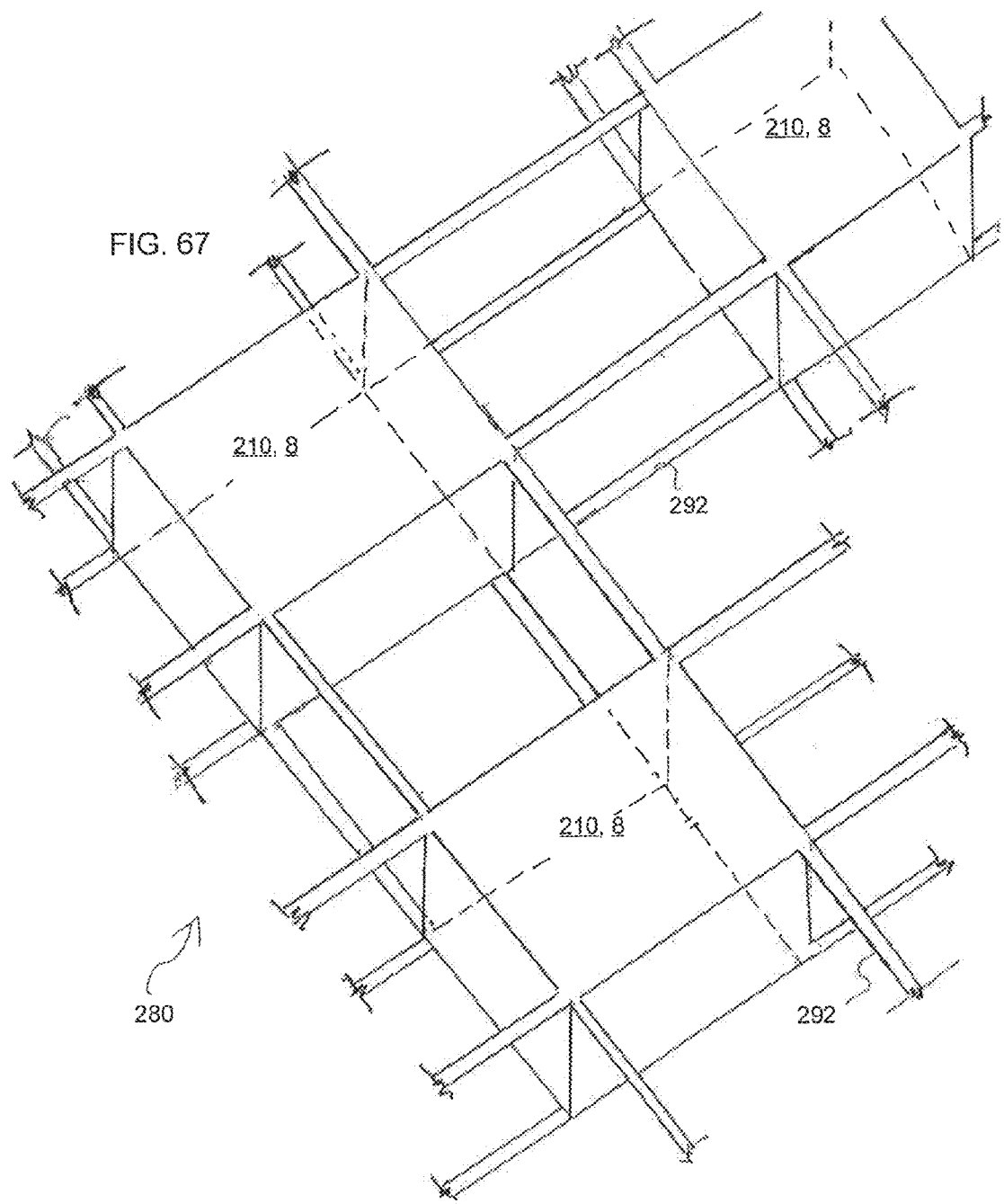
FIGS. 67 and 68 are perspective views of unitary or bonded orthogonal frame.
Figure 68:
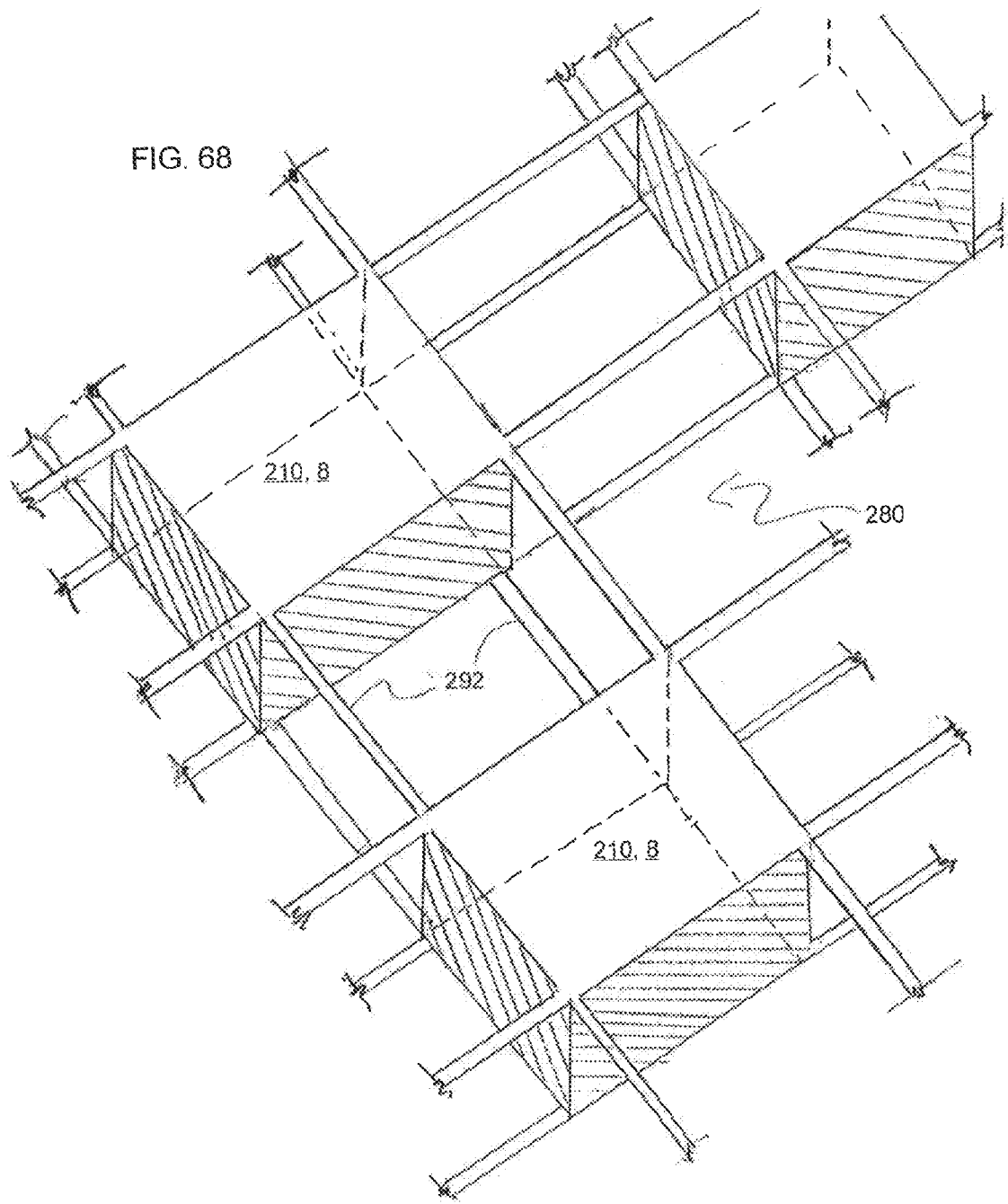

While in one embodiment of the orthogonal frame 280, a block 210 or glob 258 is intended to be placed into the defined space 290, according to another embodiment, as shown in FIGS. 67 and 68, the spacing structural element 8 may be unitary or bonded with the orthogonal frame 280. FIG. 67 shows a three dimensional extruded or bonded orthogonal frame 280/block 210 assembly. Each spacing structural element 8 can be solid or hollow and is attached on the top and the bottom with lateral straps 292 to the adjacent spacing structural element 8. The spacing structural elements 8 incorporated in this assembly may be hollow, and may additionally have an array of voids such that the flow of air is enhanced through the spacing structural elements 8 as well as around the spacing structural elements 8.

The lateral straps 292 between the spacing structural elements 8 in this embodiment can be of the same material or a different material as the spacing structural elements 8. The lateral straps 292 can be manufactured integrally or bonded/attached to construct the orthogonal frame 280. The spacing structural element 8 blocks 210 in this embodiment are preferably a dimension of between 2"×2" to 8"×8" with a height of between ½" to 4". The spacing structural elements 8 may also be rectangular shaped with the same dimensional constraints. The spacing structural elements 8 are most desirably spaced from 2" to 12" between each other. FIG. 68 shows the same bonded orthogonal frame 280/block 210 with the bonded solid inserts 260 hashed for better visualization.

The three dimensional frame/block assembly would preferably be covered with adhesive on the top and bottom and attached to the two adjacent sheets 204, 206, 208—one on the bottom and one on the top and the adhesive cured. The adhesive would be compatible with the materials bonded and of sufficient quantity for structural stress transfer.

Figure 69:
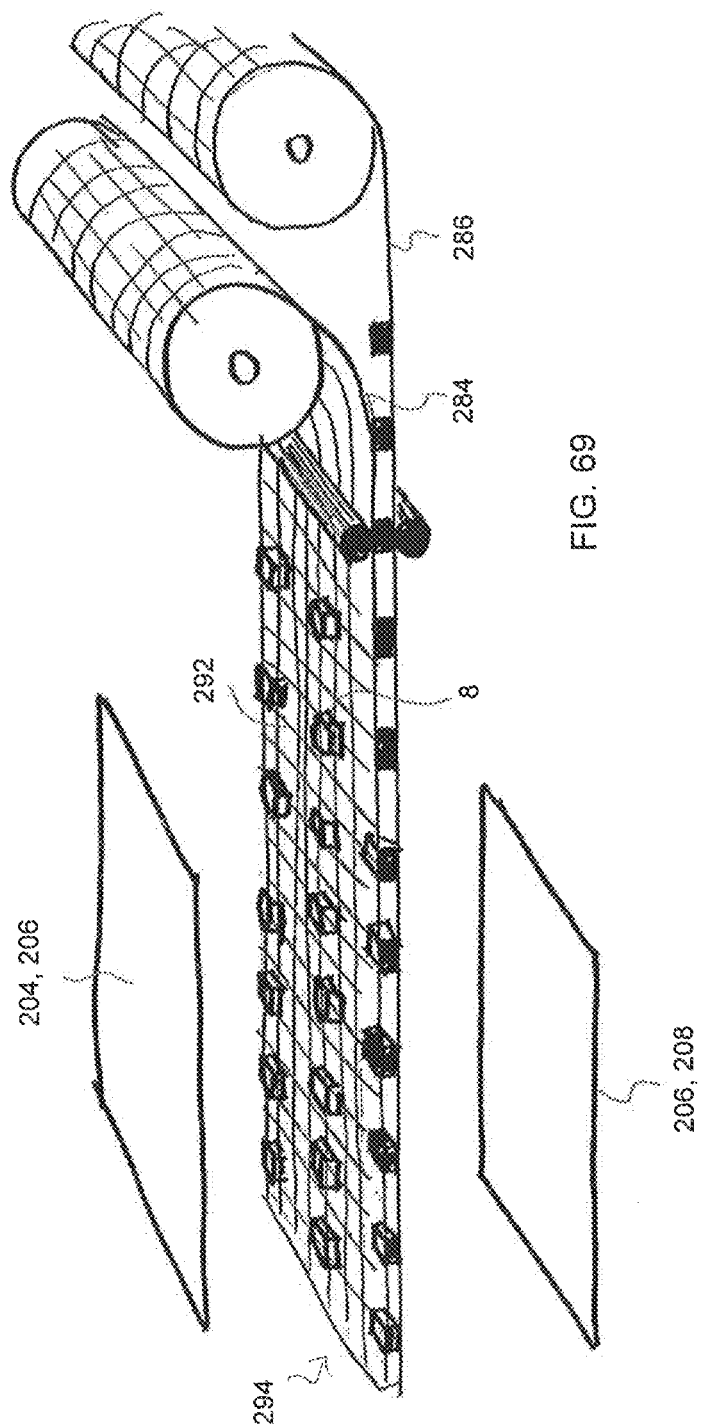
FIG. 69 shows a production schematic for scaled up production of the panels.

In a production method utilizing a related design, FIG. 69 shows a method of production which could be used as shown in a continuous manufacturing arrangement or as a partial manufacturing arrangement.

This method provides for the separate lateral grids 284, 286 to be used, preferably without the vertical straps 288 as a net 294. The lateral grids 284, 286 in this embodiment are preferably of a plastic material with a spacing of ¼" to 1"

and a thickness of between 12 gauge to 40 gauge. The separate lateral straps 292 are connected in a continuous grid that is utilized to place the spacing structural elements 8 between the two layers of grid material 284, 286. Adhesive is either applied to the grids 284, 286 during its manufacture and is inherently connected to all fibers, or adhesive is applied before placing the spacing structural elements 8, or adhesive is applied to the spacing structural elements 8, or some combination thereof. Regardless of the manner of adhesive, the spacing structural elements 8 are now connected in a manner of spacing from one another as previously described above to the upper and lower grids 284, 286, so that the spacing structural elements 8 relative spacing from one another is fixed. Then net 294 of spacing structural elements 8 can be maneuvered or moved down an assembly line where two sheets 204, 206, 208 are then adhered to the spacing structural elements 8 with adhesive and or mechanical means. For example, spikes 264 may be used as above also to mechanically connect the upper or lower grids 284, 286 to the respective adjacent sheet 204, 206, 208.

Figure 70:
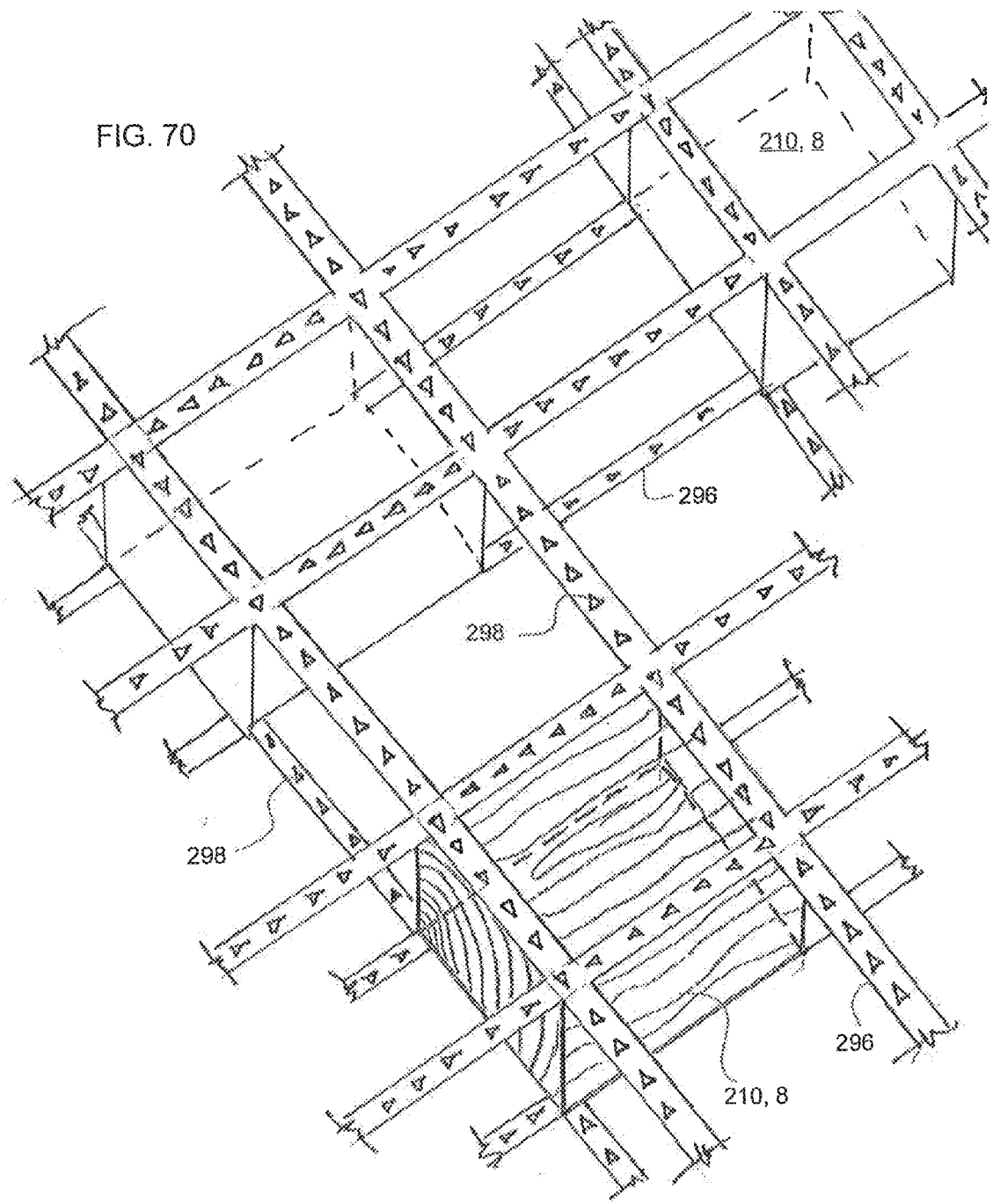
FIG. 70 shows a perspective view of a orthogonal matt.
Figure 71:
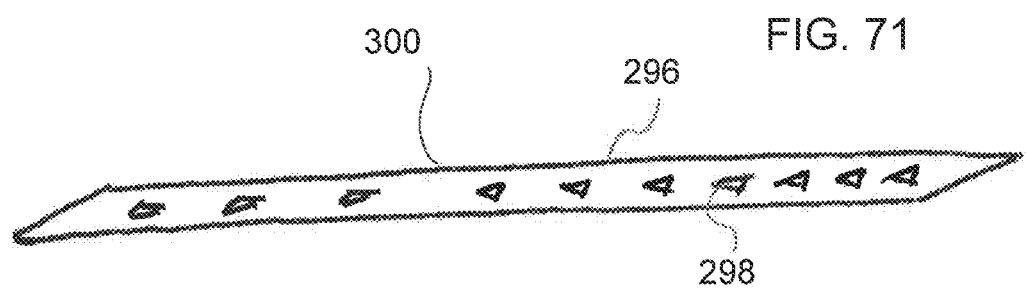
FIG. 71 shows a close up pan view of a belt of the orthogonal matt.
Figure 72:
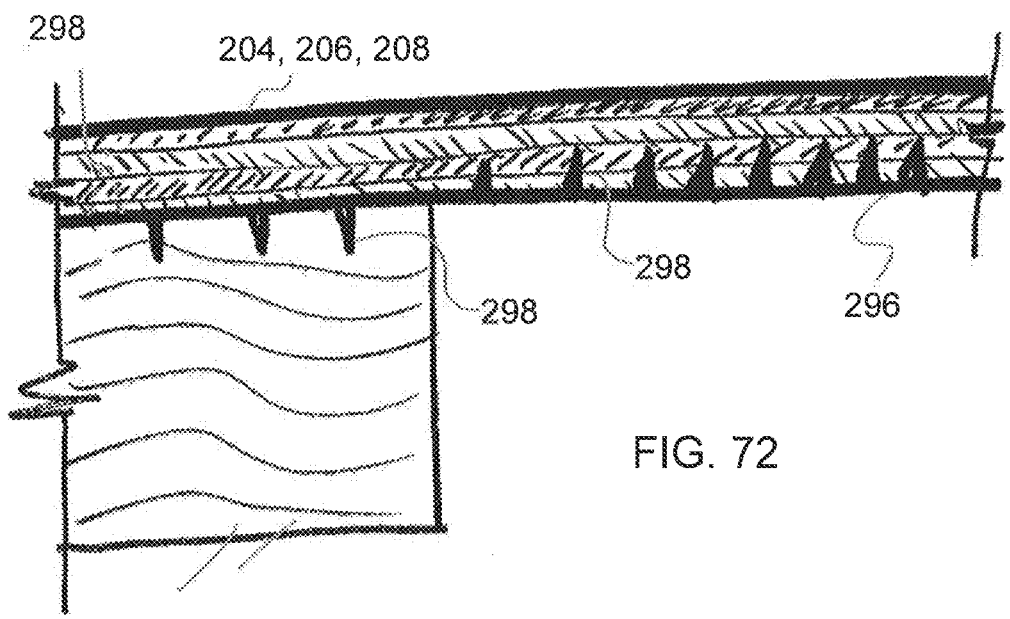
FIG. 72 shows a side view of a block connected to the orthogonal matt and a sheet.

As shown in FIGS. 70-72, in another related embodiment, a two dimensional orthogonal matt 296, similar to the separate lateral grids 284, 286, may be used to simultaneously attach the spacing structural elements 8 to the sheets 204, 206, 208, and provide increased strength to the sheets 204, 206, 208. The matt 296 is preferably constructed from metal, although some plastics or composites may also be utilized. The matt 296 is shaped in rectangular or square patterns, and preferably include tab protrusions or tabs 298 that are either bent in a first direction, e.g. down (see FIG. 72), to penetrate a wood or wood composite block 210 or in a second opposite direction, e.g., up, to penetrate the sheet 204, 206, 208 that is to be laid on the top and secured to the assembly. The tabs 298 can have smooth edged points, as shown, or jagged or barbed edges. The tabs 298 overlapping the blocks 210 can all be directed into the block 210, as shown, or one or more of the tabs 298 in this location of overlap can also be directed away from the block 210 and toward the adjacent sheet 204, 206, 208. The matt 296 can be used with or without additional adhesive which could be spread on the matts 296 and/or blocks 210. The matts 296 could be on both the top and the bottom of the blocks 210, as shown in FIG. 70.

FIG. 71 shows a detail of the metal belt 300 of the orthogonal matt 296 used to connect the spacing structural element 8 to the sheets 204, 206, 208. Ideally, a bottom matt 296 is laid down and pressed into the bottom sheet 208, with the tabs 298 of the bottom matt 296 that are directed into the bottom sheet 208 entering and attaching to the bottom sheet 208. The spacing structural elements 8 are placed in the desired location on the bottom sheet 208/bottom matt 296 and pressed into place. The tabs 298 of the bottom matt 296 are directed into the spacing structural elements 8 entering and attaching to the spacing structural element 8. Next, the process is repeated with a top matt 296 laid down on the top sheet 204 (or bottom surface of the middle sheet 206 for multi-plenum panels 202) and pressed into place. The top sheet 204 is then placed over the bottom sheet 208, with the tabs 298 of the top matt 296 aligning over the spacing structural elements 8, and the entire panel is then pressed into place into the desired overall thickness. For multi-plenum panels 202, the process is repeated for the top surface of the middle sheet 206 and the top sheet 204.

The spacing structural elements 8 in this embodiment are preferably between 2"×2" and 8"×8" in width, and preferably ½" to 4" in height, and may be, for example, square or rectangular shaped. The matts 296 would be constructed to match the dimensions of the spacing structural elements 8. The tabs 298 would be of a size and spacing that would meet the structural stress transfer requirements without compromising the integrity of the belt 300. The belt 300 could be ⅛" to 1" wide.

Figure 73:
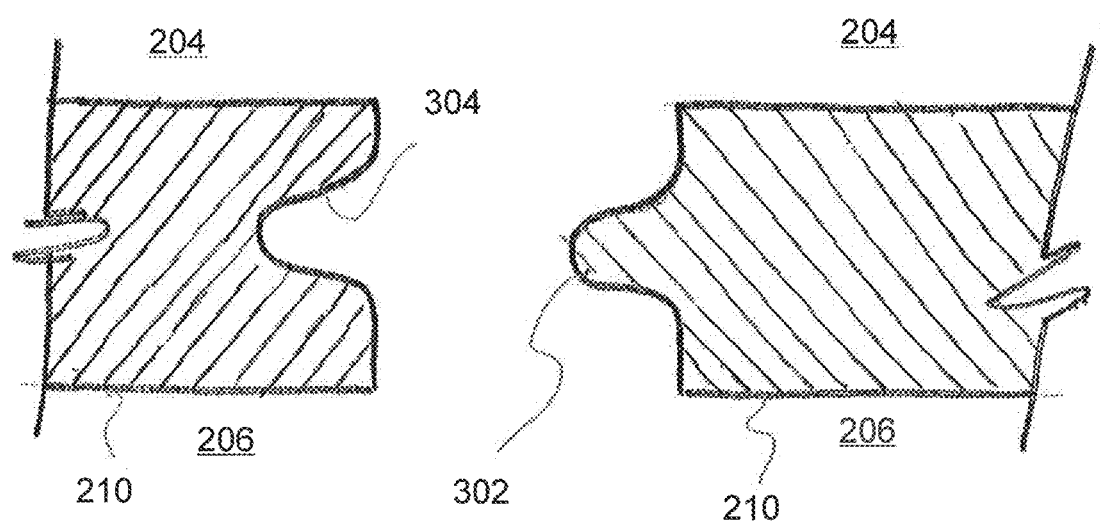
FIG. 73 shows a close up side sectional view of an interlocking mechanism to attach adjacent panels.

Tuning next to FIG. 73, this figure shows a possible interlocking mechanism that may be used to better attach adjacent panels 2, 202 when assembled in the field, that may be utilized with multiple embodiments of spacing structural elements 8, including those with utilizing orthogonal frames 280 and orthogonal matts 296. For example, in an embodiment using the orthogonal matts 296, the surface of the spacing structural elements 8 along an outer edge of the panel 2, 202 may have a protrusion 302 that fits into a mating indention 304 in a surface of spacing structural elements 8 along an outer edge of an adjacent panel 2, 202. Two adjacent edges of the panel 2, 202 could have spacing structural elements 8 with protrusions 302, and the other two opposite adjacent edges on the panel 2, 202 could have spacing structural elements 8 with mating indentions 304. A typical design for the interlocking mechanism is shown in the figure, although the interlocking mechanism can take the shape of rectangular tongue and grove or beveled edges. This interlock mechanism of spacing structural elements 8 can be utilized in any of the spacing structural elements 8 in the various embodiments of single and multi-plenum panels 2, 202, and not only for the orthogonal frames 280 and matts 296.

Figure 80:
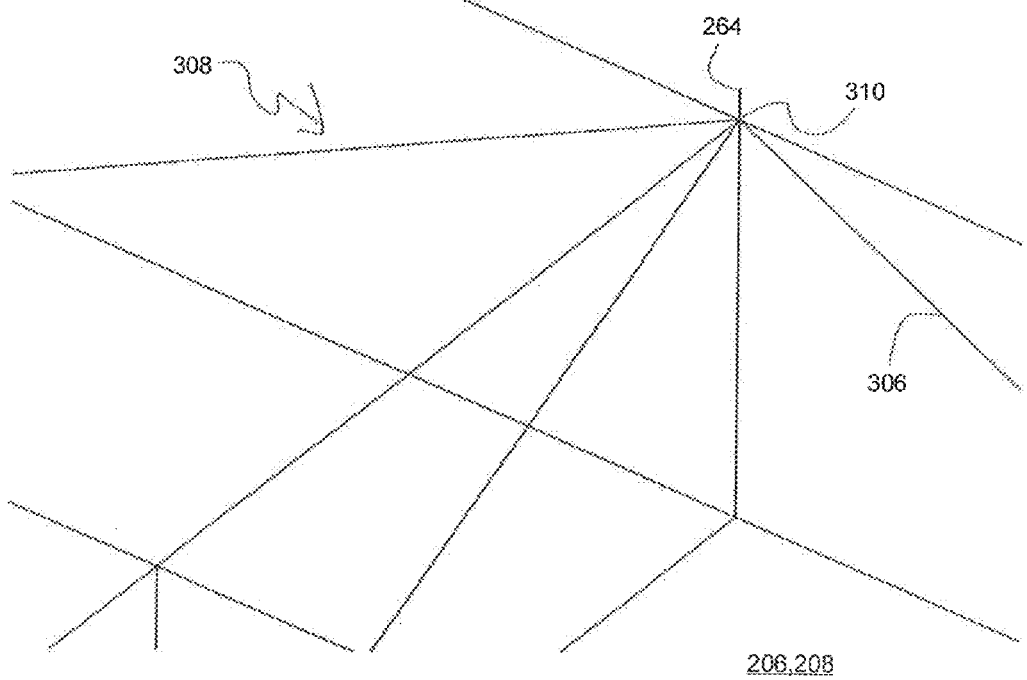
FIG. 80 is a close up perspective view of an apex area of the truss matrix of FIG. 75.

Turning now to FIGS. 74-80 a variation of the orthogonal frame 280 is shown, whereby a system of truss members 306 may be integrated in the orthogonal frame 280 to create a three dimensional truss matrix 308. While only a four by four grid section of the truss matrix 308 is shown for better visualization, it is anticipated that the truss matrix 308 will cover the entire horizontal span of the sheets 204, 206, 208. The truss matrix 308 could function alone as the spacing structural element 8, to join at a defined separation adjacent sheets 204, 206, 208 and create the plenums 212, 214. The truss matrix 308 may also be used with separate blocks 210, globs 258, or other spacing structural elements 8. Because of the diagonal truss members 306, though, it is not necessary to have blocks 210 or globs 258 for shear stress transfer as this can be done through the plurality of diagonal truss members 306 and the three dimensional truss matrix 308. As shown in FIG. 80, each apex 310, where the truss members 306 meet, may be crowned with a spike 264 to penetrate and mechanically attach the truss matrix to an adjacent sheet 204, 206, 208.

The dimensions of the truss matrix 308 can vary, but are preferably between 2" and 12" in lateral spacing between adjacent lateral wires 282 or straps 292 running in a parallel direction in the upper of lower grid 284, 286, with the height preferably between 1" to 6". The grid of the truss matrix 308 does not have to be square, but could be, for example, be rectangular too.

The orthogonal frame and/or the truss members can be made out of metal, wire, plastics, carbon fiber, fiberglass, and other suitable materials. It is probable that this may be the preferred embodiment used to attach two adjacent sheets 204, 206, 208 to each other in either the single or multi plenum panels 2, 202. This embodiment offers the advantages of ease of production and assembly, low expense, potentially no organic material exposed to the plenums, and potentially no curing times for adhesives.

Figure 74:
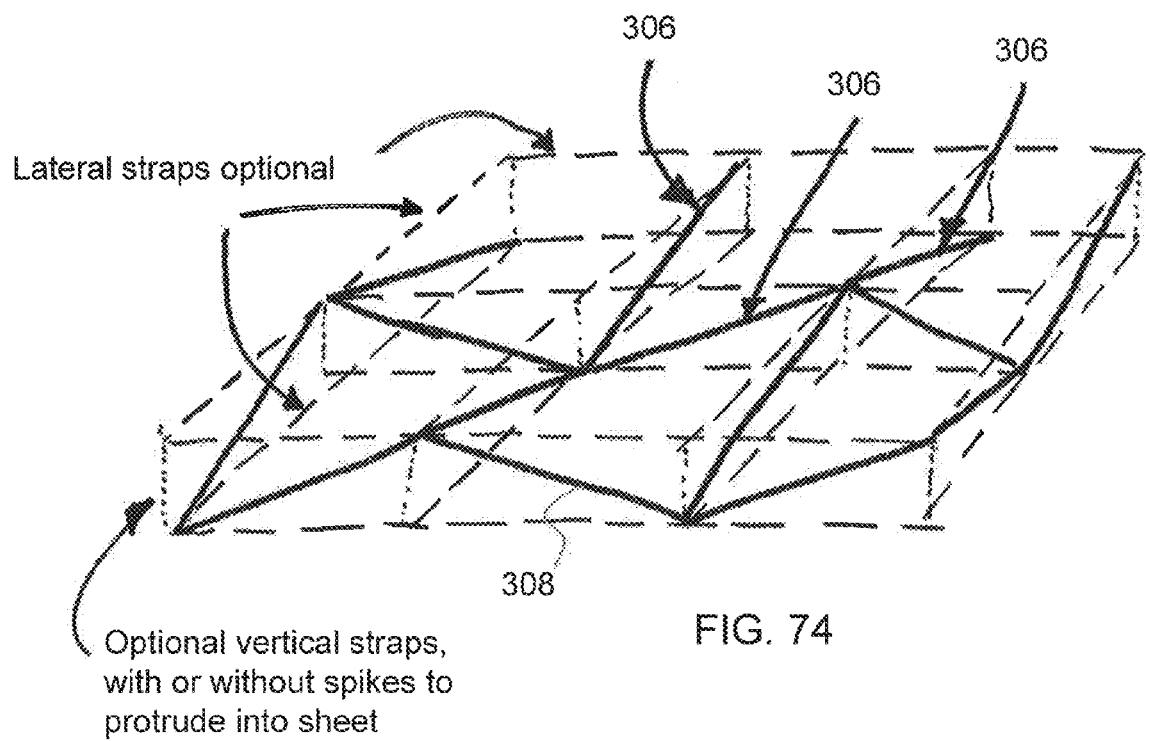
FIG. 74 is an partial perspective view of space truss.
Figure 75:
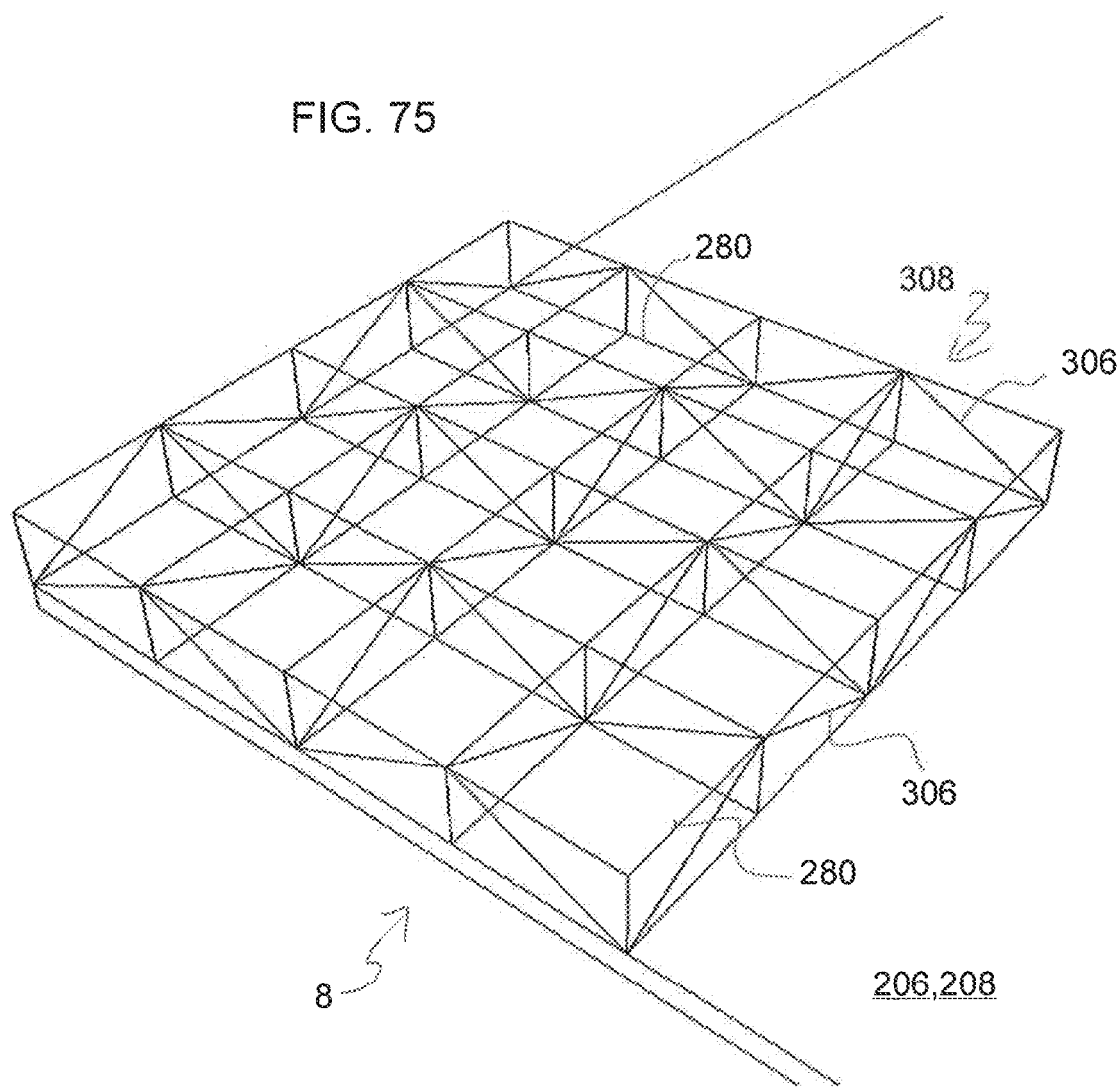
FIG. 75 is a partial perspective view of a truss matrix viewed from a first direction.
Figure 76:
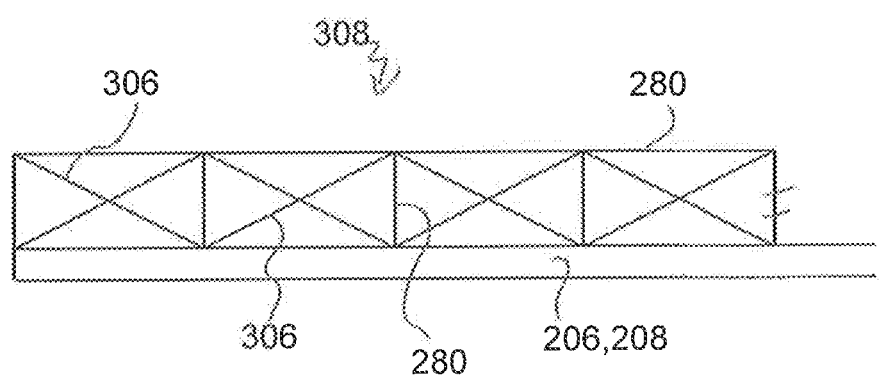
FIG. 76 is a side view of the truss matrix of FIG. 75.
Figure 77:
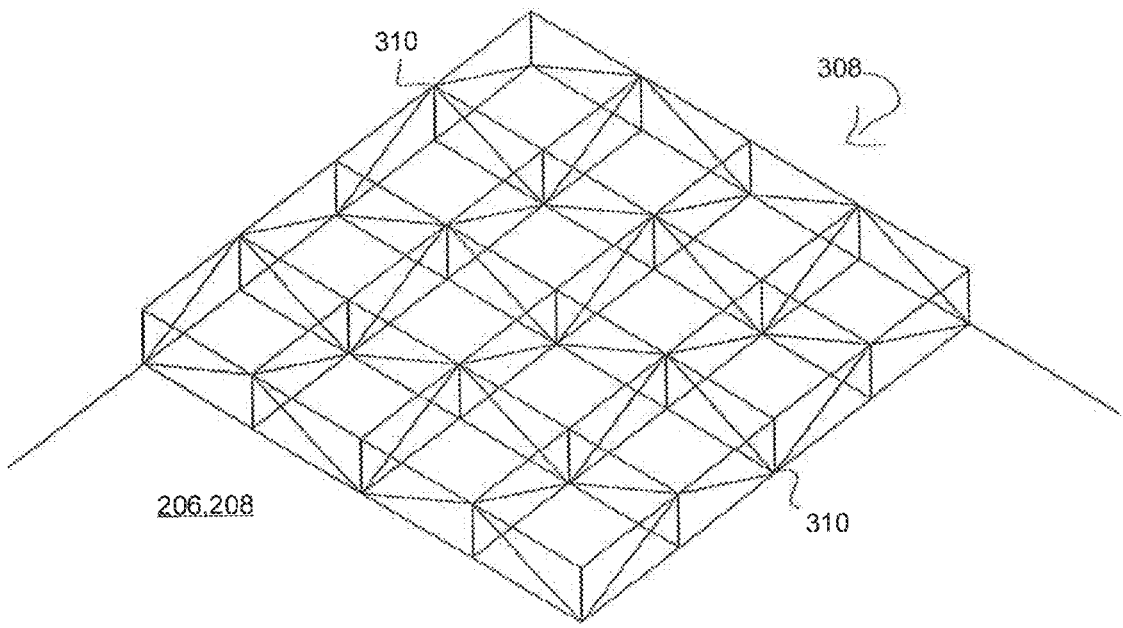
FIG. 77 is a partial perspective view of the truss matrix of FIG. 75 viewed from a second direction.
Figure 79:
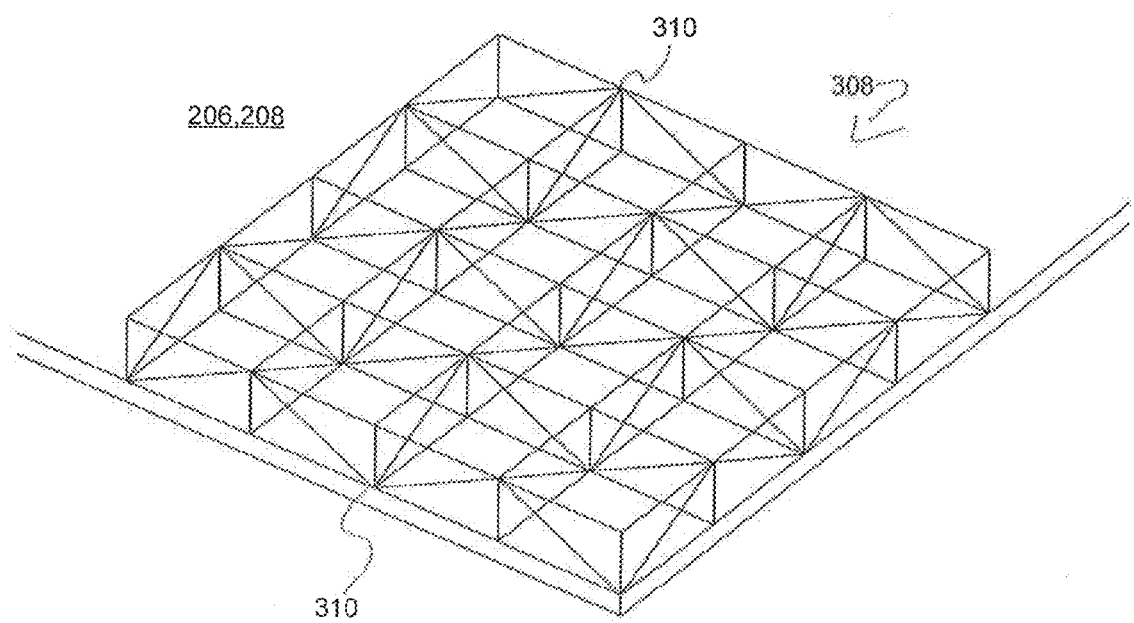
FIG. 79 is a partial perspective view of the truss matrix of FIG. 75 viewed from a third direction.

In one embodiment, as shown in FIG. 74, the truss members 306 may be used independent of the orthogonal frame 280, to fix two adjacent sheets to one another. This three dimensional space truss could be used with or without globs 258. When used with globs 258, they would preferably be placed coincident with the apex 310 regions.

Figure 81:
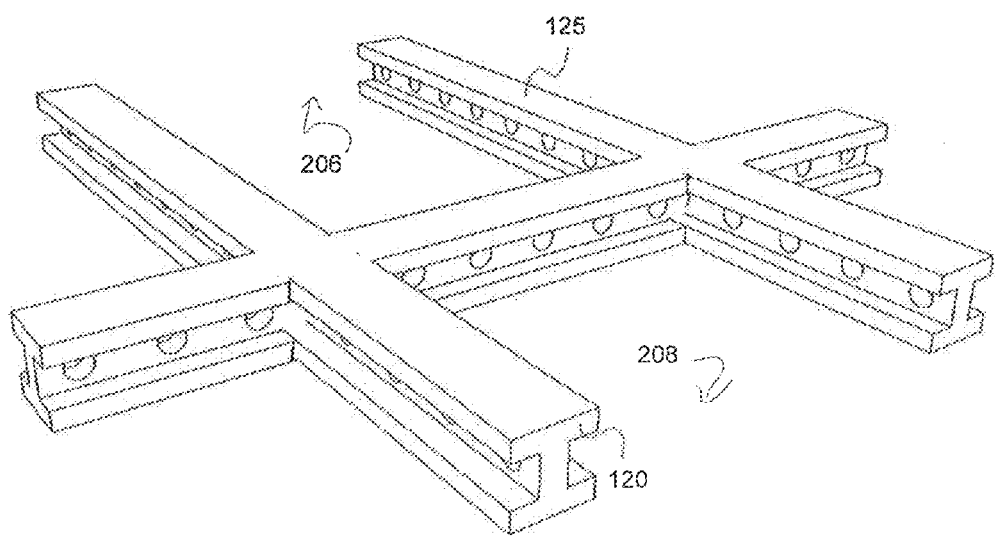
FIGS. 81-83 is a partial perspective views of engineered perforated members used in multi-plenum panels.
Figure 82:
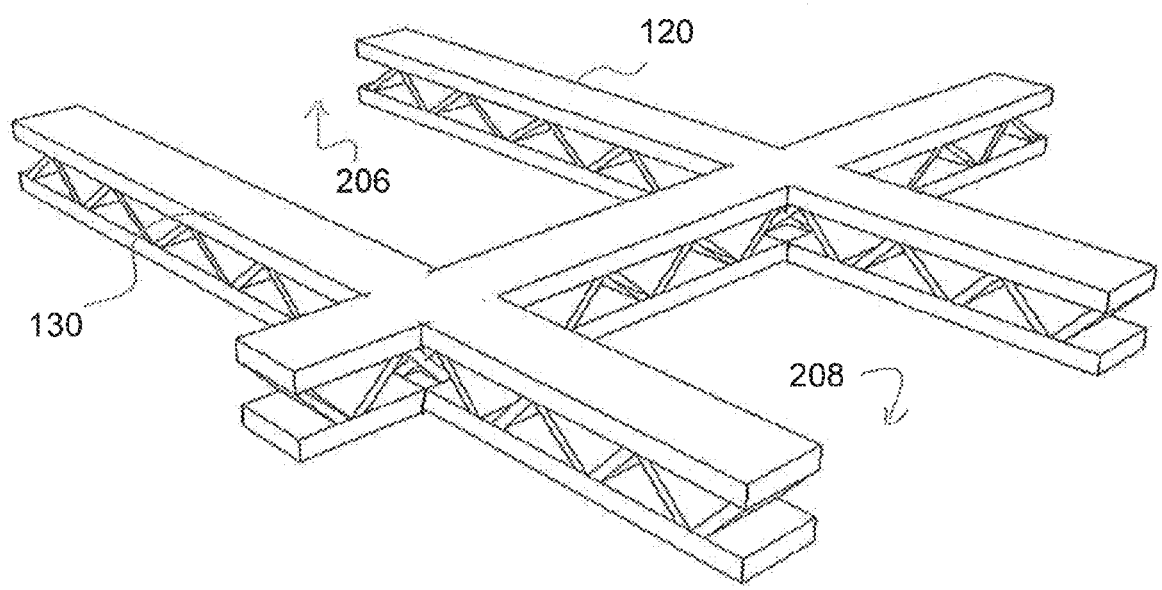
Figure 83:
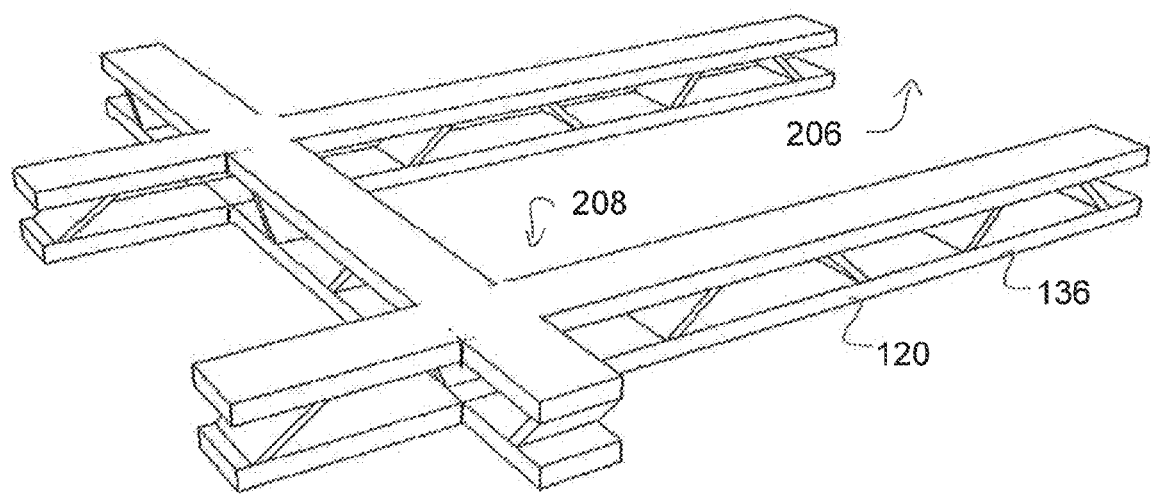

Turning next to FIGS. 81-83, an alternative method of constructing the spacing structural elements 8 between sheets 204, 206, 208 in a multi-plenum panel 202 is shown. Instead of blocks 210, a matrix of preferably single layered, branched, unitary/one piece/or bonded, engineered perforated members 120 could be utilized to separate the sheets 204, 206, 208 while providing the necessary air flow, orthogonal intersecting flow paths, and structural stress transfer. FIG. 81 shows a grid of perforated I shaped members 125.

The members 120 can be constructed of plastics, composites, carbon fiber, fiberglass, metal and can be extruded or formed and fused together into the desired shape. The ends of members 120 can incorporate the interlocking mechanism shapes shown in FIG. 73, such that adjacent exterior faces of the resulting panel 2, 202 would have an interlocking mechanism into the adjacent panel 2, 202 when assembled in the field.

The matrix members 120 could have a height of ½" to 4" and the width of the members could be from ¼" to 4" wide. The spacing of members could be from 2" to 10" and could be square or rectangular.

FIG. 82 shows a matrix of truss shaped members 130. FIG. 83 shows a matrix of truss members 130 with spaced diagonal members, or "skip truss" members 136. The attributes described in FIG. 81 are also applicable to the truss shaped members 130, 136.

In a further embodiment, shown in FIGS. 84-93, the spacing structural elements 8 may also be directly molded into the middle sheet 206 of a multi-plenum panel 202. That is, the spacing structural elements 8 in, e.g. block 210 shapes, separating the sheets 204, 206, 208 in the multi-plenum panels 202 can be fashioned as part of the middle sheet 206 from pressing a formable material such as metal, including aluminum and other metals, formable plastics, especially plastics after heating, and uncured layer of wood composite material and resin. In any case, the layer of formable sheet material is placed in a press and the blocks 210 are pressed in two mating mold halves such that the sheet 204, 206, 208 and blocks 210 become an integral member after hardening or curing in the mold.

Figure 84:
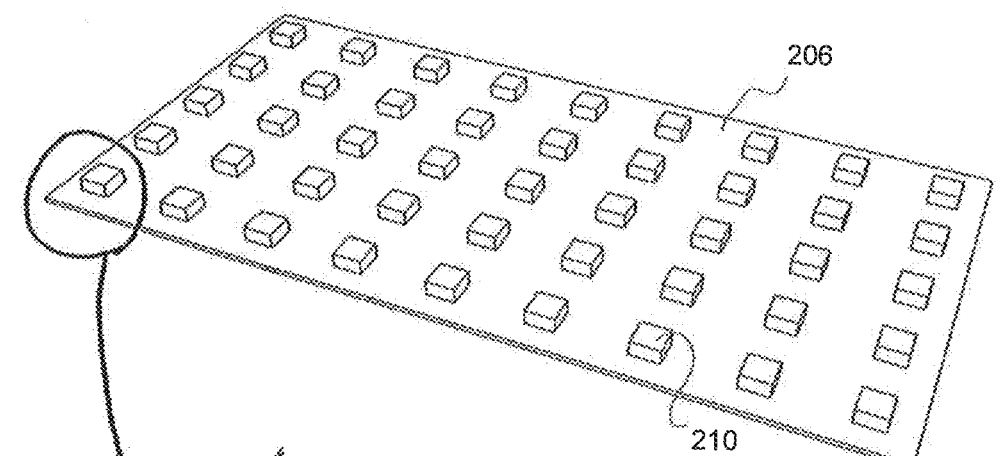
FIGS. 84 and 85 are a perspective view and up close perspective view of a molded middle sheet from above.
Figure 85:
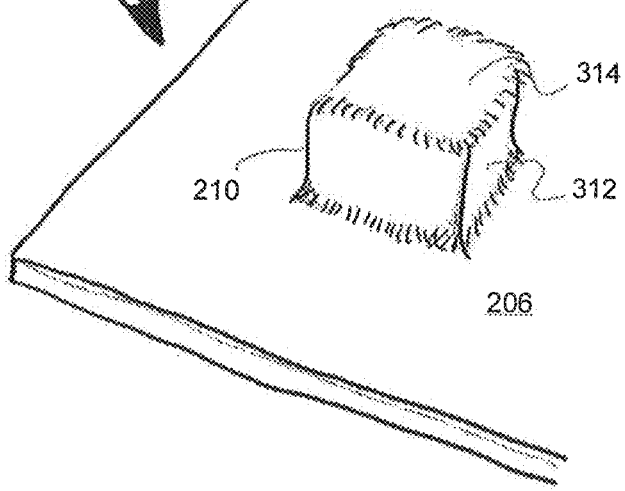
Figure 89:
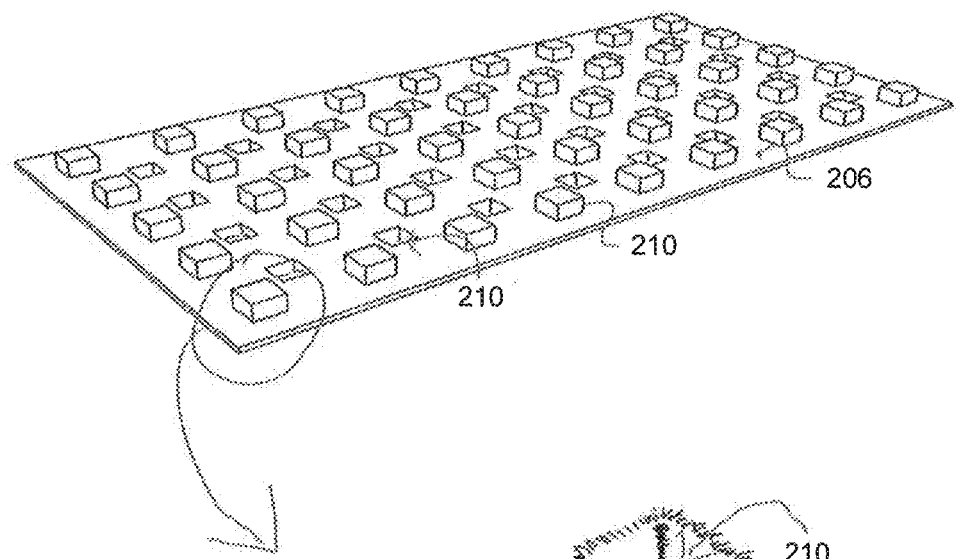
FIGS. 89 and 90 are a perspective view and up close perspective view of a molded middle sheet with blocks extending in two directions.
Figure 90:
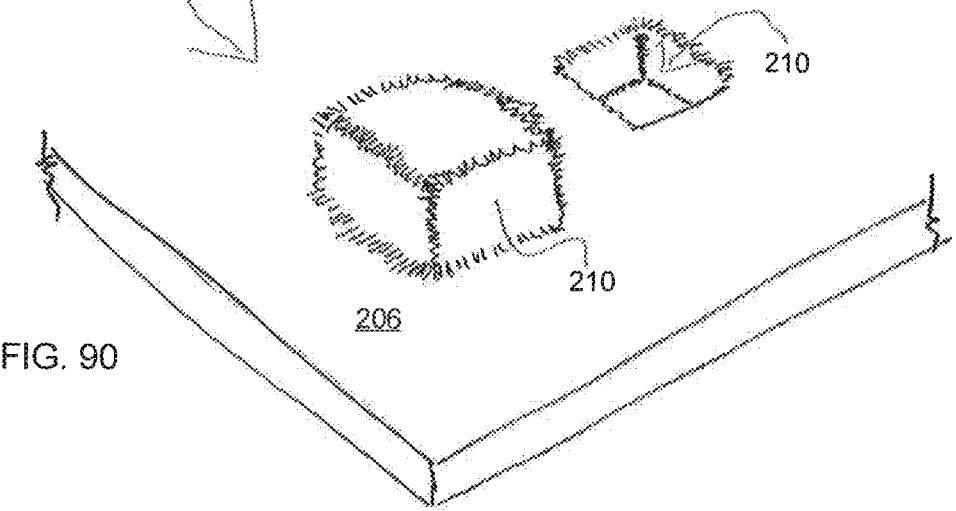

FIGS. 84 and 85 show a sheet 204, 206, 208, preferably a middle sheet 206, with a series of block 210 shaped spacing structural elements 8 that have been molded by pressing two mold halves together to the form desired shape and thickness of the sheet 206 and "bulged" blocks 210. The blocks 210 are hollow on the inside, and have no base. The vertical sides 312 of the blocks 210 extend preferably orthogonally from the middle sheet 206, and connect to a lateral cap 314. The blocks 210 could be filled with an insulation foam 316 or other type of insulating material. Though a block 210 shape is used in this embodiment, all other moldable shapes of spacing structural elements 8 could also be employed in this molded middle sheet 206 embodiment. FIG. 86 shows a section of the middle sheet 206 with molded block 210 shaped spacing structural elements 8. FIGS. 87 and 88 show the underside of the molded sheet 206. Again, any moldable material with sufficient structural strength could be used to mold the integral sheet 206 and spacing structural elements 8 including metal, plastics, carbon fiber, fiberglass and a composite mix of wood fibers and resin or a mix of steamed wood fibers such as is used in the production of Masonite.

Figure 91:
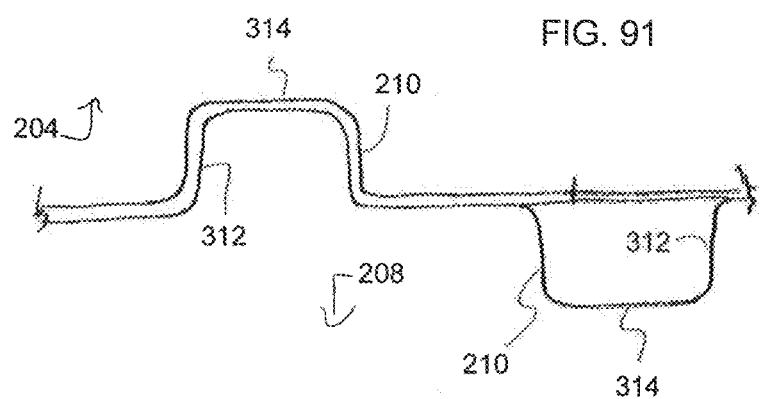
FIG. 91 is a close up sectional view of the molded middle sheet of FIG. 89.
Figure 92:
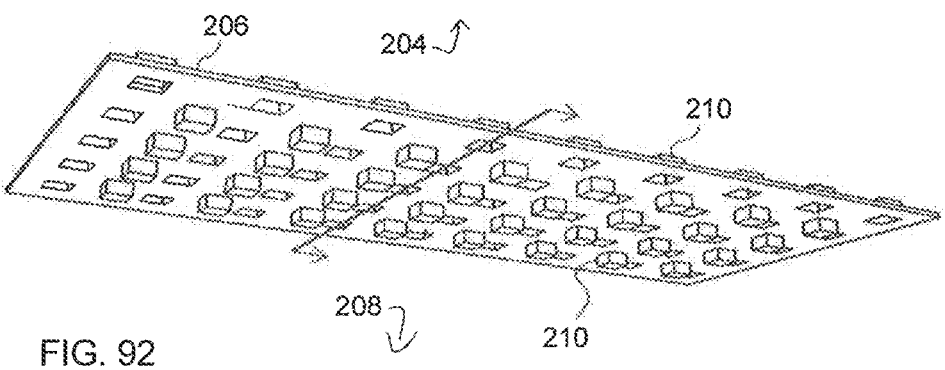
FIG. 92 is a perspective view the molded middle sheet of FIG. 89 from below.
Figure 94:
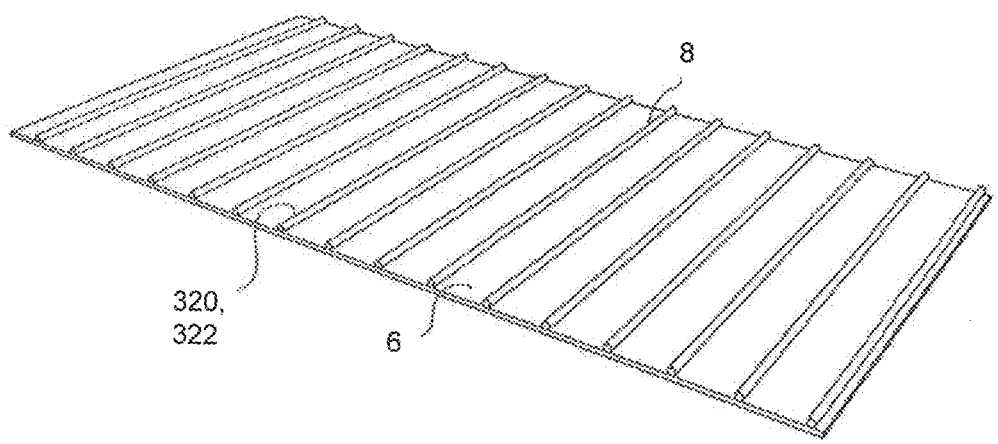
FIGS. 94-97 are perspective views of a single plenum panel in multiple stages of assembly.

Additionally, the presses could be designed such that a single sheet 206 could be molded so that the spacing structural elements 8 extend both upwards and downwards from the same middle sheet 206. FIGS. 89-92 show a sheet 206 of metal, plastic, wood fiber or other structural moldable material that has been molded with spacing structural elements 8 protruding in both directions perpendicular to the plane of the sheet 206. The resulting sheet 206 contains the middle sheet 206 and the spacing structural elements 8 for both the upper plenum 212 and the lower plenum 214 all unitary and shaped together. FIG. 91 shows a section of a molded block 210 for the upper plenum 212 along with the adjacent but staggered molded block 210 for the lower plenum 214. FIG. 92 shows the bottom view of the middle sheet 206 molded with spacing structural elements 8 extending both upwardly and downwardly into the respective upper and lower plenums 212, 214.

Figure 93:
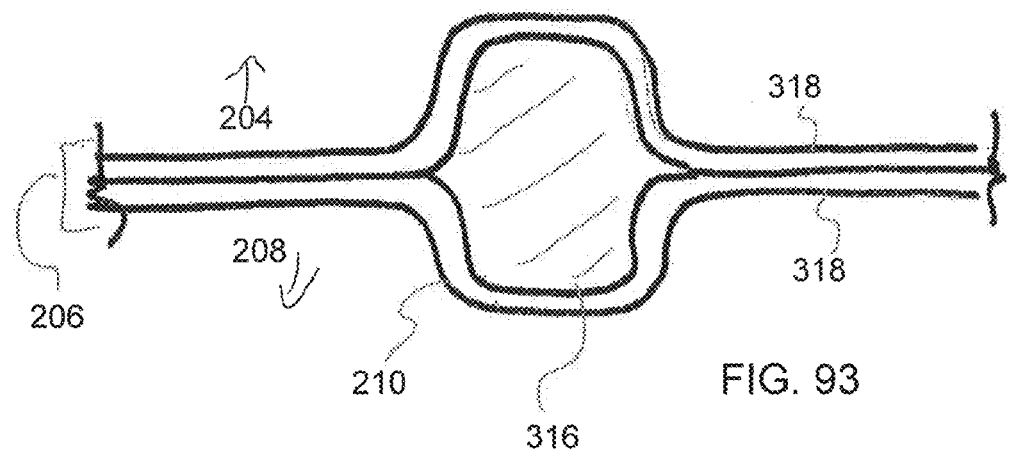
FIG. 93 is a close up sectional view of the two mirror molded sheets.

In a variation of this embodiment, as shown in FIG. 93 two mirror molded sheets 318 each with spacing structural elements 8 molded thereto, but only extending in a single direction, are combined to make a single middle sheet 206. The combined molded spacing structural elements 8 are aligned with one another and extend in opposite upward and downward directions. The two mirror molded sheets 318 are arranged parallel to one another, with the respective spacing structural elements 8 in the top sheet 318 extending upwardly and the spacing structural elements 8 in the bottom sheet 318 extending downwardly. The two mirror molded sheets 318 are attached to one another with adhesive and/or mechanical means to create a single middle sheet 206. Insulation is preferably placed in the space formed between the two spacing structural elements 8 before attaching the two mirror molded sheets 318 to one another. This way, the molded spacing structural elements 8 extending into the respective plenums 212, 214 can be vertically aligned with one another to better aid in transfer of stress from the top sheet 204 to the bottom sheet 208. As shown in the figure, the voids defined between the two blocks 210, for example, may be filled with insulation material to minimized heat transfer, and potentially increase structural integrity.

Figure 54:
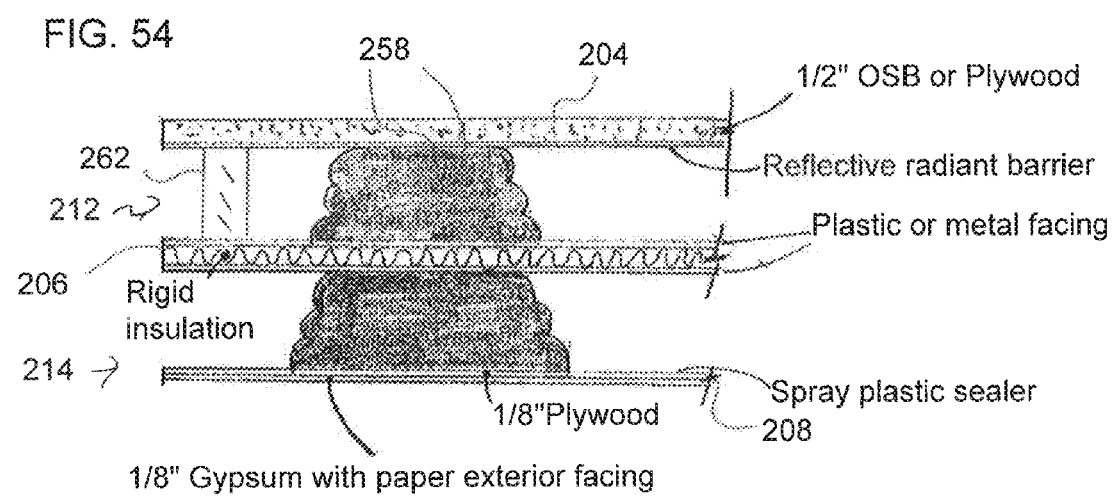
FIG. 54 is a side sectional view of a possible multi-plenum panel configuration.

Turning now to FIG. 54 an assembly of a multi-plenum panel 202, with layers of lining and different types of sheets 204, 206, 208 is shown. Given the possible materials and their best and most useful applications for the sheets 204, 206, 208 to construct a multi-plenum panel 202 the configuration described below might be a typical multi-plenum panel 202, though other combinations a possible depending on the requirements and usage of the multi-plenum panel 202. The layer of the top sheet 204 has a ½" layer of wood product—either OSB or plywood for the subfloor sheathing function of the multi-plenum panel 202. The bottom facing or bottom surface of the top sheet 204 has either a scaler or radiant layer. The middle sheet 206 is constructed from rigid insulation bonded to two facings of plastic or metal. The middle sheet 206 could also be constructed of ¼" plywood. The bottom sheet 208 has an exposed facing comprised of a thin coat of gypsum with a paper facing suitable for typical drywall finishing applications bonded to a ¼" sheet of OSB or Plywood. The sheets 204, 206, 208 could be spaced from and attached to one another by the spacing structural elements 8 described above, including blocks 210, globs 258, spacers 262 and/or inserts 260. The configuration in this embodiment does not have any organic materials exposed to the air moving through the plenums, which minimizes the potential for mold or fungal growth if by chance there was any condensation in the air distribution.

Figure 97:
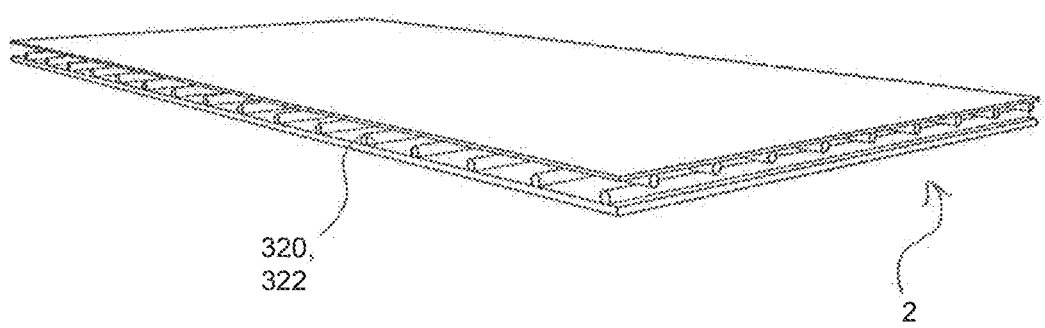
Figure 95:
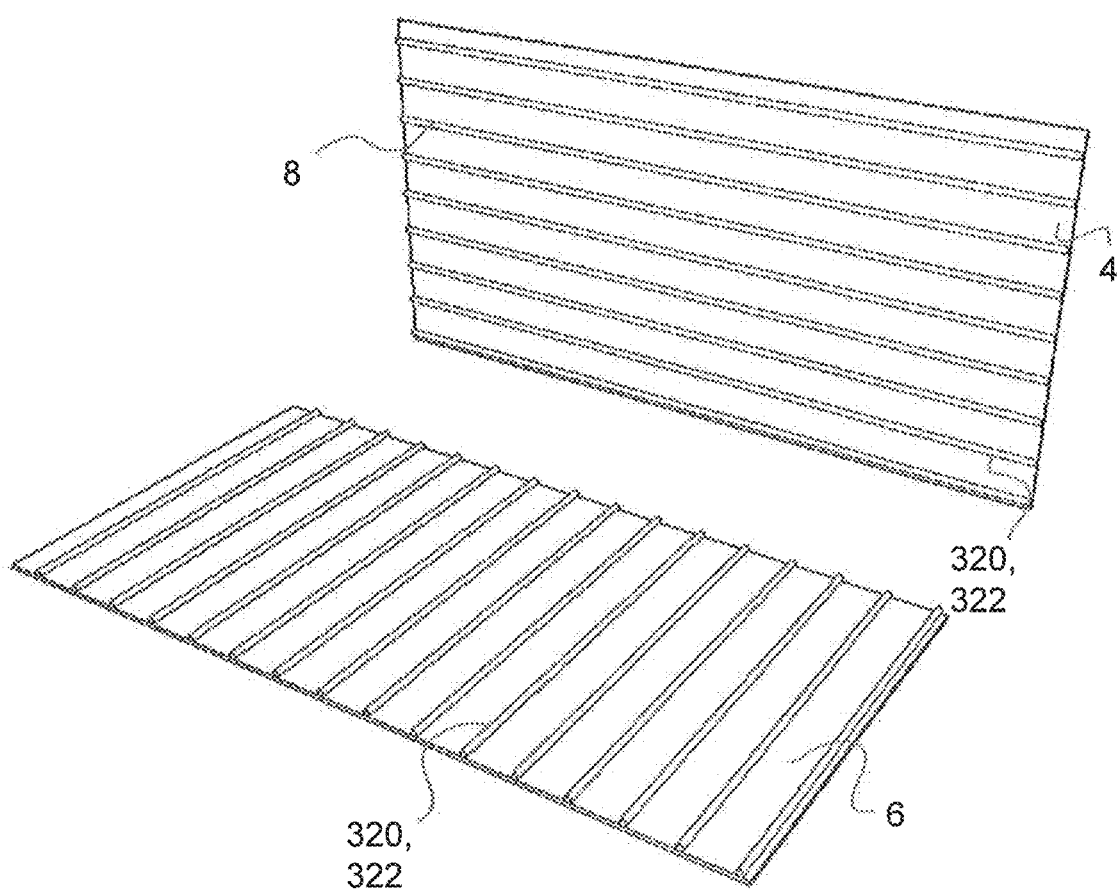
Figure 96:
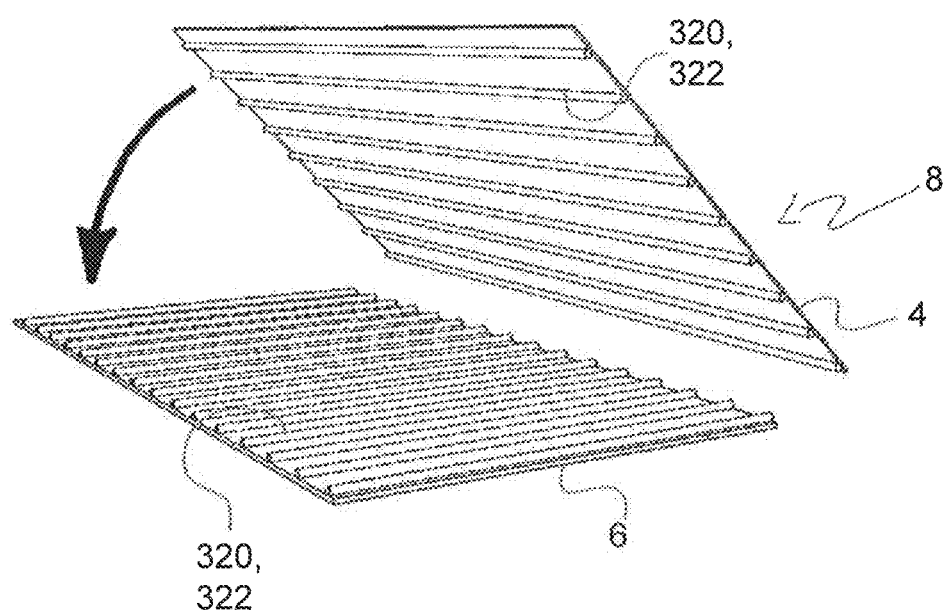

Turning now to FIGS. 94-97, the bottom or second sheet 6 of a single plenum panel 2 is shown with round tube shaped applications of ribbons or strips 320 of a semi-liquid/semi-solid adhesive and/or foam applied thereon as the spacing structural elements 8. The diameter of the strips 320 of adhesive and/or foam is preferably between ½" to 3" and the spacing is preferably between 2" to 12". FIG. 95 shows the adjacent first or top sheet 4 with strips 320 of adhesive and/or foam applied to with the same specifications as to the second sheet 6, but preferably arranged orthogonally. FIG. 96 shows the two sheets 4, 6 about to be placed together. There may be spacers 262 applied to the second sheet 6 before the application of the top first sheet 4 to insure the correct finished thickness of the panel 2 assembly. Additionally, spacers 262 can be placed around the perimeter and interior between the adhesive strips 320 to insure the desired thickness when pressed. The spacers 262 can consist of pressed metal shapes that penetrate one sheet 4, 6 when pressed in and with a protrusion that penetrates the other sheet 4, 6 when the other sheet 4, 6 is pressed into the panel 2 assembly. The spacers 262 can also be blocks 210 of wood or plastic that can be adhered to one or both adjacent sheet surfaces or can be used without adhesion to be removed later. FIG. 97 shows an assembled single plenum panel 2 with spacing structural elements 8 in the form the ribbons, tubes, or strips 320 of adhesive/and or foam ater being pressed and cured.

Similarly, the matrix for the single plenum panel 2 can be assembled from a matrix of spacing structural elements 8 consisting of hollow tubing 322 made from metal, plastic, fiberglass, composites, or other materials in an extruded or fused or assembled form. The tubing 322 matrix members would adhere to each other and to the two sheets 4, 6 to construct the panel 2. The tubes 322 could also be perforated with holes to enhance air flow. The strips 320 or tubing 322 form of spacing structural elements 8 could also be used for multi-plenum panels 202, but would potentially decrease absolute unobstructed orthogonal flow paths, instead allowing sinusoidal flow paths in both lateral directions—over and under the elongate spacing structural elements 8 attached to the lower 208, 206 and upper 206, 204 sheet respectively.

Wherefore, I claim:

1. A multi-plenum structural panel comprising:
   a top sheet, a middle sheet, and a bottom sheet, each sheet being parallel to the other two;
   a first plurality of spacing structural elements, fixedly attaching the top sheet to the middle sheet, and a second plurality of spacing structural elements fixedly attaching the middle sheet to the bottom sheet, such that a yield strength of an assembled multi-plenum structural panel is greater than a sum of individual yield strengths of the top, the middle, and the bottom sheets;
   an upper plenum defined by a first spacing between the top sheet and the middle sheet;
   a lower plenum defined by a second spacing between the middle sheet and the bottom sheet;
   the first plurality of spacing structural elements being formed such that a first plurality of spaced apart unobstructed pathways are created in the upper plenum for air to move in a first direction from at least one edge of the multi-plenum structural panel to at least one of an opposite and an adjacent edge of the multi-plenum structural panel in each plenum; and
   the second plurality of spacing structural elements being formed such that a second plurality of spaced apart unobstructed pathways are created in the lower plenum for air to move in a second direction from at least one edge of the multi-plenum structural panel to at least one of an opposite and an adjacent edge of the multi-plenum structural panel in each plenum, where the first direction is orthogonal to the second direction.

2. The multi-plenum structural panel in claim 1, wherein the spacing structural elements include one of extruded and deposited globs.

3. The multi-plenum structural panel in claim 1, wherein the spacing structural elements include inserts.

4. The multi-plenum structural panel in claim 1, wherein the spacing structural elements have spikes that protrude into one of the top sheet, the middle sheet, and the bottom sheet.

5. The multi-plenum structural panel in claim 1, wherein the spacing structural elements include barricade shaped inserts.

6. The multi-plenum structural panel in claim 1, wherein the spacing structural elements include inserts with a caged surface.

7. The multi-plenum structural panel in claim 1, wherein the spacing structural elements include inserts with spikes disposed on a surface of the inserts.

8. The multi-plenum structural panel in claim 1, wherein the spacing structural elements include hollow inserts.

9. The multi-plenum structural panel in claim 1, wherein the spacing structural elements include perforated inserts.

10. The multi-plenum structural panel in claim 1, wherein the spacing structural elements are a matt and block assembly, the matt comprising tabs that insert into either the block or one of the three sheets.

11. The multi-plenum structural panel in claim 1, wherein the spacing structural elements are molded and of unitary construction with one of the top sheet, the middle sheet, and the bottom sheet.

12. The multi-plenum structural panel in claim 1, wherein the spacing structural elements comprise a three dimensional space truss.

13. The multi-plenum structural panel in claim 1, wherein the spacing structural elements comprise a three dimensional space truss and spikes are positioned at apexes where a plurality of diagonal truss members meet.

14. The multi-plenum structural panel in claim 1, wherein the spacing structural elements comprise an engineered matrix member.

15. The multi-plenum structural panel in claim 1, wherein the spacing structural elements include a branched and perforated engineered matrix member.

16. The multi-plenum structural panel in claim 1, wherein
   each of the top sheet, the middle sheet, and the bottom sheet is one of multilayered, comprised of multiple materials, and has a coating or a lining, and
   the bottom sheet is multilayered with at least one layer of drywall material.

17. The multi-plenum structural panel in claim 1 wherein the top, the middle, and the bottom sheets are each between 0.125 inches and 1.0 inches in thickness, not including the thickness of any molded or integral spacing structural elements, and are between 3.0 and 4.5 feet by between 6.0 and 12 feet in planar dimensions, and the top the middle and the bottom sheet are made of one of plywood, Oriented Strand Board, and medium-density fiberboard.

18. The multi-plenum structural panel in claim 1, wherein the spacing structural elements include inserts that pass through the middle sheet.

19. The multi-plenum structural panel in claim 18, wherein the middle sheet is molded around the inserts.

20. A structural panel with at least one plenum comprising:
- a first sheet and a second sheet, each sheet being parallel to the other;
- a first plurality of elongate spacing structural elements fixedly attached to the first sheet;
- a second plurality of elongate spacing structural elements fixedly attached to both the second sheet and the first plurality of elongate spacing structural elements, and orthogonally positioned relative to the first plurality of elongate spacing structural elements, such that a yield strength of an assembled structural panel is greater than a sum of individual yield strengths of the first sheet and the second sheet;
- the at least one plenum defined by a spacing between the first sheet and the second sheet;
- the first plurality of elongate spacing structural elements attached to the first sheet being laterally spaced from one another and running parallel to one another;
- the second plurality of spacing structural elements attached to the second sheet being laterally spaced from one another and running parallel to one another;
- both the first and the second pluralities of the spacing structural elements being formed such that a first plurality of spaced apart unobstructed pathways are created in the at least one plenum for air to move in a first direction from at least one edge of the structural panel to at least one of an opposite and an adjacent edge of the structural panel in the at least one plenum; and
- both pluralities of the spacing structural elements being composed of one of adhesive, foam, metal, plastic, fiberglass, and composites.

* * * * *